US012628818B2

(12) United States Patent
Churchill et al.

(10) Patent No.: US 12,628,818 B2
(45) Date of Patent: May 19, 2026

(54) SYSTEMS AND METHODS FOR HYPOTHERMIC TRANSPORT OF A HEART

(71) Applicant: Paragonix Technologies, Inc., North Waltham, MA (US)

(72) Inventors: William Lucas Churchill, Bolton, MA (US); Michael Tajima, North Waltham, MA (US); Ben Bulka, North Waltham, MA (US); Pratik Patel, North Waltham, MA (US)

(73) Assignee: Paragonix Technologies, Inc., Waltham, MA (US)

( * ) Notice: Subject to any disclaimer, the term of this patent is extended or adjusted under 35 U.S.C. 154(b) by 0 days.

(21) Appl. No.: 19/172,238

(22) Filed: Apr. 7, 2025

(65) Prior Publication Data

US 2025/0311717 A1      Oct. 9, 2025

Related U.S. Application Data

(60) Provisional application No. 63/631,946, filed on Apr. 9, 2024.

(51) Int. Cl.
*A01N 1/144*      (2025.01)
*A01N 1/162*      (2025.01)

(52) U.S. Cl.
CPC ............. *A01N 1/144* (2025.01); *A01N 1/162* (2025.01)

(58) Field of Classification Search
None
See application file for complete search history.

(56) References Cited

U.S. PATENT DOCUMENTS

| | | | |
|---|---|---|---|
| 3,323,872 A | 6/1967 | Scott | |
| 3,398,743 A | 8/1968 | Shalit | |
| 3,607,646 A | 9/1971 | de Roissart | |
| 3,935,065 A | 1/1976 | Doerig | |
| 4,336,248 A | 6/1982 | Bonhard et al. | |
| 4,502,295 A | 3/1985 | Toldeo-Pereyra | |
| 4,575,498 A | 3/1986 | Holmes et al. | |
| 4,643,713 A | 2/1987 | Viitala | |
| 4,723,974 A | 2/1988 | Ammerman | |
| 4,931,333 A | 6/1990 | Henry | |
| 4,952,409 A | 8/1990 | Bando et al. | |

(Continued)

FOREIGN PATENT DOCUMENTS

| | | |
|---|---|---|
| CA | 2980782 | 11/2007 |
| CA | 2722615 | 10/2009 |

(Continued)

OTHER PUBLICATIONS

Chi et al., "The Development of a portable ECG monitor based on DSP", Physics Procedia, vol. 33:765-774 (2012).

(Continued)

*Primary Examiner* — Elizabeth A Robinson
*Assistant Examiner* — Jonathan E Lepage
(74) *Attorney, Agent, or Firm* — Knobbe Martens Olson & Bear, LLP

(57) ABSTRACT

A transport container and methods for preserving a heart at a hypothermic temperature. The transport container can maintain the heart at a temperature of 6-8° C. for improved results after transplantation. The preservation of the heart within this range can improve transplantation outcomes.

16 Claims, 17 Drawing Sheets

(56) References Cited

U.S. PATENT DOCUMENTS

| | | |
|---|---|---|
| 4,976,708 A | 12/1990 | Oshiyama |
| 5,051,352 A | 9/1991 | Martindale et al. |
| 5,066,578 A | 11/1991 | Wikman-Coffelt |
| 5,093,969 A | 3/1992 | McGuire |
| 5,133,470 A | 7/1992 | Abrams et al. |
| 5,141,847 A | 8/1992 | Sugimachi et al. |
| 5,149,321 A | 9/1992 | Klatz et al. |
| 5,157,930 A | 10/1992 | McGhee et al. |
| 5,186,431 A | 2/1993 | Tamari |
| 5,234,405 A | 8/1993 | Klatz et al. |
| RE34,387 E | 9/1993 | Holmes et al. |
| 5,252,537 A | 10/1993 | De Winter-Scailteur |
| 5,285,657 A | 2/1994 | Bacchi et al. |
| 5,306,711 A | 4/1994 | Andrews |
| D347,894 S | 6/1994 | Hansen et al. |
| 5,320,846 A | 6/1994 | Bistrian et al. |
| 5,326,706 A | 7/1994 | Yland et al. |
| 5,356,771 A | 10/1994 | O'Dell |
| 5,362,622 A | 11/1994 | O'Dell et al. |
| 5,385,821 A | 1/1995 | O'Dell et al. |
| 5,395,314 A | 3/1995 | Klatz et al. |
| 5,434,045 A | 7/1995 | Jost |
| 5,435,142 A | 7/1995 | Silber |
| 5,570,588 A | 11/1996 | Lowe |
| 5,584,804 A | 12/1996 | Klatz et al. |
| 5,586,438 A | 12/1996 | Fahy |
| 5,599,659 A | 2/1997 | Brasile et al. |
| 5,601,972 A | 2/1997 | Meryman |
| 5,629,145 A | 5/1997 | Meryman |
| 5,643,712 A | 7/1997 | Brasile |
| 5,656,154 A | 8/1997 | Meryman |
| 5,696,152 A | 12/1997 | Southard |
| 5,699,793 A | 12/1997 | Brasile |
| 5,702,881 A | 12/1997 | Brasile et al. |
| 5,707,971 A | 1/1998 | Fahy |
| 5,709,654 A | 1/1998 | Klatz et al. |
| 5,712,084 A | 1/1998 | Osgood |
| 5,716,378 A | 2/1998 | Minten |
| 5,752,929 A | 5/1998 | Klatz et al. |
| 5,827,222 A | 10/1998 | Klatz et al. |
| 5,843,024 A | 12/1998 | Brasile |
| 5,916,800 A | 6/1999 | Elizondo et al. |
| 5,922,598 A | 7/1999 | Mintchev |
| 5,963,335 A | 10/1999 | Boutelle |
| 5,965,433 A | 10/1999 | Gardetto et al. |
| 6,014,864 A | 1/2000 | Owen |
| 6,020,575 A | 2/2000 | Nagle et al. |
| 6,024,698 A | 2/2000 | Brasile |
| 6,042,559 A | 3/2000 | Dobak, III |
| 6,046,046 A | 4/2000 | Hassanein |
| 6,060,232 A | 5/2000 | Von Baeyer et al. |
| 6,100,082 A | 8/2000 | Hassanein |
| 6,174,719 B1 | 1/2001 | Elizondo et al. |
| 6,194,137 B1 | 2/2001 | Khirabadi et al. |
| 6,209,343 B1 | 4/2001 | Owen |
| 6,241,945 B1 | 6/2001 | Owen |
| 6,260,360 B1 | 7/2001 | Wheeler |
| 6,280,925 B1 | 8/2001 | Brockbank |
| 6,303,388 B1 | 10/2001 | Fahy |
| D453,828 S | 2/2002 | Brassil et al. |
| 6,375,613 B1 | 4/2002 | Brasile |
| 6,381,981 B1 | 5/2002 | Yaddgo et al. |
| 6,406,839 B1 | 6/2002 | Segall et al. |
| 6,413,713 B1 | 7/2002 | Serebrennikov |
| 6,475,716 B1 | 11/2002 | Seki |
| 6,485,450 B1 | 11/2002 | Owen |
| 6,492,103 B1 | 12/2002 | Taylor |
| D468,436 S | 1/2003 | Brassil et al. |
| D470,594 S | 2/2003 | Brassil et al. |
| 6,569,615 B1 | 5/2003 | Thatte et al. |
| 6,582,953 B2 | 6/2003 | Brasile |
| 6,596,531 B2 | 7/2003 | Campbell et al. |
| 6,642,019 B1 | 11/2003 | Anderson et al. |
| 6,642,045 B1 | 11/2003 | Brasile |
| 6,656,380 B2 | 12/2003 | Wood et al. |
| 6,673,008 B1 | 1/2004 | Thompson et al. |
| 6,673,594 B1 | 1/2004 | Owen et al. |
| 6,677,150 B2 | 1/2004 | Alford et al. |
| 6,699,231 B1 | 3/2004 | Sterman et al. |
| 6,736,836 B2 | 5/2004 | Montgomery |
| 6,740,484 B1 | 5/2004 | Khirabadi et al. |
| 6,773,877 B2 | 8/2004 | Fahy |
| 6,794,124 B2 | 9/2004 | Steen |
| 6,794,182 B2 | 9/2004 | Wolf, Jr. |
| 6,905,871 B1 | 6/2005 | Doorschodt et al. |
| 6,924,267 B2 | 8/2005 | Daemen et al. |
| 6,948,334 B1 | 9/2005 | Challenger |
| 6,953,655 B1 | 10/2005 | Hassanein et al. |
| 6,977,140 B1 | 12/2005 | Owen et al. |
| 6,994,954 B2 | 2/2006 | Taylor |
| 6,997,688 B1 | 2/2006 | Klein et al. |
| 7,005,253 B2 | 2/2006 | Polyak et al. |
| 7,008,535 B1 | 3/2006 | Spears et al. |
| 7,029,839 B2 | 4/2006 | Toledo-Pereyra et al. |
| D527,225 S | 8/2006 | Krieger et al. |
| D531,319 S | 10/2006 | Schein et al. |
| D531,320 S | 10/2006 | Garland et al. |
| 7,157,222 B2 | 1/2007 | Khirabadi et al. |
| 7,176,015 B2 | 2/2007 | Alford et al. |
| 7,240,513 B1 | 7/2007 | Conforti |
| 7,270,946 B2 | 9/2007 | Brockbank et al. |
| 7,294,278 B2 | 11/2007 | Spears et al. |
| 7,316,922 B2 | 1/2008 | Streeter |
| 7,326,564 B2 | 2/2008 | Lundell et al. |
| 7,361,365 B2 | 4/2008 | Birkett et al. |
| 7,410,474 B1 | 8/2008 | Friend et al. |
| D576,488 S | 9/2008 | Miota et al. |
| 7,504,201 B2 | 3/2009 | Taylor et al. |
| 7,572,622 B2 | 8/2009 | Hassanein et al. |
| 7,651,835 B2 | 1/2010 | Hassanein et al. |
| 7,678,563 B2 | 3/2010 | Wright et al. |
| 7,691,622 B2 | 4/2010 | Garland et al. |
| 7,749,693 B2 | 7/2010 | Brassil et al. |
| 7,811,808 B2 | 10/2010 | van der Plaats et al. |
| 7,824,848 B2 | 11/2010 | Owen et al. |
| D630,318 S | 1/2011 | Goodwin |
| 7,897,327 B2 | 3/2011 | Millis et al. |
| 8,097,449 B2 | 1/2012 | Garland et al. |
| 8,152,367 B2 | 4/2012 | Roberts et al. |
| D664,261 S | 7/2012 | Kravitz et al. |
| 8,268,547 B2 | 9/2012 | Owen et al. |
| 8,268,612 B2 | 9/2012 | Owen et al. |
| 8,304,181 B2 | 11/2012 | Hassanein et al. |
| D672,466 S | 12/2012 | Kravitz et al. |
| 8,323,954 B2 | 12/2012 | Kravitz et al. |
| 8,361,091 B2 | 1/2013 | Schein et al. |
| 8,420,380 B2 | 4/2013 | Fishman et al. |
| 8,465,970 B2 | 6/2013 | Hassanein et al. |
| D692,159 S | 10/2013 | Judson et al. |
| D692,160 S | 10/2013 | Judson et al. |
| 8,613,202 B2 | 12/2013 | Williams |
| D697,224 S | 1/2014 | Judson et al. |
| 8,685,709 B2 | 4/2014 | Bunegin et al. |
| 8,785,116 B2 | 7/2014 | Anderson et al. |
| 8,802,425 B2 | 8/2014 | Ferrera |
| D713,972 S | 9/2014 | Judson et al. |
| D714,461 S | 9/2014 | Judson et al. |
| D714,462 S | 9/2014 | Judson et al. |
| 8,828,034 B2 | 9/2014 | Kravitz et al. |
| 8,828,710 B2 | 9/2014 | Anderson et al. |
| 8,835,158 B2 | 9/2014 | Judson et al. |
| D727,492 S | 4/2015 | Scampoli |
| D734,868 S | 7/2015 | Gilboa |
| 9,089,126 B2 | 7/2015 | Faulkner et al. |
| 9,155,297 B2 | 10/2015 | Anderson et al. |
| 9,247,728 B2 | 2/2016 | Fishman et al. |
| 9,253,976 B2 | 2/2016 | Anderson et al. |
| 9,259,562 B2 | 2/2016 | Steinman et al. |
| 9,357,767 B2 | 6/2016 | Steinman et al. |
| 9,426,979 B2 | 8/2016 | Anderson et al. |
| D765,874 S | 9/2016 | Judson et al. |
| 9,560,846 B2 | 2/2017 | Anderson et al. |
| D787,696 S | 5/2017 | Schmieta et al. |
| D791,939 S | 7/2017 | Turturro et al. |

(56) References Cited

U.S. PATENT DOCUMENTS

| | | | |
|---|---|---|---|
| 9,867,368 B2 | 1/2018 | Anderson et al. | |
| 9,910,000 B2 | 3/2018 | Lynam et al. | |
| 9,936,689 B2 | 4/2018 | Anderson et al. | |
| D819,223 S | 5/2018 | Judson et al. | |
| 10,076,112 B2 | 9/2018 | Hassanein et al. | |
| 10,085,441 B2 | 10/2018 | Steinman et al. | |
| D861,161 S | 9/2019 | Schuessler | |
| D882,077 S | 4/2020 | Schmitt | |
| D884,887 S | 5/2020 | Kangastupa | |
| D901,680 S | 11/2020 | Guala | |
| 10,918,102 B2 | 2/2021 | Uygun et al. | |
| D912,245 S | 3/2021 | Grudo et al. | |
| 11,089,775 B2 | 8/2021 | Anderson et al. | |
| 11,166,452 B2 | 11/2021 | Judson et al. | |
| 11,178,866 B2 | 11/2021 | Anderson et al. | |
| D963,194 S | 9/2022 | Bixon et al. | |
| 11,472,625 B2 | 10/2022 | Mirzaee Kakhki | |
| 11,528,903 B1 | 12/2022 | He et al. | |
| D975,273 S | 1/2023 | Theriot | |
| 11,576,371 B2 | 2/2023 | Legallais et al. | |
| 11,632,951 B2 | 4/2023 | Collette et al. | |
| 11,659,834 B2 | 5/2023 | Judson et al. | |
| D999,370 S | 9/2023 | Wade et al. | |
| D1,002,868 S | 10/2023 | Bixon et al. | |
| D1,003,434 S | 10/2023 | Fangrow | |
| 11,785,938 B2 | 10/2023 | Clavien et al. | |
| D1,016,251 S | 2/2024 | Castriotta et al. | |
| D1,031,028 S | 6/2024 | Bornhoft et al. | |
| 12,035,708 B2 | 7/2024 | Anderson et al. | |
| 12,052,985 B2 | 8/2024 | Anderson et al. | |
| 12,070,029 B2 | 8/2024 | Collette et al. | |
| 12,096,765 B1 | 9/2024 | Anderson et al. | |
| 12,121,023 B1 | 10/2024 | Anderson et al. | |
| 12,161,110 B2 | 12/2024 | Collette et al. | |
| 12,178,206 B2 | 12/2024 | Collette et al. | |
| 12,245,585 B2 | 3/2025 | Judson et al. | |
| 12,245,586 B2 | 3/2025 | Anderson et al. | |
| 12,279,610 B2 | 4/2025 | Anderson et al. | |
| 12,310,357 B2 | 5/2025 | Collette et al. | |
| 12,342,810 B2 | 7/2025 | Anderson et al. | |
| 12,357,533 B2 | 7/2025 | Bulka et al. | |
| 12,369,576 B2 | 7/2025 | Anderson et al. | |
| D1,087,382 S | 8/2025 | Macari et al. | |
| 12,410,408 B2 | 9/2025 | Macari et al. | |
| 12,485,064 B2 | 12/2025 | Bulka et al. | |
| 2001/0025191 A1 | 9/2001 | Montgomery | |
| 2002/0042131 A1 | 4/2002 | Brockbank et al. | |
| 2002/0051779 A1 | 5/2002 | Gage et al. | |
| 2002/0064768 A1 | 5/2002 | Polyak et al. | |
| 2002/0068360 A1 | 6/2002 | Brockbank et al. | |
| 2002/0115634 A1 | 8/2002 | Polyak et al. | |
| 2002/0138013 A1 | 9/2002 | Guerrero et al. | |
| 2002/0177117 A1 | 11/2002 | Wolf | |
| 2003/0022148 A1 | 1/2003 | Seki | |
| 2003/0053998 A1 | 3/2003 | Daemen et al. | |
| 2003/0054540 A1 | 3/2003 | Alford et al. | |
| 2003/0080126 A1* | 5/2003 | Voute | F25D 31/001 |
| | | | 220/9.4 |
| 2003/0118980 A1 | 6/2003 | Taylor | |
| 2003/0125804 A1 | 7/2003 | Kruse et al. | |
| 2003/0180704 A1 | 9/2003 | Brockbank et al. | |
| 2004/0014199 A1 | 1/2004 | Streeter | |
| 2004/0038192 A1 | 2/2004 | Brasile | |
| 2004/0038193 A1 | 2/2004 | Brasile | |
| 2004/0045314 A1 | 3/2004 | Roth et al. | |
| 2004/0058432 A1 | 3/2004 | Owen et al. | |
| 2004/0067480 A1 | 4/2004 | Brockbank et al. | |
| 2004/0111104 A1 | 6/2004 | Schein et al. | |
| 2004/0170950 A1 | 9/2004 | Prien | |
| 2004/0171138 A1 | 9/2004 | Hassanein et al. | |
| 2004/0221719 A1 | 11/2004 | Wright et al. | |
| 2004/0224298 A1 | 11/2004 | Brassil et al. | |
| 2004/0224299 A1 | 11/2004 | Garland et al. | |
| 2004/0241634 A1 | 12/2004 | Millis et al. | |
| 2004/0248281 A1 | 12/2004 | Wright et al. | |
| 2005/0100876 A1 | 5/2005 | Khirabadi et al. | |
| 2005/0147958 A1 | 7/2005 | Hassanein et al. | |
| 2005/0153271 A1 | 7/2005 | Wenrich | |
| 2005/0221269 A1 | 10/2005 | Taylor et al. | |
| 2005/0233299 A1 | 10/2005 | Sawa et al. | |
| 2005/0255442 A1 | 11/2005 | Brassil et al. | |
| 2005/0277106 A1 | 12/2005 | Daemen et al. | |
| 2006/0019388 A1 | 1/2006 | Hutmacher et al. | |
| 2006/0063142 A1 | 3/2006 | Owen et al. | |
| 2006/0121439 A1 | 6/2006 | Baker | |
| 2006/0121512 A1 | 6/2006 | Parenteau | |
| 2006/0121605 A1 | 6/2006 | Parenteau | |
| 2006/0141077 A1 | 6/2006 | Pettersson | |
| 2006/0148062 A1 | 7/2006 | Hassanein et al. | |
| 2006/0154357 A1 | 7/2006 | Hassanein et al. | |
| 2006/0154358 A1 | 7/2006 | Hassanein et al. | |
| 2006/0154359 A1 | 7/2006 | Hassanein et al. | |
| 2006/0160204 A1 | 7/2006 | Hassanein et al. | |
| 2006/0168985 A1 | 8/2006 | Gano | |
| 2006/0233986 A1 | 10/2006 | Gutsche et al. | |
| 2006/0292544 A1 | 12/2006 | Hassanein et al. | |
| 2007/0009881 A1 | 1/2007 | Arzt et al. | |
| 2007/0015131 A1 | 1/2007 | Arzt et al. | |
| 2007/0028642 A1 | 2/2007 | Glade et al. | |
| 2007/0166292 A1 | 7/2007 | Brasile | |
| 2007/0184545 A1 | 8/2007 | Plaats et al. | |
| 2007/0190636 A1 | 8/2007 | Hassanein et al. | |
| 2007/0193297 A1 | 8/2007 | Wilson | |
| 2007/0243518 A1 | 10/2007 | Sema et al. | |
| 2007/0264485 A1 | 11/2007 | Stepanian et al. | |
| 2007/0275364 A1 | 11/2007 | Hassanein et al. | |
| 2008/0017194 A1 | 1/2008 | Hassanein et al. | |
| 2008/0070229 A1 | 3/2008 | Streeter | |
| 2008/0070302 A1 | 3/2008 | Brockbank et al. | |
| 2008/0096184 A1 | 4/2008 | Brasile | |
| 2008/0145919 A1 | 6/2008 | Franklin et al. | |
| 2008/0187901 A1 | 8/2008 | Doorschodt et al. | |
| 2008/0234768 A1 | 9/2008 | Hassanein et al. | |
| 2008/0286747 A1 | 11/2008 | Curtis et al. | |
| 2008/0288399 A1 | 11/2008 | Curtis et al. | |
| 2008/0311552 A1 | 12/2008 | Min | |
| 2009/0078699 A1 | 3/2009 | Mustafa et al. | |
| 2009/0197240 A1 | 8/2009 | Fishman et al. | |
| 2009/0197241 A1 | 8/2009 | Fishman et al. | |
| 2009/0197292 A1 | 8/2009 | Fishman et al. | |
| 2009/0197324 A1 | 8/2009 | Fishman et al. | |
| 2009/0197325 A1 | 8/2009 | Fishman et al. | |
| 2009/0199904 A1 | 8/2009 | Babbitt et al. | |
| 2009/0226878 A1 | 9/2009 | Taylor et al. | |
| 2009/0240277 A1 | 9/2009 | Connors et al. | |
| 2009/0291486 A1 | 11/2009 | Wenrich | |
| 2010/0015592 A1 | 1/2010 | Doorschodt | |
| 2010/0028850 A1 | 2/2010 | Brassil | |
| 2010/0056966 A1 | 3/2010 | Toth | |
| 2010/0086907 A1 | 4/2010 | Bunegin et al. | |
| 2010/0112542 A1 | 5/2010 | Wright et al. | |
| 2010/0129784 A1 | 5/2010 | Eichentopf et al. | |
| 2010/0151559 A1 | 6/2010 | Garland et al. | |
| 2010/0171802 A1 | 7/2010 | Lee et al. | |
| 2010/0175393 A1 | 7/2010 | Burke et al. | |
| 2010/0209902 A1 | 8/2010 | Zal et al. | |
| 2010/0216110 A1 | 8/2010 | Brockbank | |
| 2010/0221696 A1 | 9/2010 | Owen et al. | |
| 2010/0233670 A1 | 9/2010 | Gavish | |
| 2010/0234928 A1 | 9/2010 | Rakhorst et al. | |
| 2011/0033916 A1 | 2/2011 | Hutzenlaub et al. | |
| 2011/0039253 A1 | 2/2011 | Owen et al. | |
| 2011/0053256 A1 | 3/2011 | Owen et al. | |
| 2011/0059429 A1 | 3/2011 | Owen et al. | |
| 2011/0065169 A1 | 3/2011 | Steen et al. | |
| 2011/0129810 A1 | 6/2011 | Owen et al. | |
| 2011/0129908 A1 | 6/2011 | Owen et al. | |
| 2011/0136096 A1 | 6/2011 | Hassanein et al. | |
| 2011/0173023 A1 | 7/2011 | LeClair et al. | |
| 2011/0177487 A1 | 7/2011 | Simsir et al. | |
| 2011/0183310 A1 | 7/2011 | Kravitz et al. | |
| 2011/0212431 A1 | 9/2011 | Bunegin et al. | |
| 2011/0217689 A1 | 9/2011 | Bunegin et al. | |
| 2012/0042976 A1 | 2/2012 | Toledo | |

(56) References Cited

U.S. PATENT DOCUMENTS

| | | |
|---|---|---|
| 2012/0116152 A1 | 5/2012 | Faulkner et al. |
| 2012/0148542 A1 | 6/2012 | Kravitz |
| 2012/0264104 A1 | 10/2012 | Ferrera |
| 2012/0266564 A1 | 10/2012 | Haarmann et al. |
| 2012/0301952 A1* | 11/2012 | Anderson ............. C12M 21/08 |
| | | 435/284.1 |
| 2012/0309078 A1 | 12/2012 | Anderson et al. |
| 2013/0177897 A1 | 7/2013 | Kravitz et al. |
| 2014/0041403 A1 | 2/2014 | Anderson et al. |
| 2014/0087357 A1 | 3/2014 | Kohl et al. |
| 2014/0140815 A1 | 5/2014 | Shener-Irmakoglu et al. |
| 2014/0157797 A1 | 6/2014 | Kovalick et al. |
| 2014/0314881 A1 | 10/2014 | Reynolds et al. |
| 2014/0349273 A1 | 11/2014 | Anderson et al. |
| 2014/0356850 A1 | 12/2014 | Anderson et al. |
| 2014/0356933 A1 | 12/2014 | Anderson et al. |
| 2014/0377880 A1 | 12/2014 | Emburgh et al. |
| 2015/0017627 A1 | 1/2015 | Anderson et al. |
| 2015/0204598 A1 | 7/2015 | Affleck et al. |
| 2015/0209017 A1 | 7/2015 | Fleming et al. |
| 2015/0230453 A1 | 8/2015 | Fontes et al. |
| 2015/0373967 A1 | 12/2015 | Anderson et al. |
| 2016/0074234 A1 | 3/2016 | Abichandani et al. |
| 2016/0095310 A1 | 4/2016 | Anderson et al. |
| 2016/0183517 A1 | 6/2016 | Potenziano |
| 2016/0271015 A1 | 9/2016 | Wengreen et al. |
| 2016/0347532 A1 | 12/2016 | McCormick |
| 2016/0362240 A1 | 12/2016 | Ferracamo, Jr. |
| 2016/0374332 A1 | 12/2016 | Hassanein et al. |
| 2017/0113181 A1 | 4/2017 | Sinstedten et al. |
| 2017/0318803 A1 | 11/2017 | Gil et al. |
| 2018/0000068 A1 | 1/2018 | Peralta |
| 2018/0132478 A1 | 5/2018 | Anderson et al. |
| 2018/0352807 A1 | 12/2018 | Judson et al. |
| 2019/0038388 A1 | 2/2019 | Schmitt et al. |
| 2019/0175394 A1 | 6/2019 | Kim |
| 2019/0320649 A1 | 10/2019 | Bunegin |
| 2019/0374693 A1 | 12/2019 | Kheradvar et al. |
| 2020/0187490 A1 | 6/2020 | Kravitz et al. |
| 2020/0253195 A1 | 8/2020 | Bagnato et al. |
| 2020/0278339 A1 | 9/2020 | Wang et al. |
| 2020/0375178 A1 | 12/2020 | Becker et al. |
| 2021/0235691 A1 | 8/2021 | Collette et al. |
| 2021/0392873 A1 | 12/2021 | Anderson et al. |
| 2021/0400952 A1 | 12/2021 | Judson et al. |
| 2021/0400953 A1 | 12/2021 | Anderson et al. |
| 2022/0007368 A1 | 1/2022 | Tang et al. |
| 2022/0007638 A1 | 1/2022 | Judson et al. |
| 2022/0256838 A1 | 8/2022 | Anderson et al. |
| 2022/0322658 A1 | 10/2022 | Keshavjee et al. |
| 2023/0059208 A1 | 2/2023 | Shelton et al. |
| 2023/0073834 A1 | 3/2023 | Luke |
| 2023/0089628 A1 | 3/2023 | Freed |
| 2023/0092486 A1 | 3/2023 | Pettinato et al. |
| 2023/0284613 A1 | 9/2023 | Filgate et al. |
| 2023/0284614 A1 | 9/2023 | Anderson et al. |
| 2023/0337659 A1 | 10/2023 | Judson et al. |
| 2024/0389576 A1 | 11/2024 | Anderson et al. |
| 2024/0389577 A1 | 11/2024 | Anderson et al. |
| 2024/0415110 A1 | 12/2024 | Anderson et al. |
| 2025/0064052 A1 | 2/2025 | Bulka et al. |
| 2025/0064674 A1 | 2/2025 | Bulka et al. |
| 2025/0072415 A1 | 3/2025 | Anderson et al. |
| 2025/0072416 A1 | 3/2025 | Anderson et al. |
| 2025/0089704 A1 | 3/2025 | Collette et al. |
| 2025/0198984 A1 | 6/2025 | Patel |
| 2025/0204518 A1 | 6/2025 | Patel |
| 2025/0204519 A1 | 6/2025 | Bornhoft et al. |
| 2025/0248390 A1 | 8/2025 | Macari et al. |
| 2025/0302032 A1 | 10/2025 | Anderson et al. |
| 2025/0311718 A1 | 10/2025 | Churchill et al. |
| 2025/0311719 A1 | 10/2025 | Churchill et al. |
| 2025/0318519 A1 | 10/2025 | Judson et al. |
| 2025/0339335 A1 | 11/2025 | Bulka et al. |
| 2025/0344691 A1 | 11/2025 | Judson et al. |
| 2025/0344692 A1 | 11/2025 | Collette et al. |
| 2025/0351816 A1 | 11/2025 | Anderson et al. |
| 2025/0351817 A1 | 11/2025 | Judson et al. |
| 2025/0374918 A1 | 12/2025 | Tajima et al. |
| 2025/0388872 A1 | 12/2025 | Macari et al. |

FOREIGN PATENT DOCUMENTS

| | | |
|---|---|---|
| CA | 2775327 | 3/2011 |
| CA | 3149024 | 3/2021 |
| CH | 551741 | 7/1974 |
| CN | 100402103 C | 7/2008 |
| CN | 101322861 | 12/2008 |
| CN | 104619169 | 5/2015 |
| CN | 105660603 | 6/2016 |
| CN | 205337358 | 6/2016 |
| CN | 107183005 | 9/2017 |
| CN | 112806351 | 5/2021 |
| CN | 308966732 | 11/2024 |
| DE | 19922310 | 11/2000 |
| DE | 10-2005-048625 | 4/2007 |
| EP | 0376763 | 7/1990 |
| EP | 1017274 | 11/2003 |
| EP | 2278874 | 2/2011 |
| EP | 2480069 | 8/2012 |
| EP | 4344544 | 4/2024 |
| FR | 2830077 | 4/2004 |
| JP | H08-169801 | 7/1996 |
| JP | 2000-279519 | 10/2000 |
| JP | 3775098 | 5/2006 |
| JP | 2008-120713 | 5/2008 |
| KR | 10-1499735 | 3/2015 |
| WO | WO 1991/03934 | 4/1991 |
| WO | WO 1994/09274 | 4/1994 |
| WO | WO 1995/12973 | 5/1995 |
| WO | WO 1996/30111 | 10/1996 |
| WO | WO 1997/43899 | 11/1997 |
| WO | WO 1999/15011 | 4/1999 |
| WO | WO 2000/18225 | 4/2000 |
| WO | WO 2000/18226 | 4/2000 |
| WO | WO 2000/60935 | 10/2000 |
| WO | WO 2001/03505 | 1/2001 |
| WO | WO 2001/37719 | 5/2001 |
| WO | WO 2001/54495 | 8/2001 |
| WO | WO 2001/78504 | 10/2001 |
| WO | WO 2001/78505 | 10/2001 |
| WO | WO 2001/95717 | 12/2001 |
| WO | WO 2002/17714 | 3/2002 |
| WO | WO 2002/26034 | 4/2002 |
| WO | WO 2002/32225 | 4/2002 |
| WO | WO 2002/089571 | 11/2002 |
| WO | WO 2004/017838 | 3/2004 |
| WO | WO 2004/026031 | 4/2004 |
| WO | WO 2004/052101 | 6/2004 |
| WO | WO 2004/089085 | 10/2004 |
| WO | WO 2004/089090 | 10/2004 |
| WO | WO 2004/105484 | 12/2004 |
| WO | WO 2004/110146 | 12/2004 |
| WO | WO 2005/022994 | 3/2005 |
| WO | WO 2005/074681 | 8/2005 |
| WO | WO 2005/099588 | 10/2005 |
| WO | WO 2006/033674 | 3/2006 |
| WO | WO 2006/042138 | 4/2006 |
| WO | WO 2006/052133 | 5/2006 |
| WO | WO 2006/060709 | 6/2006 |
| WO | WO 2006/101393 | 9/2006 |
| WO | WO 2007/025215 | 3/2007 |
| WO | WO 2007/111495 | 10/2007 |
| WO | WO 2007/124044 | 11/2007 |
| WO | WO 2008/108996 | 9/2008 |
| WO | WO 2008/144021 | 11/2008 |
| WO | WO 2008/150587 | 12/2008 |
| WO | WO 2009/020412 | 2/2009 |
| WO | WO 2009/041806 | 4/2009 |
| WO | WO 2009/099939 | 8/2009 |
| WO | WO 2009/132018 | 10/2009 |
| WO | WO 2010/084424 | 7/2010 |
| WO | WO 2010/096821 | 8/2010 |
| WO | WO 2011/038251 | 3/2011 |

(56) References Cited

FOREIGN PATENT DOCUMENTS

| WO | WO 2012/125782 | 9/2012 | | |
| WO | WO 2013/068752 | 5/2013 | | |
| WO | WO 2014/026119 | 2/2014 | | |
| WO | WO 2014/026128 | 2/2014 | | |
| WO | WO 2015/021513 | 2/2015 | | |
| WO | WO 2015/126853 | 8/2015 | | |
| WO | WO 2017/205967 | 12/2017 | | |
| WO | WO 2017/205987 | 12/2017 | | |
| WO | WO 2018/015548 | 1/2018 | | |
| WO | WO 2018/112072 | 6/2018 | | |
| WO | WO 2018/184100 | 10/2018 | | |
| WO | WO 2018/226993 | 12/2018 | | |
| WO | WO 2020/061202 | 3/2020 | | |
| WO | WO 2020/252148 | 12/2020 | | |
| WO | WO 2021/041181 | 3/2021 | | |
| WO | WO 2021/155147 | 8/2021 | | |
| WO | WO 2023/154793 | 8/2023 | | |
| WO | WO-2023215611 A1 * | 11/2023 | ............ | A01N 1/148 |
| WO | WO 2024/044385 | 2/2024 | | |
| WO | WO 2024/054588 | 3/2024 | | |
| WO | WO 2025/049335 | 3/2025 | | |
| WO | WO 2025/166189 | 7/2025 | | |
| WO | WO 2025/217060 | 10/2025 | | |
| WO | WO 2025/255395 | 12/2025 | | |

OTHER PUBLICATIONS

Kidney Transport, retrieved online on Feb. 27, 2025, at: https://fluctus.nl/en/portfolio/kidney-assist/, publication date unknown.

Ma et al., "Application and research progress of phase change materials in biomedical field", Biomater. Sci. vol. 9:5762-5780 (2021).

Michel et al., "Innovative cold storage of donor organs using the Paragonix Sherpa Pak™ devices", Heart Lung and Vessels, vol. 7(3):246-255 (2015) XP093292267, retrieved from the internet on Jul. 2, 2025 at: https://pmc.ncbi.nlm.nih.gov/articles/PMC4593023/pdf/hlv-07-246.pdf.

Watanabe et al., "Ex vivo lung perfusion", J Thorac Dis, vol. 13(11):6602-6617 (2021).

Yufer et al., "A tissue impendance measurement chip for myocardial ischemia detection", IEEE Transactions on Circuits and Systems-I:Regular Papers, vol. 52(12):2620-2628 (2005).

Invitation to Pay Additional Fees in application no. PCT/US2025/023485, mailed on Jul. 16, 2025, in 15 pages.

International Search Report and Written Opinion in application No. PCT/US2025/023485, mailed on Sep. 8, 2025, in 25 pages.

Briceno et al., "Back-table surgery pancreas allograft for transplantation: Implications in complications", World Journal of Transplantation, vol. 11(1):1-6 (2021).

Brown, "Chemical measurements of inulin concentrations in peritoneal dialysis solution", Clin. Chim. vol. 76:103-112 (1977).

Bunegin et al., Interstitial pO2 and high energy phosphates in the canine heart during hypothermic preservation in a new, portable, pulsatile perfusion device, from the Department of Anesthesiology University of Texas Health Science Center at San Antonio, Texas; and Center for Cardiovascular Surgery of the Republic of Lithuania, Vilnius, Lithuania, vol. 3(3):1-6 (1998).

Bunegin et al., The Application of Fluidics Technology for perfusion of adult, human sized, canine hearts, from the Department of Anesthesiology, Health Science Center at San Antonio, University of Texas, vol. 8(1/2):73-78 (2003).

Bunegin et al., "The Application of Fluidics Technology for Organ Preservation", Biomedical Instrumentation & Technology, Mar./Apr. 2004, pp. 155-164.

Calhoon et al., "Twelve-Hour Canine Heart Preservation With a Simple, Portable Hypothermic Organ Perfusion Device", r\nn Thorac Surg 1996:62:91-93.

Ceulemans et al., "Combined liver and lung transplantation", American Journal of Transplantation, vol. 14(10):2412-2416 (2014).

Cypel et al., "Extracorporeal lung perfusion", Current Opinion in Organ Transplantation, vol. 21(3):329-335 (2016).

De Perrot, "Lung preservation, Seminars in Thoracic and Cardiovascular Surgery", Saunders, Philadelphia, PA vol. 16(4):300-308 (2004).

Galasso, "Inactivating hepatits C virus in donor lungs using light therapies during normothermic ex vivo lung perfusion", Nature Communications, vol. 10(481):1-12 (2019).

Interview with CEO of Paragonix, posted at tactical-medicine.com, posting date Jul. 12, 2022, retrieved Nov. 14, 2023, online, https://tactical-medicine.com/blogs/news/improving-transplant-survival-with-organ-preservation-tech-interview-with-dr-anderson-ceo-of-paragonix (Year: 2022).

Irish Medicines Board "Viaspan" Summary of Product Characteristics available online at <https://www.hpra.ie/img/ _ ./JcenseSPC_PA0002-075-001_21112012111041.pdf>, Nov. 21, 2012 (6 Pages).

Naoum, "Xometry: Everything you need to know about acrylic and its uses", published May 4, 2022, accessed on Jan. 14, 2025, at https://www.xometry.com/resources/materials/acrylic-pmma/#:~:text=Acrylic%20is%20a%20type%20of,worst%20and%20dysfunctional%20at%20best (2022).

Organ Recovery Systems, Inc., LifePort Brochure, www.organ-recovery.com retrieved Aug. 29, 2012 (12 pages).

Paragonix SherpaPak, posted at .mmcts.org, posting date Jun. 16, 2021, retrieved Nov. 14, 2023, online, https://mmcts.org/utuorial/1657 (Year: 2021).

Raredon et al., "Biomimetic culture reactor for whole lung engineering", BioResearch, vol. 5.1:72-83 (2016).

Steinbrook, The New England Journal of Medicine, "Organ Donation after Cardiac Death", Jul. 9, 2007 (5 pages).

T'Hart, "New solutions in organ preservation", Transplantation Reviews, vol. 16:131-141 (2006).

Tolstykh et al., "Novel portable hypothermic pulsatile perfusion preservation technology: Improved viability and function of rodent and canine kidneys", Ann Transplant, 2010; 15(3):1-9.

Tolstykh et al., "Perfusion preservation of rodent kidneys in a portable preservation device based on fuidics technology", Transplantation, vol. 73(9):1508-1526 (2002).

Vries et al., "Systms engineering the organ preservation process for transplantation", Current Opinion in Biotechnology, vol. 58:192-201 (2019).

Wandall et al., "Galactosylation does not prevent the rapid clearance of long-term 40C-stored platelets", Blood, vol. 11(6):3249-3256 (2008).

Weegman et al., "Continuous Real-time Viability Assessment of Kidneys Based on Oxygen Consumption", Transplant Proc. 2010; 42(6):2020-2023.

Boteon et al., "Combined hypothermic and normothermic machine perfusion improves functional recovery of extended criteria donor livers", Liver Transplantation, vol. 24(12):1699-1715 (2018).

SamStores ("Frigidaire MFC09V4GW Chest Freezer 220-240 Volt 50/60 HZ", retrieved online on Dec. 29, 2025, at: https://www.samstores.com/product-frigidaire-mfc09v4gw-chest-freezer-220-240-volt-5060-hz-7985.html?srsltid=aFmBOoq-kqrX3TYBATp2MXlyQoNj5_mgWVenhVW7UNyzTO8jilcorAAG, in 3 pages (2015).

Van Leeuwen et al., "Sequential hypothermic and normothermic machine perfusion enables safe transplantation of high-risk donor livers", American Journal of Transplantation, vol. 22(6):1658-1670 (2022).

* cited by examiner

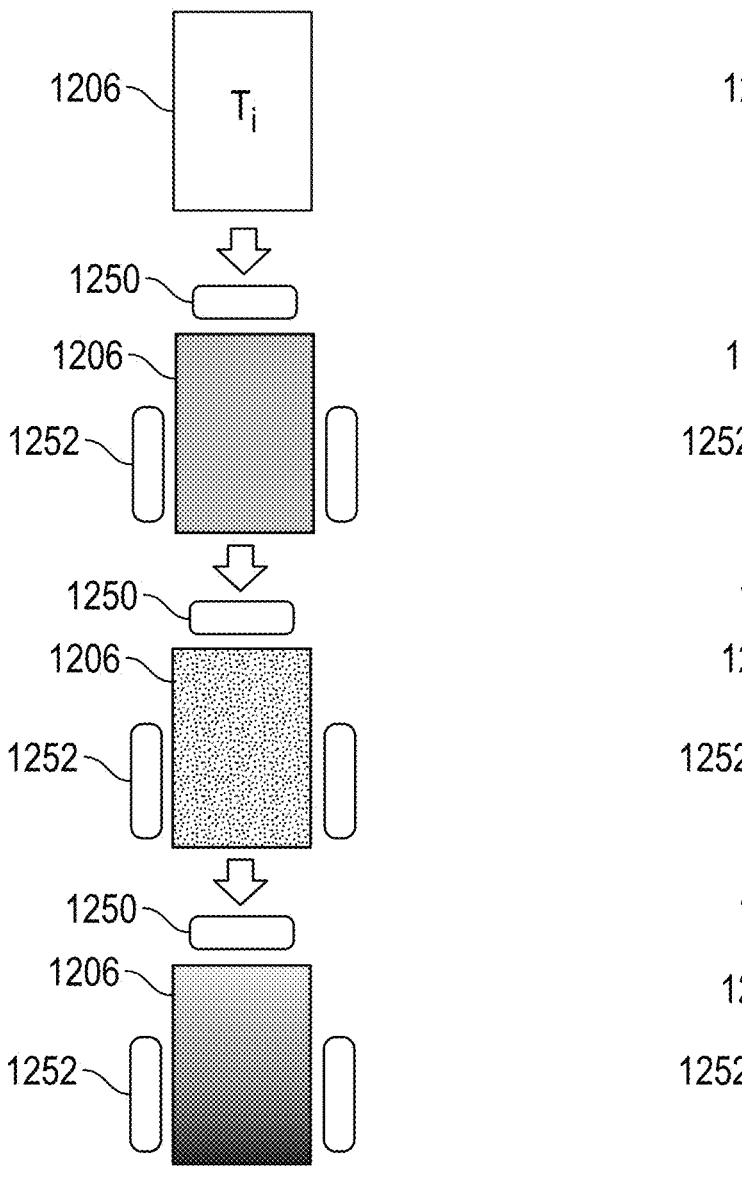
FIG. 12A          FIG. 12B

SYSTEMS AND METHODS FOR HYPOTHERMIC TRANSPORT OF A HEART

INCORPORATION BY REFERENCE TO ANY PRIORITY APPLICATIONS

This application claims the benefit of priority under 35 U.S.C. § 119(e) to U.S. Provisional Patent Application No. 63/631,946, filed Apr. 9, 2024. This application is hereby incorporated by reference herein in their entireties. Any and all applications for which a foreign or domestic priority claim is identified in the Application Data Sheet as filed with the present application are hereby incorporated by reference under 37 CFR 1.57.

FIELD

This disclosure relates to systems and methods for hypothermic transport of biological samples, for example tissues for donation. The systems and methods provide a secure, sterile, and temperature-controlled environment for transporting the samples.

BACKGROUND

There is a critical shortage of donor organs. Hundreds of lives could be saved each day if more organs (heart, kidney, lung, etc.) were available for transplant. While the shortage is partly due to a lack of donors, there is a need for better methods of preserving and transporting donated organs. Current storage and preservation methods allow only a small time window between harvest and transplant, typically on the order of hours. These time windows dictate who is eligible to donate organs and who is eligible to receive the donated organs. These time windows also result in eligible organs going unused because they cannot be transported to a recipient in time.

Current organ preservation devices often store organs at non-optimal temperatures. Storing organs at imprecise temperatures can result in worse outcomes after transplantation.

Improved transport and storage for organs would increase the pool of available organs while improving outcomes for recipients.

SUMMARY

The disclosure provides improved system and methods for transporting biological samples, e.g., tissues, such as donor organs. In certain examples, improved system and methods may greatly expand the window of time for organ transportation and, consequently, make many more organs available for donation. Additionally, the samples may be healthier upon arrival, as compared to state-of-the-art transport methods. In some embodiments, organ perfusion can prolong viability of donor organs, for example kidneys, by ensuring uniform cooling and flushing out of metabolites. Current organ perfusion devices often store organs at non-optimal temperatures. Disclosed herein are systems and methods for determining optimal or enhanced temperatures for organ transport and transporting organs at optimal or enhanced temperatures.

Embodiments of system and methods for organ transport overcome certain shortcomings of the prior art by storing the organ at specific temperatures during transport for improved results. For example, an organ can be maintained at a temperature of 6-8° C. throughout preservation. In another example, the organ can be maintained at a temperature determined by one or more factors. For example, the temperature can be determined by preservation time, the type of organ, the age of the donor, the circulatory condition of the donor, the brain condition of the donor, and/or the metabolic rate of the donor. Organ temperature can be maintained by a variety of temperature maintenance mechanisms. The temperature maintenance mechanism can be a solution with a specific phase change temperature, an air intake component, an electronic heating/cooling element, a radiation element, and/or a heat conduction element.

In some embodiments, the systems and methods described herein relate to a method for hypothermic transport of a heart within a transport container. The method can include: providing a transport container and a rigid canister, the rigid canister configured to regulate pressure inside the rigid canister; arranging eutectic cooling blocks within the transport container; placing a heart inside the rigid canister; placing the rigid canister inside the transport container; with the heart inside the rigid canister and the rigid canister inside the transport container, coupling a lid with the transport container to form an insulated environment within the transport container; transporting the heart within the transport container while: the eutectic cooling blocks maintain a temperature of at least 6° C. and less than or equal to 8° C. within the rigid canister during a preservation time; and the rigid canister maintains constant pressure within the rigid canister during preservation; and measuring, using a temperature sensor, a temperature inside the rigid canister during preservation.

In some embodiments, the method described herein can include displaying an alert if the temperature can be above 7.5° C. or below 6.5° C. In some embodiments, the method described herein can include displaying an alert if the temperature can be above 7.8° C. or below 6.2° C. In some embodiments, in the method described herein, the heart can be preserved for at least 3 hours.

In some examples, arranging the eutectic cooling blocks within the transport container comprises arranging an upper cooling media on a lid of the rigid canister and arranging a lower cooling media around an outer wall of the rigid canister. In some examples, the upper cooling media is engineered to a temperature that is at least 2° C. lower than a temperature of the lower cooling media. In some examples, the upper cooling media is engineered to a temperature of 1° C. and the lower cooling media is engineered to a temperature of 3° C. In some examples, the lid comprises a handle, and the upper cooling media is positioned at least partially under the handle. In some examples, the lower cooling media is positioned on a floor of the transport container. In some examples, the method can include displaying an alert on a display on the transport container when the temperature is above 7.5° C. or below 6.5° C. In some examples, the method can include displaying an alert on a display on the transport container when the temperature is above 7.8° C. or below 6.2° C. In some examples, the rigid canister comprises an outer canister and an inner canister. In some examples, the lower cooling media comprises a band of cooling media wrapped around the rigid canister.

In some embodiments, the systems and methods described herein relate to a method for hypothermic transport of a heart within a transport container. The method can include: determining a preservation time for a heart from a donor; determining a target temperature for organ preservation based on at least one of: the preservation time; a type of the organ; an age of the donor; a circulatory condition of the donor; a brain condition of the donor; and a metabolic rate of the donor; arranging eutectic cooling blocks within the transport container; placing the heart within the transport container; with the heart inside the transport container, coupling a lid with the transport container to form an insulated environment within the transport container; and transporting the heart within the transport container while the eutectic cooling blocks maintain the target temperature within the transport container for a duration of the preservation time.

In some embodiments, in the method described herein, the target temperature can be determined based on two of: the preservation time, the type of the organ, the age of the donor, the circulatory condition of the donor, the brain condition of the donor; and the metabolic rate of the donor. In some embodiments, in the method described herein, the target temperature can be determined based on three of: the preservation time, the type of the organ, the age of the donor, the circulatory condition of the donor, the brain condition of the donor; and the metabolic rate of the donor. In some embodiments, in the method described herein, the target temperature can be determined based on four of: the preservation time, the type of the organ, the age of the donor, the circulatory condition of the donor, the brain condition of the donor; and the metabolic rate of the donor. In some embodiments, in the method described herein, the target temperature can be determined based on five of: the preservation time, the type of the organ, the age of the donor, the circulatory condition of the donor, the brain condition of the donor; and the metabolic rate of the donor. In some embodiments, in the method described herein, the target temperature can be determined based on the preservation time, the type of the organ, the age of the donor, the circulatory condition of the donor, the brain condition of the donor; and the metabolic rate of the donor.

In some embodiments, the systems and methods described herein relate to a system for hypothermic transport of a heart within a transport container. The system can include: a transport container configured to contain a heart of a donor, the transport container. The system can include slots configured to contain eutectic cooling blocks; a temperature sensor disposed within the transport container, the temperature sensor configured to measure a temperature of the heart; a processor configured to determine a target temperature for organ preservation based on information inputted by a user, the information including at least one of: a preservation time; a type of the organ; an age of the donor; a circulatory condition of the donor; a brain condition of the donor; and a metabolic rate of the donor; and a display in communication with the processor, the display configured to display at least one of: a temperature of the eutectic cooling blocks configured to maintain the heart at the target temperature during the preservation time; or a position of the eutectic cooling blocks configured to maintain the heart at the target temperature during the preservation time.

In some embodiments, in the system described herein, the processor can be configured to determine the target temperature based on two of: the preservation time, the type of the organ, the age of the donor, the circulatory condition of the donor, the brain condition of the donor; and the metabolic rate of the donor. In some embodiments, in the system described herein, the processor can be configured to determine the target temperature based on three of: the preservation time, the type of the organ, the age of the donor, the circulatory condition of the donor; and the metabolic rate of the donor. In some embodiments, in the system described herein, the processor can be configured to determine the target temperature based on four of: the preservation time, the type of the organ, the age of the donor, the circulatory condition of the donor, the brain condition of the donor; and the metabolic rate of the donor. In some embodiments, in the system described herein, the processor can be configured to determine the target temperature based on five of: the preservation time, the type of the organ, the age of the donor, the circulatory condition of the donor, the brain condition of the donor; and the metabolic rate of the donor. In some embodiments, in the system described herein, the processor can be configured to determine the target temperature determined based on the preservation time, the type of the organ, the age of the donor, the circulatory condition of the donor, the brain condition of the donor; and the metabolic rate of the donor.

In some embodiments, the systems and methods described herein relate to a system for hypothermic transport of a heart within a transport container. The system can include: a transport container configured to contain a heart; a temperature sensor disposed within the transport container, the temperature sensor configured to measure a temperature of the heart; and a temperature maintenance component configured to maintain the temperature of the heart within an acceptable range in which the acceptable range can be at least 6° C. and less than or equal to 8° C.

In some embodiments, in the system described herein, the temperature maintenance component includes a solution with a specific phase transition temperature. In some embodiments, in the system described herein, the temperature maintenance component can be configured to intake air from an exterior of the transport container to adjust the temperature of the heart. In some embodiments, in the system described herein, the temperature maintenance component can be an electronic heating element. In some embodiments, in the system described herein, the temperature maintenance component can be an electronic cooling element. In some embodiments, in the system described herein, the temperature maintenance component can be a radiation element outside the transport container. In some embodiments, in the system described herein, the temperature maintenance component can be a heat conduction element outside the transport container.

In some embodiments, the systems and methods described herein relate to a system for hypothermic transport of a heart within a transport container. The system can include: a transport container configured to contain a heart, the transport container containing preservation solution; a temperature sensor disposed within the transport container, the temperature sensor configured to measure a temperature of the heart; a cooling material disposed in the transport container above the heart, the cooling material having a lower temperature than the preservation solution; and a second cooling material disposed in the transport container below the heart, the second cooling material having a higher temperature than the cooling material, and the second cooling material having a lower density than the cooling material.

In some embodiments, the systems and methods described herein relate to a method for hypothermic transport of a heart within a transport container. The method can include: providing a transport container configured to contain a heart; filling the transport container with preservation solution; placing a heart in the transport container; with the heart inside the transport container, coupling a lid with the transport container to form an insulated environment within the transport container; pumping preservation fluid from a bottom of the transport container to a top of the transport container to cool the heart; and pumping preservation fluid from the top of the transport container to the bottom of the transport container to warm the heart.

In some embodiments, the systems and methods described herein relate to a method for hypothermic transport of a heart within a transport container. The method can include: determining a preservation time for a heart from a donor; determining a target temperature for organ preservation based on at least one of: the preservation time; a type of the organ; an age of the donor; a circulatory condition of the donor; a brain condition of the donor; and a metabolic rate of the donor; placing the heart within the transport container; with the heart inside the transport container, coupling a lid with the transport container to form an insulated environment within the transport container; and transporting the heart within the transport container while a temperature maintenance component maintains the target temperature within the transport container for a duration of the preservation time.

In some embodiments, in the method described herein, the temperature maintenance component includes a solution with a specific phase transition temperature. In some embodiments, in the method described herein, the temperature maintenance component can be configured to intake air from an exterior of the transport container to adjust a temperature of the heart. In some embodiments, in the method described herein, the temperature maintenance component can be an electronic heating element. In some embodiments, in the method described herein, the temperature maintenance component can be an electronic cooling element. In some embodiments, in the method described herein, the temperature maintenance component can be a radiation element outside the transport container. In some embodiments, in the method described herein, the temperature maintenance component can be a heat conduction element outside the transport container.

In some embodiments, the systems and methods described herein relate to a method for hypothermic transport of a heart within a transport container. The method can include: providing a transport container configured to contain a heart; placing a heart in the transport container; with the heart inside the transport container, coupling a lid with the transport container to form an insulated environment within the transport container; receiving a preservation time input by a user; transporting the heart within the transport container while a temperature maintenance component maintains a target temperature within the transport container for a duration of the preservation time in which the target temperature can be at least 6° C. and less than or equal to 8° C. if the preservation time can be below a threshold, and wherein the target temperature can be at least 4° C. and less than or equal to 6° C. if the preservation time can be above a threshold.

In some embodiments, in the method described herein, the temperature maintenance component includes a solution with a specific phase transition temperature. In some embodiments, in the method described herein, the temperature maintenance component can be configured to intake air from an exterior of the transport container to adjust a temperature of the heart. In some embodiments, in the method described herein, the temperature maintenance component can be an electronic heating element. In some embodiments, in the method described herein, the temperature maintenance component can be an electronic cooling element. In some embodiments, in the method described herein, the temperature maintenance component can be a radiation element outside the transport container. In some embodiments, in the method described herein, the temperature maintenance component can be a heat conduction element outside the transport container.

In some embodiments, in the method described herein, the threshold can be 4 hours.

In some embodiments, in the method described herein, the threshold can be 6 hours.

In some embodiments, in the method described herein, the threshold can be 8 hours.

In some examples, the systems described herein can include a transport container; a rigid canister configured to be positioned inside the transport container, the rigid canister configured to contain a heart and regulate pressure inside the rigid canister; eutectic cooling blocks configured to be arranged within the transport container, the eutectic cooling blocks configured to maintain a temperature of at least 6° C. and less than or equal to 8° C. within the rigid canister during a preservation time; a lid configured to seal to the transport container to form an insulated environment within the transport container; and a temperature sensor configured to be positioned inside the rigid canister during preservation.

In some examples, the eutectic cooling blocks include an upper cooling media configured to be positioned on a lid of the rigid canister and a lower cooling media configured to be positioned around an outer wall of the rigid canister. In some examples, the upper cooling media is engineered to a temperature that is at least 2° C. lower than a temperature of the lower cooling media. In some examples, the upper cooling media is engineered to a temperature of 1° C. and the lower cooling media is engineered to a temperature of 3° C. In some examples, the lid includes a handle, and the upper cooling media is positioned at least partially under the handle. In some examples, the rigid canister includes an outer canister and an inner canister. In some examples, the lower cooling media includes a band of cooling media wrapped around the rigid canister.

In some examples, the methods described herein can include: determining a preservation time for an organ from a donor; determining a target temperature for organ preservation based on at least one of: the preservation time; a type of the organ; an age of the donor; a circulatory condition of the donor; a brain condition of the donor; and a metabolic rate of the donor; arranging eutectic cooling blocks within a transport container; placing the organ within the transport container; with the organ inside the transport container, coupling a lid with the transport container to form an insulated environment within the transport container; and transporting the organ within the transport container while the eutectic cooling blocks maintain the target temperature within the transport container for a duration of the preservation time.

In some examples, the target temperature is determined based on two of: the preservation time, the type of the organ, the age of the donor, the circulatory condition of the donor, the brain condition of the donor; and the metabolic rate of the donor. In some examples, the target temperature is determined based on three of: the preservation time, the type of the organ, the age of the donor, the circulatory condition of the donor, the brain condition of the donor; and the metabolic rate of the donor. In some examples, the target temperature is determined based on four of: the preservation time, the type of the organ, the age of the donor, the circulatory condition of the donor, the brain condition of the donor; and the metabolic rate of the donor. In some examples, the target temperature is determined based on five of: the preservation time, the type of the organ, the age of the donor, the circulatory condition of the donor, the brain condition of the donor; and the metabolic rate of the donor. In some examples, the target temperature is determined based on the preservation time, the type of the organ, the age of the donor, the circulatory condition of the donor, the brain condition of the donor; and the metabolic rate of the donor. In some examples, the methods described herein can include measuring a temperature within the transport container using a temperature sensor. In some examples, the methods described herein can include displaying the target temperature and the temperature on a display. In some aspects, the techniques described herein relate to a method further including selecting the eutectic cooling blocks from a plurality of eutectic cooling blocks having a plurality of temperatures based on the target temperature. In some examples, the type of organ is a heart, a lung, a kidney, a liver, or a pancreas.

In some examples, the systems described herein can include: a transport container configured to contain an organ of a donor, the transport container configured to contain eutectic cooling blocks; a temperature sensor disposed within the transport container, the temperature sensor configured to measure a temperature of the organ; a processor configured to determine a target temperature for organ preservation based on information inputted by a user, the information including at least one of: a preservation time; a type of the organ; an age of the donor; a circulatory condition of the donor; a brain condition of the donor; and a metabolic rate of the donor; and a display in communication with the processor, the display configured to display at least one of: a temperature of the eutectic cooling blocks configured to maintain the organ at the target temperature during the preservation time; or a position of the eutectic cooling blocks configured to maintain the organ at the target temperature during the preservation time.

In some examples, the processor is configured to determine the target temperature based on two of: the preservation time, the type of the organ, the age of the donor, the circulatory condition of the donor, the brain condition of the donor; and the metabolic rate of the donor. In some examples, the processor is configured to determine the target temperature based on three of: the preservation time, the type of the organ, the age of the donor, the circulatory condition of the donor, the brain condition of the donor; and the metabolic rate of the donor. In some examples, the processor is configured to determine the target temperature based on four of: the preservation time, the type of the organ, the age of the donor, the circulatory condition of the donor, the brain condition of the donor; and the metabolic rate of the donor. In some examples, the processor is configured to determine the target temperature based on five of: the preservation time, the type of the organ, the age of the donor, the circulatory condition of the donor, the brain condition of the donor; and the metabolic rate of the donor. In some examples, the processor is configured to determine the target temperature determined based on the preservation time, the type of the organ, the age of the donor, the circulatory condition of the donor, the brain condition of the donor; and the metabolic rate of the donor. In some examples, the display in on a user device. In some examples, the display is on the transport container. In some examples, the display is configured to display the temperature of the organ. In some examples, the type of organ is a heart, a lung, a kidney, a liver, or a pancreas.

In some examples, the methods described herein can include: providing a transport container containing a canister for containing an organ, wherein the canister includes a canister lid and a wall, and wherein the canister is at least partially filled with preservation solution; positioning at least one first cooling block in the transport container such that the at least one first cooling block is adjacent with the wall of the canister; positioning at least one second cooling block in the transport container such that the at least one second cooling block is adjacent with the canister lid, wherein the at least one first cooling block is engineered to a temperature that is at least 1° C. higher than the temperature of the at least one second cooling block, wherein the at least one first cooling block and the at least one second cooling block are positioned to promote convection between a top portion of the preservation solution and a bottom portion of the preservation solution; sealing an upper lid on the transport container; and transporting the transport container containing the canister, the organ, the at least one first cooling block, and the at least one second cooling block.

In some examples, at least one of the preservation solution or the organ is preserved at a temperature between 4° C. and 8° C. In some examples, the at least one first cooling block is positioned in contact with a bottom portion of the wall and not in contact with a top portion of the wall. In some examples, the top portion of the wall is an uppermost 2 inches of the wall and the bottom portion of the wall is a portion below the uppermost 2 inches of the wall. In some examples, the top portion of the wall is an uppermost 20% of the wall and the bottom portion of the wall is a lowermost 80% of the wall. In some examples, the at least one first cooling block is engineered to a temperature that is at least 2° C. higher than the temperature of the at least one second cooling block. In some examples, the at least one first cooling block is engineered to a temperature of about 3° C. and the at least one second cooling block is engineered to a temperature of about 1° C. In some examples, the at least one first cooling block is engineered to a temperature of between about 1° C. and about 5° C., and wherein the at least one second cooling block is engineered to a temperature of between about −1° C. and about 3° C. In some examples, the top portion of the preservation solution is an uppermost 20%-50% of the preservation solution and the bottom portion of the preservation solution is a lowermost 50%-80% of the preservation solution. In some examples, the organ is a heart or a pancreas. In some examples, the at least one first cooling block and the at least one second cooling block are positioned in a single cavity of the transport container. In some examples, the at least one second cooling block includes at least one eutectic cooling block. In some examples, the at least one first cooling block includes at least one band of eutectic cooling blocks.

In some examples, the systems described herein can include: a rigid canister configured to contain an organ, the rigid canister including a cylindrical wall and a canister lid, wherein the rigid canister is configured to be filled with a preservation fluid; a transport container configured to receive the rigid canister; a first cooling material including a band of first eutectic cooling blocks configured to be disposed within the transport container and substantially surround the cylindrical wall, wherein the first eutectic cooling blocks are engineered to a temperature of about 3° C.; a second cooling material including at least one second eutectic cooling block configured to be disposed within the transport container above the canister lid, wherein the at least one second eutectic cooling block is engineered to a temperature of about 1° C.; and a transport container lid configured to be coupled with the transport container to form an insulated environment within the transport container.

In some examples, when an organ is placed within the rigid canister in the preservation fluid with the canister lid sealed to the cylindrical wall, the rigid canister is received within the transport container, the first cooling material substantially surrounds the cylindrical wall, the second cooling material is disposed above the rigid canister, and the transport container lid is coupled to the transport container to form the insulated environment. In some examples, the system is configured to maintain a substantially uniform temperature throughout the preservation fluid from a top portion to a bottom portion of the rigid canister. In some examples, the substantially uniform temperature is between about 4° C. and 8° C. In some examples, the first cooling material has a top surface that is lower than a bottom surface of the canister lid. In some examples, the organ is a heart or a pancreas. In some examples, the band of first eutectic cooling blocks includes a plurality of cooling blocks coupled together.

In some embodiments, the systems and methods described herein relate to an apparatus substantially as shown and/or described.

In some embodiments, the systems and methods described herein relate to a method substantially as shown and/or described.

In some embodiments, the systems and methods described herein relate to a system substantially as shown and/or described.

In some embodiments, the techniques described herein relate to an apparatus substantially as shown and/or described. In some embodiments, the techniques described herein relate to a method substantially as shown and/or described. In some embodiments, the techniques described herein relate to a system substantially as shown and/or described.

BRIEF DESCRIPTION OF THE DRAWINGS

FIG. 12A shows an example of an organ container at four times with upper cooling media and lateral cooling media of the same temperature.

FIG. 12B shows an example of an organ container at four times with upper cooling media that is cooler than the lateral cooling media.

DETAILED DESCRIPTION

Figure 1A:
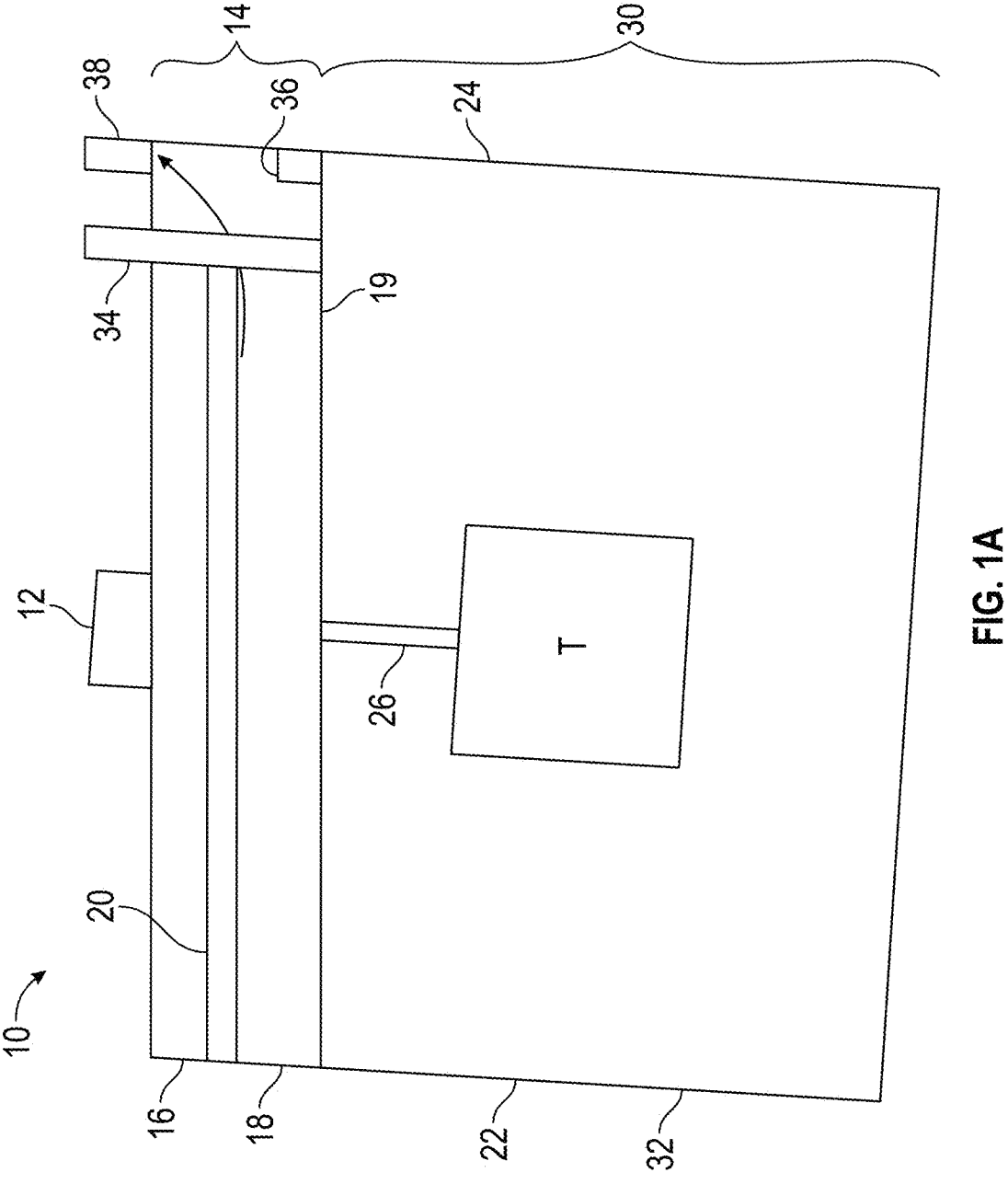
FIG. 1A shows an example of an apparatus for containing an organ.

The disclosed systems and methods for hypothermic transport of samples provide a sterile, temperature-stabilized environment for transporting samples at a target temperature or within a target temperature range. The target temperature can be a temperature that improves outcomes of the organ after transplantation, for example 6-8° C. The target temperature can be personalized based on the donor and/or the organ. Because of these improvements, users of examples of the systems and methods described herein can reliably transport samples over much greater distances, thereby substantially increasing the pool of available tissue donations. Additionally, because the tissues may be in better condition upon delivery, the long-term prognosis for the recipient may be improved.

Hypothermic transport systems such as those described herein can comprise a self-purging preservation apparatus and an insulated transport container. The self-purging preservation apparatus may receive the tissue for transport, and keep it suspended or otherwise supported in a surrounding pool of preservation solution. The self-purging preservation apparatus may comprise a number of configurations suitable to transport tissues hypothermically.

In some embodiments, a transport device may be configured to self-purge excess fluid (e.g., liquid and/or gas). For example, in some embodiments, such a device includes a lid assembly in which at least a portion of the lid assembly is inclined with respect to a horizontal axis. The inclined portion of the lid assembly may be configured to facilitate the flow of fluid towards a vent port disposed at substantially the highest portion of a chamber of the lid assembly. In this manner, excess fluid can escape the device via the purge port. Also in this manner, when excess liquid is expelled from the device via the purge port, an operator of the device can determine that any excess gas has also been purged from the device, or at least from within a tissue chamber of the device, because the gas is lighter than the liquid and will move towards and be expelled via the purge port before excess liquid.

As used in this specification, the singular forms "a," "an" and "the" include plural referents unless the context clearly dictates otherwise. Thus, for example, the term "a fluid" is intended to mean a single fluid or a combination of fluids.

As used herein, "a fluid" refers to a gas, a liquid, or a combination thereof, unless the context clearly dictates otherwise. For example, a fluid can include oxygen, carbon dioxide, or another gas. In another example, a fluid can include a liquid. Specifically, the fluid can be a liquid perfusate. In still another example, the fluid can include a liquid perfusate with a gas, such as oxygen, mixed therein or otherwise diffused therethrough.

As used herein, "tissue" refers to any tissue of a body of a patient, including tissue that is suitable for being replanted or suspected of being suitable for replantation. Tissue can include, for example, muscle tissue, such as, for example, skeletal muscle, smooth muscle, or cardiac muscle. Specifically, tissue can include a group of tissues forming an organ, such as, for example, the skin, lungs, cochlea, heart, bladder, liver, kidney, or other organ. In another example, tissue can include nervous tissue, such as a nerve, the spinal cord, or another component of the peripheral or central nervous system. In still another example, tissue can include a group of tissues forming a bodily appendage, such as an arm, a leg, a hand, a finger, a thumb, a foot, a toe, an ear, genitalia, or another bodily appendage. While the systems are described as relating to the transport of tissues, such as organs, it is also envisioned that the systems could be used for the transport of body fluids, which may be held in another container within the self-purging preservation apparatus. Body fluids may include blood and blood products (whole blood, platelets, red blood cells, etc.) as well as other body fluids for preservation.

Preservation Apparatus

A self-purging preservation apparatus 10 according to an embodiment is schematically illustrated in FIG. 1A. In some embodiments, the self-purging preservation apparatus 10 can be configured to oxygenate a perfusate (not shown) received in a pumping chamber 14 of the self-purging preservation apparatus. The self-purging preservation apparatus 10 can include a valve 12 configured to permit a fluid (e.g., oxygen) to be introduced into a first portion 16 of the pumping chamber 14. A membrane 20 can be disposed between the first portion 16 of the pumping chamber 14 and a second portion 18 of the pumping chamber. The membrane 20 can be configured to permit the flow of a gas between the first portion 16 of the pumping chamber 14 and the second portion 18 of the pumping chamber through the membrane. The membrane 20 can be configured to substantially prevent the flow of a liquid between the second portion 18 of the pumping chamber 14 and the first portion 16 of the pumping chamber through the membrane. In this manner, the membrane can be characterized as being semi-permeable.

A rising fluid in the second portion 18 of the pumping chamber 14 can be directed by the inclined membrane 20 towards a port 38 disposed at the highest portion of the pumping chamber 14, thereby allowing the rising fluid to leave the apparatus during filling or during transport. The vent port 38 can be configured to permit the fluid to flow from the pumping chamber 14 into the atmosphere external to the self-purging preservation apparatus 10. In some embodiments, the vent port 38 can be configured for unidirectional flow, and thus is configured to prevent a fluid from being introduced into the pumping chamber 14 via the port (e.g., from a source external to the self-purging preservation apparatus 10). In some embodiments, the vent port 38 may include a luer lock.

The second portion 18 of the pumping chamber 14 may be configured to receive a fluid. In some embodiments, for example, the second portion 18 of the pumping chamber 14 may be configured to receive a liquid perfusate. The second portion 18 of the pumping chamber 14 can be in fluid communication with an adapter 26. The adapter 26 can be configured to permit movement of the fluid from the pumping chamber 14 to a tissue T. For example, in some embodiments, the pumping chamber 14 can define an aperture (not shown) configured to be in fluidic communication with a lumen (not shown) of the adapter 26. The adapter 26 can be configured to be coupled to the tissue T. The adapter 26 can be coupled to the tissue Tin any suitable manner. For example, in some embodiments, the adapter 26 may be configured to be sutured to the tissue T. In another example, the adapter 26 can be coupleable to the tissue T via an intervening structure, such as silastic or other tubing. In some embodiments, at least a portion of the adapter 26, or the intervening structure, can be configured to be inserted into the tissue T. For example, in some embodiments, the lumen of the adapter 26 (or a lumen of the intervening structure) can be configured to be fluidically coupled to a vessel of the tissue T.

In some embodiments, the adapter 26 may be configured to support the tissue T when the tissue T is coupled to the adapter. For example, in some embodiments, the adapter 26 can include a retention mechanism (not shown) configured to be disposed about at least a portion of the tissue T and to help retain the tissue T with respect to the adapter. The retention mechanism can be, for example, a net, a cage, a sling, or the like. In some embodiments, the self-purging preservation apparatus 10 can include a basket (not shown) or other support mechanism configured to support the tissue T when the tissue T is coupled to the adapter 26 or otherwise received in the self-purging preservation apparatus 10.

The adapter 26 may be of a variety of structures suitable to suspend the tissue T in the preservation solution while minimizing the potential for mechanical damage, e.g., bruising or abrasion. In some embodiments, the adapter 26 can be configured to be sutured to the tissue T. In another example, the adapter 26 can be coupleable to the tissue T via an intervening structure, such as silastic or other tubing. In some embodiments, at least a portion of the adapter 26, or the intervening structure, can be configured to be inserted into the tissue T. In some embodiments, the adapter 26 can be configured to support the tissue T when the tissue T is coupled to the adapter. For example, in some embodiments, the adapter 26 can include a retention mechanism configured to be disposed about at least a portion of the tissue T and to help retain the tissue T with respect to the adapter. The retention mechanism can be, for example, a net, a cage, a sling, or the like.

In some embodiments, a self-purging preservation apparatus may additionally include a basket or other support mechanism configured to support the tissue T when the tissue T is coupled to the adapter 26 or otherwise suspended in the self-purging preservation apparatus. The support mechanism may be part of an insert which fits within the self-purging preservation apparatus. The basket may include connectors which may be flexible or hinged to allow the basket to move in response to mechanical shock, thereby reducing the possibility of damage to tissue T. In other embodiments, the basket may be coupled to the lid assembly so that it is easily immersed in and retracted from the preservation fluid held in the tissue chamber.

A tissue chamber 30 can be configured to receive the tissue T and a fluid. In some embodiments, the self-purging preservation apparatus 10 can include a fill port 34 that is extended through the self-purging preservation apparatus 10 (e.g., through the pumping chamber 14) to the tissue chamber 30. The port 34 can be configured to permit fluid (e.g., perfusate) to be introduced to the tissue chamber 30. In this manner, fluid can be introduced into the tissue chamber 30 as desired by an operator of the self-purging preservation apparatus. For example, in some embodiments, a desired amount of perfusate can be introduced into the tissue chamber 30 via the port 34, such as before disposing the tissue T in the tissue chamber 30 and/or while the tissue T is received in the tissue chamber. In some embodiments, the fill port 34 can be a unidirectional port, and thus configured to prevent the flow of fluid from the tissue chamber 30 to an area external to the tissue chamber through the port. In some embodiments, the fill port 34 may include a luer lock. The tissue chamber 30 may be of any suitable volume necessary for receiving the tissue T and a requisite amount of fluid for maintaining viability of the tissue T. In one embodiment, for example, the volume of the tissue chamber 30 can be approximately 2 liters.

The tissue chamber 30 can be formed by a canister 32 and a bottom portion 19 of the pumping chamber 14. In a similar manner as described above with respect to the membrane 20, an upper portion of the tissue chamber (defined by the bottom portion 19 of the pumping chamber 14) can be inclined from the first side 22 towards the second side 24 of the self-purging preservation apparatus. In this manner, as described in more detail below, a rising fluid in the tissue chamber 30 can be directed by the inclined upper portion of the tissue chamber towards a valve 36 disposed at a highest portion of the tissue chamber. The valve 36 can be configured to permit a fluid to flow from the tissue chamber 30 to the pumping chamber 14. The valve 36 is configured to prevent flow of a fluid from the pumping chamber 14 to the tissue chamber. The valve 36 can be any suitable valve for permitting unidirectional flow of the fluid, including, for example, a ball check valve.

The combination of fill port 34, valve 36, and vent port 38 can allow the apparatus to be quickly and reliably filled with preservation fluid during an organ harvest or some other tissue storage procedure. Once the tissue T has been loaded, i.e., with a coupler, sling, or basket as described elsewhere, the pumping chamber 14 can be affixed to the tissue chamber 30, providing an airtight seal. A tube to a reservoir of perfusion fluid can be connected to the fill port 34 allowing the tissue chamber to be filled directly from the outside. Because of the incline of the bottom portion 19 of the pumping chamber 14, any trapped fluids that are less dense than the preservation fluid (e.g., air) will travel along the bottom portion 19 and move to the pumping chamber 14 via valve 36, that can be a one-way check valve. With the addition of more preservation fluid from the fill port 34, the perfusion fluid can also move from the tissue chamber 30 to the pumping chamber 14, driving any less dense fluid to higher points in the pumping chamber 14. When the pumping chamber 14 can be finally filled with preservation fluid, all of the rising fluids will be driven out of the apparatus via vent port 38. Thus, a user can simply fill the apparatus via fill port 34 and know that the apparatus is filled with preservation fluid and that all rising fluids (i.e., air) has been driven out of the apparatus when preservation fluid first appears at vent port 38. Additionally, this design can conserve preservation fluid ($400/L) when compared to competing designs that immerse an organ in an over-filled preservation fluid, attempting to drive air out of the system as the lid is placed on the device.

The canister 32 can be a rigid canister. The canister 32 can be constructed of any durable materials that are suitable for use with a medical device. For example, it can be constructed of stainless steel. In other embodiments, because it is beneficial to be able to view the contents directly, the lid 6 and storage vessel may be constructed of medical acrylic (e.g., PMMA) or another clear medical polymer. In some embodiments, the canister 32 can be constructed of a material that permits an operator of the self-purging preservation apparatus 10 to view at least one of the tissue T or the perfusate received in the tissue chamber 30. For example, in some embodiments, the canister 32 is substantially transparent. In another example, in some embodiments, the canister 32 can be substantially translucent. The tissue chamber 30 can be of any suitable shape and/or size. For example, in some embodiments, the tissue chamber 30 can have a perimeter that is substantially oblong, oval, round, square, rectangular, cylindrical, or another suitable shape. Additionally, the self-purging preservation apparatus can be constructed of materials that conduct heat so that the sample within the container is adequately cooled by the cooling media (see discussion below).

It can be additionally beneficial for the storage vessel, lid without a pumping chamber, and adapter to be sterilizable, i.e., made of a material that can be sterilized by steam (autoclave) or with UV irradiation, or another form of sterilization. Sterilization can prevent tissues from becoming infected with viruses, bacteria, etc., during transport. In a typical embodiment the self-purging preservation apparatus can be delivered in a sterile condition and sealed in sterile packaging. In some embodiments, the self-purging preservation apparatus can be sterilized after use prior to reuse, for example at a hospital. In other embodiments, the self-purging preservation apparatus can be disposable.

In use, the tissue T can be coupled to the adapter 26. The pumping chamber 14 can be coupled to the canister 32 such that the tissue T is received in the tissue chamber 30. In some embodiments, the pumping chamber 14 and the canister 32 can be coupled such that the tissue chamber 30 is hermetically sealed. A desired amount of perfusate is introduced into the tissue chamber 30 via the port 34. The tissue chamber 30 can be filled with the perfusate such that the perfusate volume rises to the highest portion of the tissue chamber. The tissue chamber 30 can be filled with an additional amount of perfusate such that the perfusate flows from the tissue chamber 30 through the valve 36 into the second portion 18 of the pumping chamber 14. The tissue chamber 30 can continue to be filled with additional perfusate until all atmospheric gas that initially filled the second portion 18 of the pumping chamber 14 rises along the inclined membrane 20 and escapes through the port 38. Because the gas can be expelled from the pumping chamber 14 via the port 38 before any excess perfusate is expelled (due to gas being lighter, and thus more easily expelled, than liquid), an operator of the self-purging preservation apparatus 10 can determine that substantially all excess gas has been expelled from the pumping chamber when excess perfusate is released via the port. As such, the self-purging preservation apparatus 10 can be characterized as self-purging. When perfusate begins to flow out of the port 38, the self-purging preservation apparatus 10 is in a "purged" state (i.e., all atmospheric gas initially within the tissue chamber 30 and the second portion 18 of the pumping chamber 14 has been replaced by perfusate). When the purged state is reached, the operator can close both ports 34 and 38, preparing the self-purging preservation apparatus 10 for operation.

Oxygen (or another suitable fluid, e.g., dry air) can be introduced into the first portion 16 of the pumping chamber 14 via the valve 12. A positive pressure generated by the introduction of oxygen into the pumping chamber 14 can cause the oxygen to be diffused through the semi-permeable membrane 20 into the second portion 18 of the pumping chamber. Because oxygen is a gas, the oxygen can expand to substantially fill the first portion 16 of the pumping chamber 14. As such, substantially the entire surface area of the membrane 20 between the first portion 16 and the second portion 18 of the pumping chamber 14 can be used to diffuse the oxygen. The oxygen can be diffused through the membrane 20 into the perfusate received in the second portion 18 of the pumping chamber 14, thereby oxygenating the perfusate.

In the presence of the positive pressure, the oxygenated perfusate can be moved from the second portion 18 of the pumping chamber 14 into the tissue T via the adapter 26. For example, the positive pressure can cause the perfusate to move from the pumping chamber 14 through the lumen of the adapter 26 into the vessel of the tissue T. The positive pressure can also be configured to help move the perfusate through the tissue T such that the tissue T is perfused with oxygenated perfusate.

After the perfusate is perfused through the tissue T, the perfusate can be received in the tissue chamber 30. In this manner, the perfusate that has been perfused through the tissue T is combined with perfusate previously disposed in the tissue chamber 30. In some embodiments, the volume of perfusate received from the tissue T following perfusion combined with the volume of perfusate previously disposed in the tissue chamber 30 can exceed a volume (e.g., a maximum fluid capacity) of the tissue chamber 30. A portion of the tissue chamber 30 can be flexible and expands to accept this excess volume. The valve 12 can then allow oxygen to vent from the first portion 16 of the pumping chamber 14, thus, reducing the pressure in the pumping chamber 14. As the pressure in the pumping chamber 14 drops, the flexible portion of the tissue chamber 30 can relax, and the excess perfusate can be moved through the valve 36 into the pumping chamber 14. The cycle of oxygenating perfusate and perfusing the tissue T with the oxygenated perfusate can be repeated as desired.

In various embodiments, cooling blocks may include eutectic cooling media or other phase change material (PCM) such as savENRG packs with PCM HS01P material commercially available from RGEES, LLC or Akuratemp, LLC (Arden, NC). Exemplary PCM specifications including a freezing temperature of 0° C.+/0.5° C., a melting temperature of 1° C.+/0.75° C., latent heat of 310 J/g+/10 J/g, and density of 0.95 gram/ml+/0.05 gram/ml. Pouch dimensions may vary depending on application specifics such as tissue to be transported and the internal dimensions of the transport container and external dimensions of the tissue storage device, chamber, or canister. PCM may be included in pouches approximately 10 inches by 6 inches having approximately 230 g of PCM therein. Pouches may be approximately 8.5 mm thick and weigh about 235 g to 247 g. In some embodiments, pouches may be approximately 6.25 inches by 7.75 inches with a thickness of less than about 8.5 mm and a weight of between about 193 g and about 201 g. Other exemplary dimensions may include about 6.25 inches by about 10 inches. Pouches may be stacked or layered, for example in groups of 3 or 4 to increase the total thickness and amount of PCM. In certain embodiments, PCM containing pouches may be joined side to side to form a band of coupled PCM pouches. Such a band may be readily manipulated to wrap around the circumference of a cylindrical storage container and may have dimensions of about 6 inches by about 26 inches consisting of approximately 8 individual pouches joined together in the band.

A variety of preservation solutions can be used with the disclosed systems, devices, and methods. This includes approved preservation solutions, such as Histidine Tryptophan Ketoglutarate (HTK) (e.g., HTK Custodial™) and Celsior™ solutions for the preservation of hearts and cardiac tissues, and University of Wisconsin Solution (Viaspan™) and MPS 1 for the preservation of kidney and kidney tissues. Other preservation solutions, including non approved solutions, and off label applications of approved solutions can be used with the devices described herein. Various preservation solutions can be used, including Collins, EuroCollins, phosphate buffered sucrose (PBS), University of Wisconsin (UW) (e.g., Belzer Machine Preservation Solution (MPS)), histidine tryptophan ketoglutarate (HTK), hypertonic citrate, hydroxyethyl starch, and Celsior™. Additional details of these solutions can be found at t'Hart et al. "New Solutions in Organ Preservation," Transplantation Reviews 2006, vol. 16, pp. 131 141 (2006).

In examples, the systems, methods, and apparatuses described herein for hypothermic transport of tissues described herein may provide for the transport of biological samples (e.g., tissue, organs, or body fluids) over long distances and time periods while maintaining a temperature of 6-8° C. For example, temperature may be controlled for at least about 6 h, 12 h, 24 h, 48 h, or more time. Systems of the disclosure can enable medical professionals to keep tissues (e.g., organs) in a favorable hypothermic environment for extended periods of time, thereby allowing more time between harvest and transplant.

The canister 32 can be constructed of any suitable material. In some embodiments, the canister 32 is constructed of a material that permits an operator of the apparatus 10 to view at least one of the tissue T or the perfusate received in the organ chamber. For example, in some embodiments, the canister 32 is substantially transparent. In another example, in some embodiments, the canister 32 is substantially translucent. Lastly, in certain examples, the canister may be opaque to obscure viewing of the tissue. The organ chamber 17 can be of any suitable shape and/or size. For example, in some embodiments, the organ chamber 17 can have a perimeter that is substantially oblong, oval, round, square, rectangular, cylindrical, or another suitable shape. The canister 32 and organ rest 18 can be plastic. The apparatus 10 can be easily transportable.

Figure 1B:
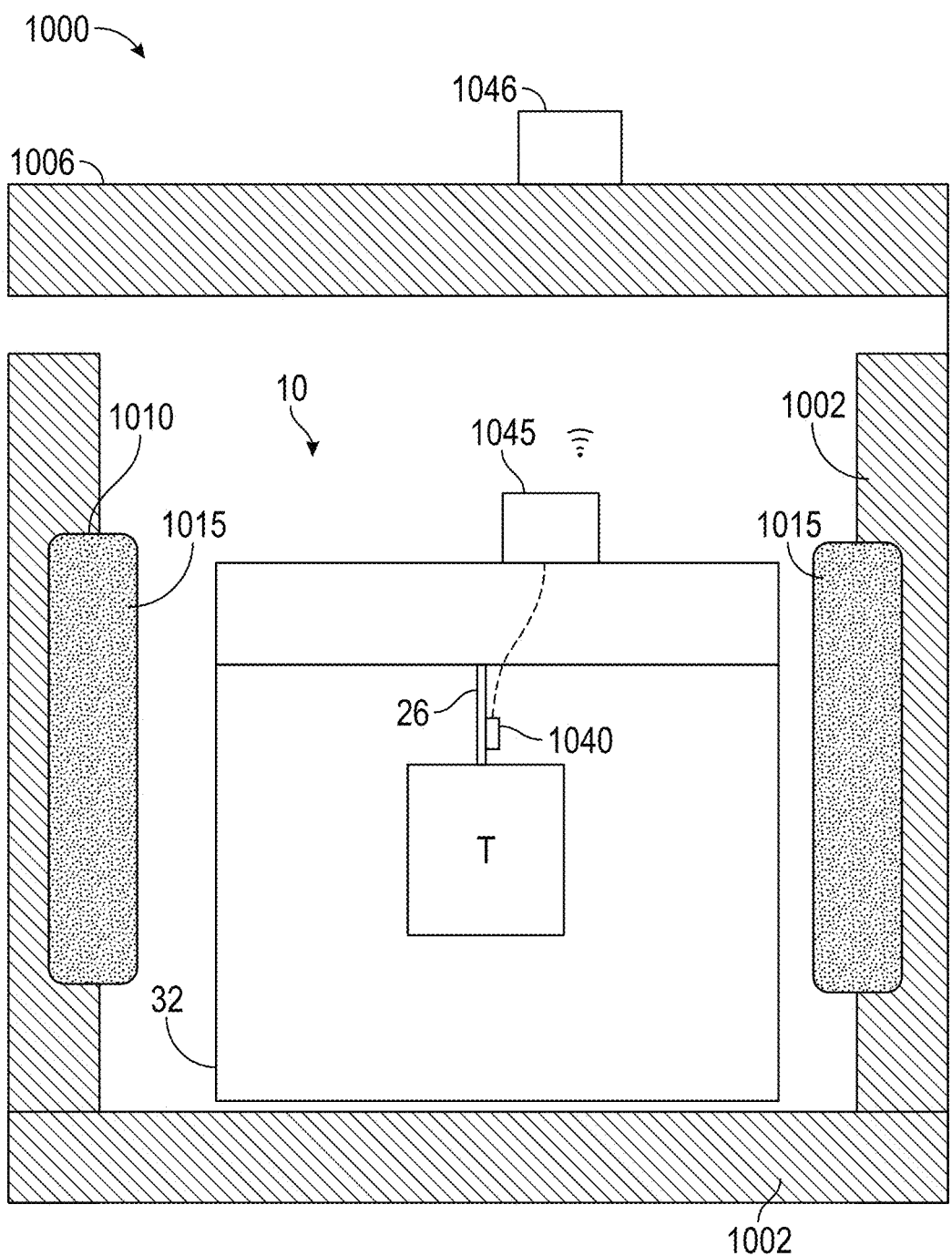
FIG. 1B shows an example of an insulated transport container containing the apparatus of FIG. 1A.

FIG. 1B shows an example of an insulated transport container 1000 containing the apparatus 10 of FIG. 1A.

The temperature sensor 1040 may be any temperature reading device that can be sterilized and maintained in cold fluidic environment, i.e., the environment within the static self-purging preservation apparatus during transport of tissue T. The temperature sensor 1040 may be a thermocouple, a thermistor, infrared thermometer, or liquid crystal thermometer. When a static self-purging preservation apparatus is sealed, temperature sensor 1040 is typically disposed in contact with the cold preservation solution and in proximity to the tissue T such that a temperature of the tissue T can be ascertained during transport. Temperature display 1045 may be coupled to the temperature sensor 1040 using any suitable method, for example a wire, cable, connector, or wirelessly using available wireless protocols. In some embodiments, the temperature sensor 1040 may be attached to the adapter 26. In some embodiment, the temperature sensor 1040 is incorporated into the adapter 26 to improve the mechanical stability of the temperature sensor 1040. The temperature sensor 1040 may be positioned on the organ. The temperature sensor 1040 may be positioned above and/or beneath the organ. The temperature sensor 1040 may be positioned on the inside of a wall of the canister 32. Another temperature sensor may be positioned outside the apparatus 10 and/or outside the transport container 1000.

In addition to the temperature sensor, systems of the invention may include one or more temperature displays. As shown in FIG. 1B, the temperature display 1045 can be any display suitable for displaying a temperature measured by the temperature sensor 1040, or otherwise providing information about the temperature within the static self-purging preservation apparatus. For example, the temperature display can be a light emitting diode (LED) display or liquid crystal display (LCD) showing digits corresponding to a measured temperature. The display may alternatively comprise one or more indicator lights, for example an LED which turns on or off or flashes to indicated whether the temperature measured by the temperature sensor 1040 is within an acceptable range, e.g., 6-8° C., e.g., 4-6° C., e.g., about 6.4° C. The temperature sensor 1040 may also be connected to a processor (not shown) which can compare the measured temperature to a threshold or range and create an alert signal when the temperature exceeds the threshold or range. For example, the apparatus 10 can display an alert when the temperature is above 7.5° C. or below 6.5° C. In some embodiments, the apparatus 10 can display an alert when the temperature is above 7.8° C. or below 6.2° C. The alert may comprise an audible tone, or may signal to a networked device, e.g., a computer, cell phone, or pager that the temperature within the container exceeds the desired threshold or range.

A complete system for hypothermic transport of tissues, comprising a self-purging preservation apparatus 10 and an insulated transport container 1000 is shown in FIG. 1B. The insulated transport container 1000 can include an insulated vessel 1002 and an insulated lid 1006. The insulated vessel has at least one recess 1010 configured to hold a cooling medium 1015. As shown in FIG. 1B, a sealed static self-purging preservation apparatus 100 can be placed in insulated vessel 1002 along with cooling media 1015, and the insulated lid 1006 can be placed on insulated vessel 1002 forming a temperature-regulated environment for transport of tissue. The cooling media 1015 can be placed above or below the apparatus 10 within the insulated transport container 1000. The cooling media 1015 can wrap around the apparatus 10.

The insulated vessel 1002 and the insulated lid 1006 can both comprise an insulating material that is effective in maintaining the temperature inside the insulated transport container 1000. A suitable insulating material may be any of a number of rigid polymer foams with high R values, such as polystyrene foams (e.g., STYROFOAM™), polyurethane foams, polyvinyl chloride foams, poly(acrylonitrile)(butadiene)(styrene) foams, or polyisocyanurate foams. Other materials, such as spun fiberglass, cellulose, or vermiculite could also be used. The insulating vessel 1002 can be constructed to provide a close fit for the self-purging preservation apparatus, thereby affording additional mechanical protection to the self-purging preservation apparatus and the tissues contained therein. In some embodiments, the insulated vessel 1002 and the insulated lid 1006 will be constructed of a closed-cell foam that can prevent absorption of liquids, for example water, body fluids, preservation fluid, saline, etc. In some embodiments, the insulated transport container 1000 can include a water-resistant lining (not shown) to facilitate cleaning the insulated transport container 1000 after use. In some embodiments, the lining can be removable and disposable. While not shown in FIG. 1B, the insulated vessel 1002 and the insulated lid 1006 may have a hard shell on the exterior to protect the insulating material from damage or puncture. The hard shell may be formed of metal (e.g., aluminum or steel) or of a durable rigid plastic (e.g., PVC or ABS). The hard shell may have antibacterial properties through the use of antibacterial coatings or by incorporation of metal that have innate antibacterial properties (e.g., silver or copper).

While not shown in FIG. 1B, the insulated vessel 1002 and the insulated lid 1006 may be connected with a hinge, hasp, clasp, or other suitable connector. The insulated vessel 1002 and the insulated lid 1006 may also close with a press-fit. The insulated transport container 1000 may include an insulating seal to make to make an air- or water-tight coupling between the insulated vessel 1002 and the insulated lid 1006. However, the insulated lid 1006 may not need to be sealed to the insulated vessel 1002 for the insulated transport container 1000 to maintain a suitable temperature during transport. In some embodiments, the insulated vessel 1002 and the insulated lid 1006 may be coupled with a combination lock or a tamper-evident device. The insulated vessel 1002 and/or the insulated lid 1006 may additionally comprise a handle or a hand-hold or facilitate moving the insulated transport container 1000 when loaded with a self-purging preservation apparatus 100. While not shown in FIG. 1B, in some embodiments, insulated vessel 1002 may additionally have external wheels (e.g., castor wheels or in-line skate type wheels). The insulated vessel 1002 may also have a rollaboard-type retractable handle to facilitate moving the system between modes of transport or around a hospital or other medical facility.

In some embodiments, such as shown in FIG. 1B, the insulated transport container 1000 may comprise a second temperature display 46 which can display a temperature measured by the temperature sensor 1040 to a user. The second temperature display 1046 may receive measurements of temperature within the static self-purging preservation apparatus 10 via a wired or a wireless connection. In the embodiment shown in FIG. 1B, an electronics package on the lid assembly may be coupled to the temperature display 1045 and comprise a wireless transmitter that communicates with a receiver coupled to the second temperature display 1046. This configuration may avoid a user having to make a connection between the temperature sensor 1040 and the second temperature display 1046 after the self-purging preservation apparatus 10 has been placed in the insulated vessel. The insulated transport container 1000 may additionally comprise displays for additional relevant information, such as time since harvest, pressure inside the self-purging preservation apparatus 10, partial pressure of oxygen, or oxygen consumption rate of the biological sample.

The system may use any of a number of cooling media 1015 to maintain the temperature inside the insulated transport container 1000 during transport. As shown in FIG. 1B, the cooling media 1015 may comprise eutectic cooling blocks, which have been engineered to have a stable temperature between 1-10° C., for example. The cooling media 1015 may be arranged in recess 1010 in the interior of the insulated vessel 1002. The recess 1010 may be a slot, such as shown in FIG. 1B, or the recess may be a press-fit, or the cooling media 1015 may be coupled to the walls of the insulated vessel 1002 using a snap, screw, hook and loop, or another suitable connecter. Eutectic cooling media suitable for use with the invention is available from TCP Reliable Inc. Edison, NJ 08837, as well as other suppliers. Other media, such as containerized water, containerized water-alcohol mixtures, or containerized water-glycol mixtures may also be used.

The PCM container may not be rigid, for example the cooling media may be contained in a bag which is placed in the recess 1010. Using the cooling media 1015, e.g., eutectic cooling blocks, the systems described herein may be capable of maintaining the temperature of the sample in the range of 6-8° C. for at least 60 minutes, e.g., for greater than 4 hours, for greater than 6 hours, for greater than 8 hours, for greater than 12 hours, or for greater than 16 hours. Using the cooling media 1015, e.g., eutectic cooling blocks, the systems described herein may be capable of maintaining the temperature of the sample in the range of 4-6° C. for at least 60 minutes, e.g., for greater than 3 hours, for greater than 4 hours, for greater than 8 hours, for greater than 12 hours, or for greater than 16 hours. Using the cooling media 1015, e.g., eutectic cooling blocks, the systems described herein may be capable of maintaining the temperature of the sample in the range of 5.4-7.4° C. for at least 60 minutes, e.g., for greater than 3 hours, for greater than 4 hours, for greater than 8 hours, for greater than 12 hours, or for greater than 16 hours. Using the cooling media 1015, e.g., eutectic cooling blocks, the systems described herein may be capable of maintaining the temperature of the sample in the range of 5.9-6.9° C. for at least 60 minutes, e.g., for greater than 3 hours, for greater than 4 hours, for greater than 8 hours, for greater than 12 hours, or for greater than 16 hours. Using the cooling media 1015, e.g., eutectic cooling blocks, the systems described herein may be capable of maintaining the temperature of the sample in a temperature range input by a user for at least 60 minutes, e.g., for greater than 3 hours, for greater than 4 hours, for greater than 8 hours, for greater than 12 hours, or for greater than 16 hours. Using the cooling media 1015, e.g., eutectic cooling blocks, the systems described herein may be capable of maintaining the temperature of the sample in a temperature range determined by a processor for at least 60 minutes, e.g., for greater than 3 hours, for greater than 4 hours, for greater than 8 hours, for greater than 12 hours, or for greater than 16 hours.

Cooling Media

In various embodiments, cooling blocks may include eutectic cooling media or other phase change material (PCM) such as savENRG packs with PCM-HS01P material commercially available from RGEES, LLC or Akuratemp, LLC (Arden, NC). Exemplary PCM specifications including a freezing temperature of 0° C.+/−0.5° C., a melting temperature of 1° C.+/−0.75° C., latent heat of 310 J/g+/−10 J/g, and density of 0.95 gram/ml+/−0.05 gram/ml. Pouch dimensions may vary depending on application specifics such as tissue to be transported and the internal dimensions of the transport container and external dimensions of the tissue storage device, chamber, or canister. PCM may be included in pouches approximately 10 inches by 6 inches having approximately 230 g of PCM therein. Pouches may be approximately 8.5 mm thick and weigh about 235 g to 247 g. In some embodiments, pouches may be approximately 6.25 inches by 7.75 inches with a thickness of less than about 8.5 mm and a weight of between about 193 g and about 201 g. Other exemplary dimensions may include about 6.25 inches by about 10 inches. Pouches may be stacked or layered, for example in groups of 3 or 4 to increase the total thickness and amount of PCM. In certain embodiments, PCM containing pouches may be joined side to side to form a band of coupled PCM pouches. Such a band may be readily manipulated to wrap around the circumference of a cylindrical storage container and may have dimensions of about 6 inches by about 26 inches consisting of approximately 8 individual pouches joined together in the band.

Enhanced Temperature Range

In some embodiments, cooling blocks of a specific temperature can be positioned in the transport container 1000 such that the organ is preserved at approximately 6.4° C. during the preservation time. In some embodiments, cooling blocks of a specific temperature can be positioned in the transport container 1000 such that the organ is preserved at a temperature of at least 6° C. and less than or equal to 8° C. during the preservation time. In some embodiments, cooling blocks of a specific temperature can be positioned in the transport container 1000 such that the organ is preserved at 4-6° C. during the preservation time. In some embodiments, cooling blocks of a specific temperature can be positioned in the transport container 1000 such that the organ is preserved at 8-12° C. during the preservation time. In some embodiments, cooling blocks of a specific temperature can be positioned in the transport container 1000 such that the organ is preserved at 4-8° C. during the preservation time. In some embodiments, the organ can be preserved such that an average temperature during the preservation time is between 6° C. and 8° C. In some embodiments, the organ can be preserved such that an average temperature during the preservation time is between 6° C. and 7° C. In some embodiments, the organ can be preserved such that an average temperature during the preservation time is between 6.2° C. and 6.8° C.

Advantageously, preserving an organ at a target temperature can affect the rate of severe primary graft disfunction, 2 year survival, right ventricular disfunction of a heart, Intensive Care Unit length of stay, and/or days taking inotropes. In some implementations, storing a heart at 6-8° C. throughout the entirety of preservation can benefit the functionality of the heart after transplantation. In some implementations, storing an organ at 6-8° C. can be beneficial for shorter preservation times, while storing an organ at 4-6° C. can be beneficial for longer preservation times. In some embodiments, the system can determine a target temperature of 6-8° C. if the preservation time is below a threshold. In some embodiments, the system can determine a target temperature of 4-6° C. if the preservation time is above a threshold. In some embodiments, the threshold can be 1 hour, 2 hours, 3 hours, 4 hours, 5 hours, 6 hours, 7 hours, 8 hours, 9 hours, 10 hours, 11 hours, or 12 hours. Target temperature can be maintained with low relative variability. For example, the system can preserve the organ in a controlled manner, creating less disparate maximums and minimums, for example by avoiding extreme maximums and minimums.

Patient-Specific Temperature

In some embodiments, the system can preserve an organ according to a target temperature profile. The target temperature profile can be the temperature, for example a temperature inside the canister 32, as it changes over the preservation time. For example, the system can cool at colder temperatures at the beginning of preservation. The system can cool at warmer temperatures toward the end of preservation. For example, the system can warm to 6-8° C. for the end of preservation. The end of preservation can be the last 30 minutes to an hour. The end of preservation can be the last 15 minutes to 2 hours. The end of preservation can be the last 5 minutes to 5 hours. In some embodiments, the system can warm to 15-25° C. for the end of preservation. In some embodiments, the system can warm to 5-30° C. for the end of preservation. In some embodiments, the system can warm to 8-12° C. for the end of preservation.

In some embodiments, a user can input a target temperature range for the organ during preservation. In some embodiments, a user can input factors for determining an optimal temperature range. These factors can include a preservation time, a type of the organ, an age of the donor, a circulatory condition of the donor, a brain condition of the donor, a transportation distance, a peak or average altitude of transportation, a metabolic rate of the organ, and/or a metabolic rate of the donor.

The preservation time, or ischemic time, can be a predicted duration during which the organ is preserved. The preservation time can be based on the distance to the patient or facility receiving the organ. Preserving an organ for a longer time can require a different hypothermic state than preserving an organ for a shorter period of time. A higher preservation time can result in a lower target temperature. A lower preservation time can result in a higher target temperature.

The type of organ can affect the target temperature for preservation. For example, a heart, a lung, a kidney, a liver, a pancreas, a stomach, and an intestine may be preserved at different target temperatures. For example, a lung can be preserved at a higher temperature than other organs. In some examples, a heart, a lung, a kidney, a liver, or a pancreas can be preserved at a lower temperature. In some examples, the type of organ can be factored into the target temperature based on a desired organ-specific temperature determined by a surgeon or medical professional.

The age of the donor can affect the target temperature for preservation. For example, an organ of an older patient can require a lower target temperature than a younger patient. An organ of an older patient can be preserved at a different hypothermic state than a younger patient. In some embodiments, an organ of an older patient can require a higher target temperature than a younger patient. The age can be a chronological age or a biological age. Biological age may not be tied to chronological age. In some embodiments, biological age may be determined through genetic testing of a donor.

The circulatory condition of the donor can affect the target temperature for preservation. For example, an organ of a patient that suffered from cardiac death can require a lower target temperature than an organ of a patient that has a functional circulatory and/or respiratory system. An organ of a patient that suffered from cardiac death can require a different hypothermic state than an organ of a patient that has a functional circulatory and/or respiratory system.

The brain condition of the donor can affect the target temperature for preservation. For example, an organ of a patient that suffered from brain death can require a lower target temperature than an organ of a patient that has a functional neurological system. An organ of a patient that suffered from brain death can require a different hypothermic state than an organ of a patient that has a functional neurological system.

The transportation distance can affect the target temperature for preservation. For example, a longer transportation distance can require a lower target temperature of organ preservation than a shorter distance. An organ of a patient that must travel a further distance can be preserved at a different hypothermic state than an organ traveling a shorter distance. This can account for various modes of transport as well as potential changes or delays in real time.

The peak or average altitude can affect the target temperature for preservation. For example, a higher peak or average altitude can require a lower target temperature of organ preservation than a shorter peak or average altitude. An organ of a patient that must travel at a higher altitude can be preserved at a different hypothermic state than an organ traveling a lower altitude.

The metabolic rate of the organ can affect the target temperature for preservation. For example, an organ with a slower metabolism can require a lower target temperature than an organ with a faster metabolism. An organ with a slower metabolism can be preserved at a different hypothermic state than an organ with a faster metabolism.

The metabolic rate of the donor can affect the target temperature for preservation. For example, an organ of a patient with a slower metabolism can require a lower target temperature than a patient with a faster metabolism. An organ of a patient with a slower metabolism can be preserved at a different hypothermic state than a patient with a faster metabolism.

Algorithm or AI-Determined Temperature Range

In some embodiments, the system described herein can use an algorithm to determine a target temperature based on a preservation time, a type of the organ, an age of the donor, a circulatory condition of the donor, a brain condition of the donor, a transportation distance, a peak or average altitude of transportation, a metabolic rate of the organ, and/or a metabolic rate of the donor. The algorithm can determine to store an organ at 4-6° C. if colder preservation is advantageous and at 6-8° C. if warmer preservation is advantageous. In some embodiments, the algorithm can determine to store the organ at 0-2° C., 2-4° C., 4-6° C., 6-8° C., 10-12° C., 12-14° C., a range within the ranges described herein, or a combination of the ranges described herein based on the factors.

In some embodiments, the system described herein can use artificial intelligence (AI), for example machine learning (ML), to determine a target temperature based on a preservation time, a type of the organ, an age of the donor, a circulatory condition of the donor, a brain condition of the donor, a transportation distance, a peak or average altitude of transportation, a metabolic rate of the organ, and/or a metabolic rate of the donor. The AI can be trained on a dataset including a preservation time, a type of the organ, an age of the donor, a circulatory condition of the donor, a brain condition of the donor, a transportation distance, a peak or average altitude of transportation, a metabolic rate of the organ, and/or a metabolic rate of the donor for a set of donors and/or organs. The dataset can include results of transplantation, for example outcomes of the recipients. ML can determine to store an organ at 4-6° C. if colder preservation is advantageous and at 6-8° C. if warmer preservation is advantageous. In some embodiments, ML can determine to store the organ at 0-2° C., 2-4° C., 4-6° C., 6-8° C., 10-12° C., 12-14° C., a range within the ranges described herein, or a combination of the ranges described herein based on the factors.

In some embodiments, Deep Learning (DL) methods, ML methods, and AI methods can be used to analyze donor information, organ information, and/or recipient information. In an example, this analysis can comprise feature extraction and classification. In some embodiments, ML methods can comprise feature extraction and learning from raw data. In some embodiments, the ML method can receive an input of a large training set to learn to ignore variations that could otherwise skew the results of the method. In some embodiments, DL can comprise a Neural Network (NN) with three or more layers that can improve the accuracy of determinations. Advantageously, in some embodiments, DL can obviate the need for pre-processing data and, instead, process raw data. For example, while a human may input a hierarchy of important features of donor information, organ information, and/or recipient information for a ML algorithm to make determinations, DL algorithms can determine which features are important and use these features to make determinations. Advantageously, in some embodiments, a DL algorithm can adjust itself for accuracy and precision. In some embodiments, ML and DL algorithms can perform supervised learning, unsupervised learning, and reinforcement learning.

In some embodiments, NN approaches, including convolutional neural networks (CNN) and recurrent convolutional neural networks (RCNN), among others, can be used to analyze information in a manner similar to high-level cognitive functions of a human mind. In some embodiments, a NN approach can comprise training an object recognition system with organ donor and organ recipient information in order to teach it patterns related to the organs that correlate with particular labels. In some embodiments, a CNN can comprise a NN where the nodes of each layer are clustered, the clusters overlap, and each cluster feeds data to multiple nodes of the next layer. In some embodiments, a RCNN can comprise a CNN where recurrent connections are incorporated in each convolutional layer. Advantageously, in some embodiments, the recurrent connections can make object recognition a dynamic process despite the fact that the input is static.

In some embodiments, input to the AI and/or ML algorithms can include donor information (or characteristics), for example, one or more of age, gender, body mass index (BMI), medication, blood pressure, heart rate, height, weight, race, whether the donor is a smoker or non-smoker, body habitus (for example, the "physique" or "body type" which may be based on a wide range of factors), medical history, diabetes, hypertension, dietary habits, drug history, family history of disease, information relating to other previously collected donor information, exercise habits, drinking habits, lifestyle information, or lab results, and the like. In an example where a NN is used, the NN can be trained using information from a plurality of donors, where the information for each donor can include one or more donor characteristics.

The transport container 1000, apparatus 10, or a separate device, can include a processor that can determine the target temperature for preservation of the organ. The processor can use any one of or any combination of the preservation time, type of organ, age of the donor, circulatory condition of the donor, brain condition of the donor, or metabolic rate of the donor to determine the target temperature for preservation. These factors can be input by a user, measured from the organ, or imported from a database. The processor can communicate the target temperature to a user device. The processor can display the target temperature on the apparatus 10. The processor can control a temperature maintenance component to maintain the organ at the target temperature. In some examples, the apparatus 10 can communicate with a computer or mobile application. For example, the apparatus 10 can communicate measurements from sensors using wireless or Bluetooth communication. In some examples, the computer or mobile application can determine and/or display the target temperature. In some examples, the processor can be located remotely from the apparatus 10 and/or the computer or mobile device. In some examples, the determination can be made using cloud computing. In some examples, the processor, as well as the systems and methods for communication between the devices are described in U.S. application Ser. No. 18/119,653, titled "Organ transport tracking" and filed Mar. 9, 2023, and incorporated in its entirety herein.

Temperature Changing Systems

In some embodiments, the apparatus 10 can display to the user which temperature cooling blocks should be positioned in the transport container. In some embodiments, the cooling blocks can be inside the canister 32. In some embodiments, a processor can communicate to a user device which temperature cooling blocks should be positioned in the canister 32. For example, the system may determine that cooling blocks with a temperature of approximately 0° C., 1° C., 2° C., 3° C., 4° C., 5° C., 6° C., 7° C., and/or 8° C. should be used. In some embodiments, the system may determine that cooling blocks with a temperature of between 0° C. and 8° C. should be used. In some embodiments, the system may determine that cooling blocks with a temperature of between −2° C. and 10° C. should be used. In some embodiments, the system may determine that cooling blocks with a temperature of between −5° C. and 15° C. should be used.

In some embodiments, the apparatus 10 can display to the user which position the cooling blocks should be placed in the canister 32. In some embodiments, a processor can communicate to a user device which position the cooling blocks should be placed in the canister 32. For example, the processor may determine that one or more cooling blocks should be positioned in a slot next to the organ, above the organ, and/or below the organ. In some embodiments, the processor may determine that cooling blocks of different temperatures should be placed in different positions.

In some embodiments, the apparatus 10 can maintain the organ at the target temperature or within the target temperature range using a temperature maintenance component. The temperature maintenance component can be a solution with a specific phase transition temperature. The solution with the specific phase transition temperature can transfer heat with the interior of the canister to regulate temperature within the desired range. The temperature maintenance component can be an electronic heating component and/or an electronic cooling component.

The temperature maintenance component can be a radiation element inside or outside the canister 32. The radiation element can be an infrared heating lamp, an infrared heating panel, a quartz radiant heater, a ceramic infrared heater, and/or a carbon fiber heating component. The radiation element can emit radiation that penetrates the walls of the canister 32 to transfer heat to the interior of the canister. The temperature maintenance component can be a heat conduction element inside or outside the canister 32. The heat conduction element can be metal heating bands, a heat transfer fluid circulation system, heat conductive plates or sheets, heat transfer adhesive films, and/or thermal conductive material. The heat conduction element can generate heat, for example when electric current is passed through the heat conduction element. The heat conduction element can heat the surface of the canister 32 to heat the interior of the canister 32 through conduction.

The temperature maintenance component can be a temperature port. The temperature port can be configured to intake air from the exterior of the canister 32. The temperature port can close to insulate the temperature inside the canister 32. The temperature port can open to intake air from the ambient environment to affect the temperature inside the canister 32. In some embodiments, the apparatus 10 can include a second temperature sensor outside the canister 32. A processor can determine that the temperature of the ambient environment is higher than the temperature in the canister 32. The processor can open the temperature port to intake air to increase the temperature in the canister 32.

The apparatus 10 can regulate pressure within the canister 32. For example, the canister 32 can be rigid such that changes in ambient pressure do not affect the organ. The apparatus 10 can preserve the organ at constant pressure. In some embodiments, the apparatus 10 can mechanically maintain pressure consistent with the physiological environment of the pericardium. In some embodiments, the apparatus 10 can maintain a pressure of between 2 mmHg and 6 mmHg during preservation. In some embodiments, the apparatus 10 can maintain a pressure of between 5 mmHg and 20 mmHg during preservation. In some embodiments, the apparatus 10 can maintain a pressure of between 10 mmHg and 20 mmHg during preservation. In some embodiments, the apparatus 10 can maintain a pressure of approximately 15 mmHg during preservation. In some embodiments, the apparatus 10 can maintain a pressure in the canister 32 such that pressure does not change more than 1 mmHg during the preservation time. In some embodiments, the apparatus 10 can maintain a pressure in the canister 32 such that pressure does not change more than 3 mmHg during the preservation time. In some embodiments, the apparatus 10 can maintain a pressure in the canister 32 such that pressure does not change more than 5 mmHg during the preservation time. In some embodiments, the system can maintain absolute constant pressure. For example, the system can maintain pressure regardless of the altitude of the transport container.

The apparatus 10 can include a water column. The water column can exert consistent pressure on the myocardial cellular structures during preservation. The water column can be a constant height of preservation solution above the heart. For example, this can include preservation solution in the canister 38 and/or in the lid assembly.

Temperature Regulation Systems

Figure 2A:
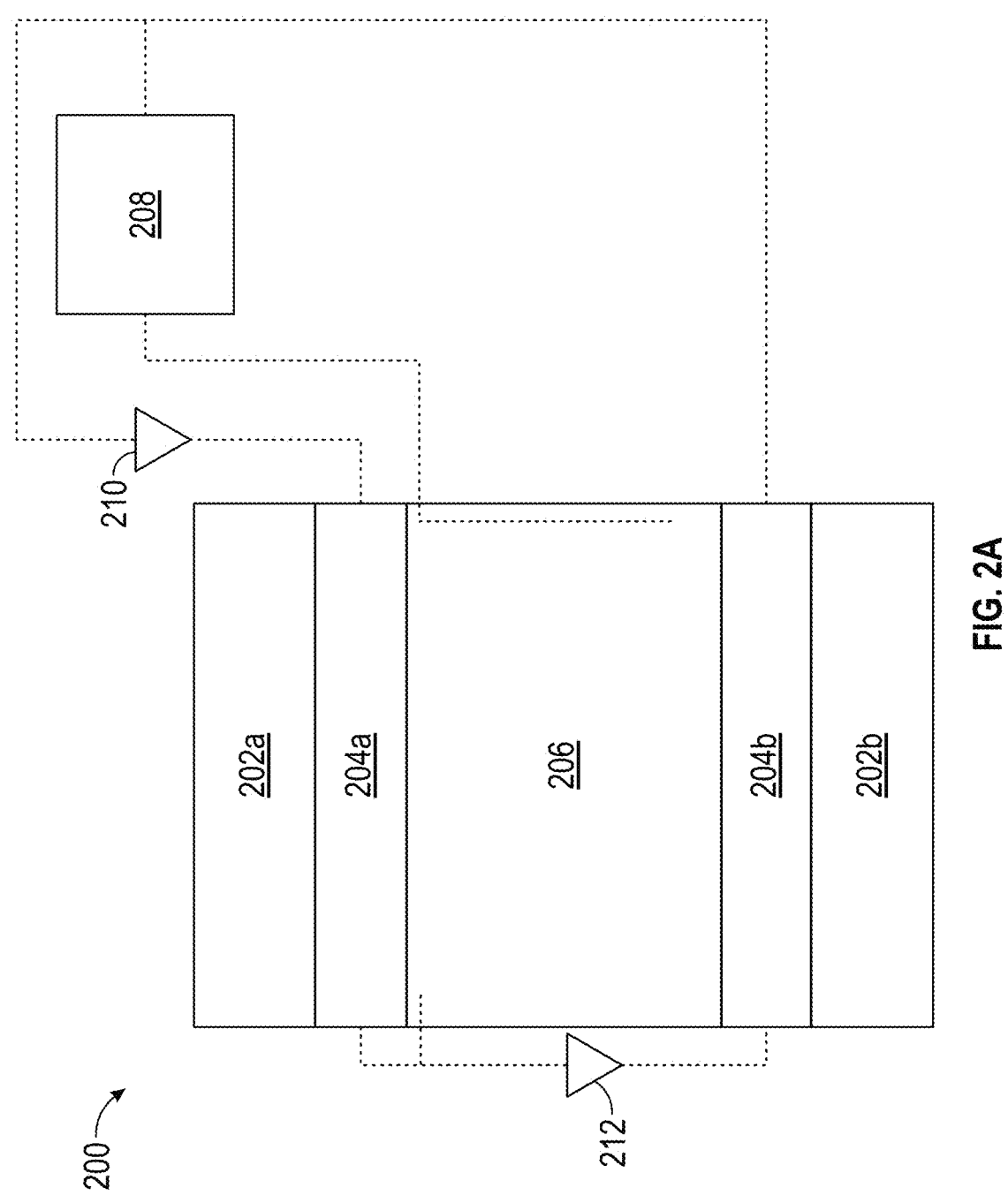
FIG. 2A shows an example of a temperature regulation system for regulating the temperature of an organ during preservation.

FIG. 2A shows an example of a temperature regulation system 200 for regulating the temperature of an organ during preservation.

The temperature regulation system 200 can include an organ container 206. The organ container 206 can be similar to the canister 32 of FIGS. 1A and 1B. The temperature regulation system 200 can include a temperature maintenance component 202a above the organ container 206. The temperature regulation system 200 can include a temperature maintenance component 202b below the organ container 206. The temperature regulation system 200 can include a heat exchanger 204a above the organ container 206. The temperature regulation system 200 can include a heat exchanger 204b below the organ container 206. The temperature regulation system 200 can include a pump 208 configured to pump fluid from the top of the organ container 206 to the bottom of the organ container 206.

The temperature regulation system 200 can include a pump 208 configured to pump fluid from the bottom of the organ container 206 to the top of the organ container 206. In some embodiments, the temperature regulation system 200 can include a pump 208 configured to pump fluid from above the organ container 206 to below the organ container 206. The temperature regulation system 200 can include a pump 208 configured to pump fluid from below the organ container 206 to above the organ container 206.

Gravity can cause colder preservation fluid to sink to the bottom of the organ container 206. In some implementations, the pump 208 can selectively carry preservation fluid from the bottom of the organ container 206 to the top of the organ container 206 during preservation. Carrying colder preservation fluid from the bottom of the organ container 206 to the top of the organ container 206 can reduce the temperature of the organ during preservation.

The temperature regulation system 200 can include a one-way valve 210 configured to allow fluid to pass from the lower heat exchanger 204b to the upper heat exchanger 204a and/or the top of the organ container 206. The temperature regulation system 200 can include a one-way valve 212 configured to allow fluid to pass from the upper heat exchanger 204a and/or the top of the organ container 206 to the lower heat exchanger 204b.

The upper temperature maintenance component 202a can be a material with a temperature of 0-8° C. The lower temperature maintenance component 202b can be a material with at approximately room temperature. In some embodiments, the lower temperature maintenance component 202b can be a material with a temperature of 0-8° C. In some embodiments, the lower temperature maintenance component 202b can have a higher temperature than the upper temperature maintenance component 202a.

The lower heat exchanger 204b can be filled with preservation fluid that is cooler than the preservation fluid in the organ container 206. The upper heat exchanger 204a can be filled with preservation fluid that is cooler than the preservation fluid in the organ container 206. In some embodiments, the upper heat exchanger 204a can be filled with preservation fluid that is warmer than the preservation fluid in the organ container 206. In some embodiments, the upper heat exchanger 204a can be filled with preservation fluid that is warmer than the preservation fluid in the lower heat exchanger 204b.

The temperature of the lower heat exchanger 204b can be regulated by the lower temperature maintenance component 202b. The lower heat exchanger 204b can be cooled by the lower temperature maintenance component 202b. The temperature of the upper heat exchanger 204a can be regulated by the upper temperature maintenance component 202a. The upper heat exchanger 204a can be cooled by the upper temperature maintenance component 202a.

The direction of flow, and/or whether the fluid is warmed or cooled, can be changed by reversing the direction of the pump. The valves 210, 212 can be mechanical one-way valves. In some embodiments, the valves 210, 212 can be programmed valves. The heat exchangers 204a,b may not be inherently warm or cold. The heat exchangers 204a,b may be thermally conductive components that are in contact with temperature maintenance components 202a,b.

Figure 2B:
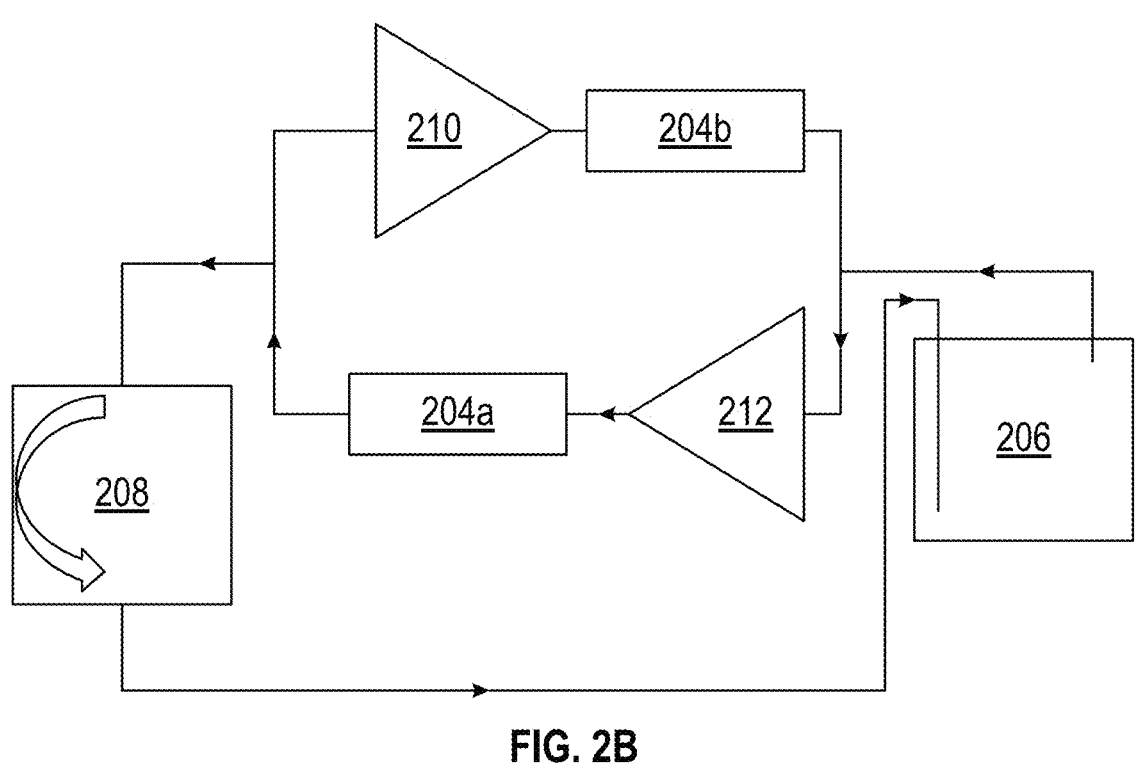
FIG. 2B shows a schematic of the temperature regulation system of FIG. 2A while increasing the temperature of an organ during preservation.
Figure 2C:
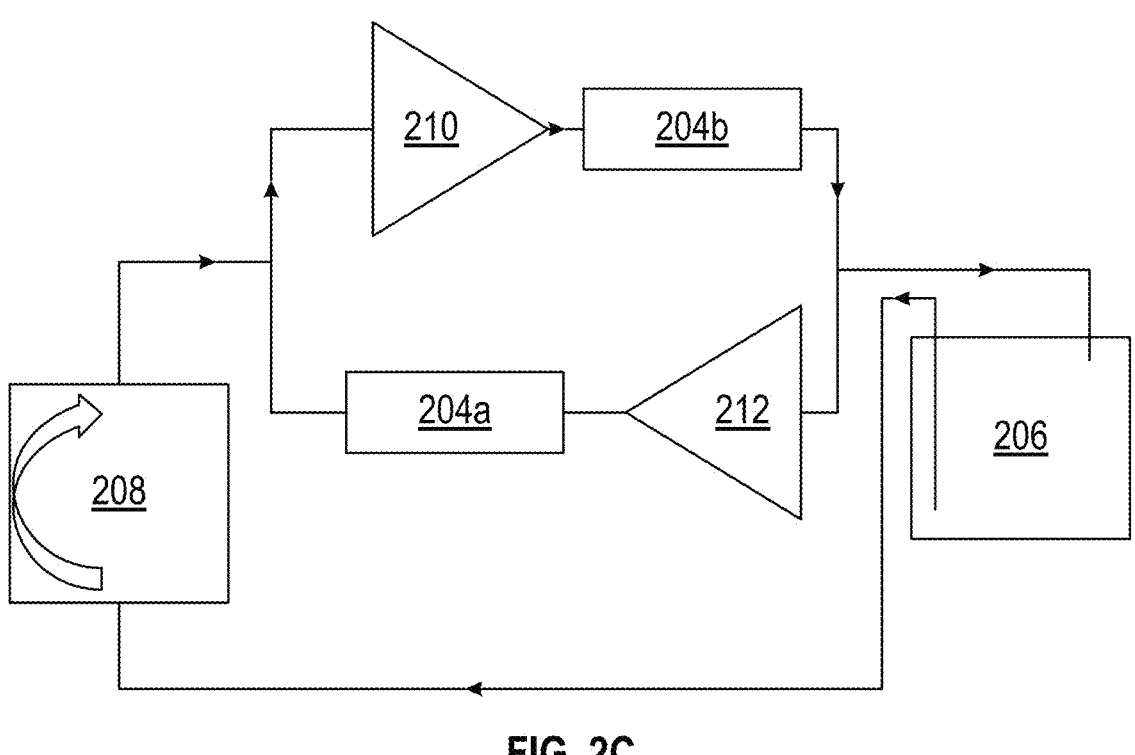
FIG. 2C shows a schematic of the temperature regulation system of FIG. 2A while decreasing the temperature of an organ during preservation.
Figure 2D:
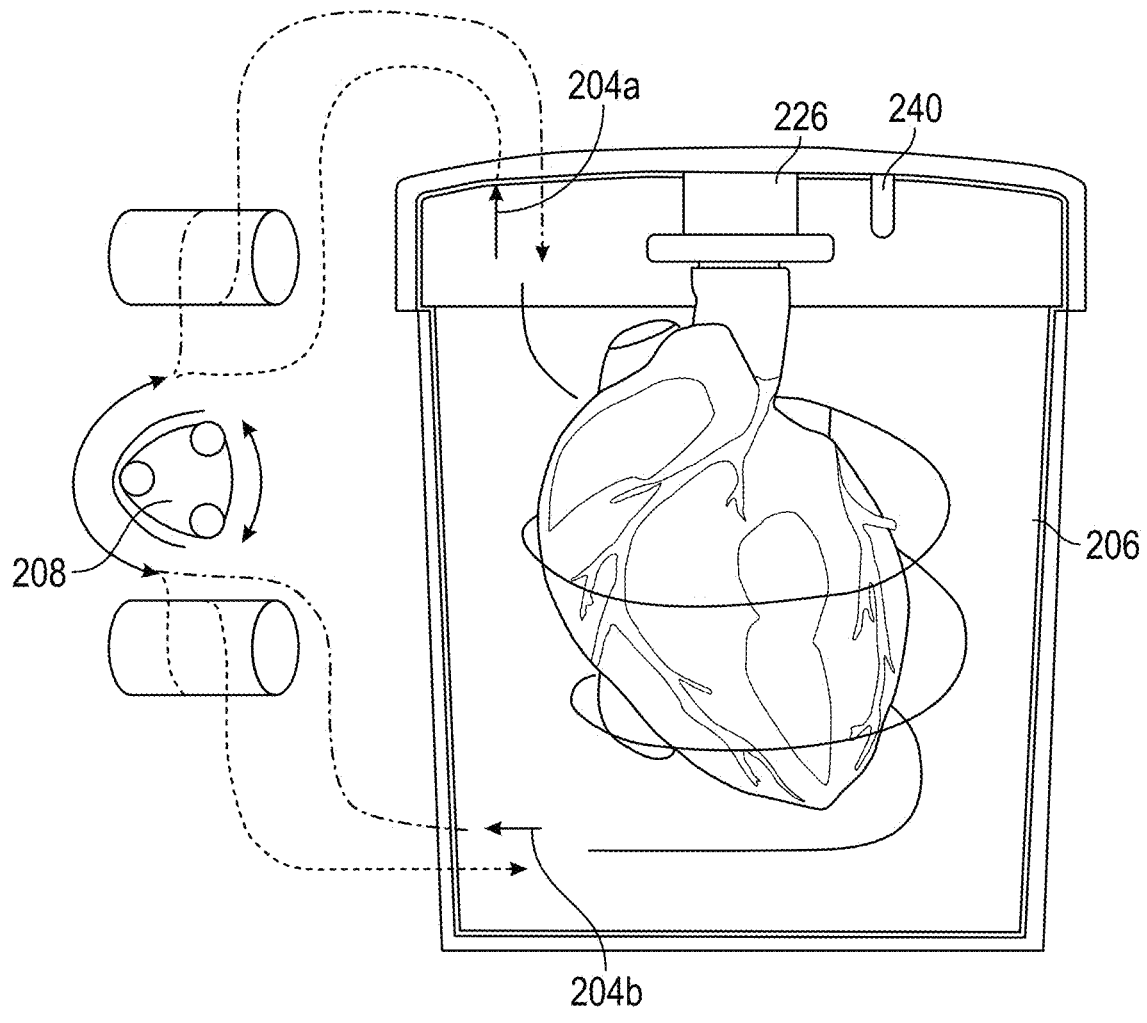
FIG. 2D shows an example of an organ container with the temperature regulation system of FIG. 2A.

FIG. 2B shows a schematic of the temperature regulation system 200 of FIG. 2A while increasing the temperature of an organ during preservation. FIG. 2C shows a schematic of the temperature regulation system 200 of FIG. 2A while decreasing the temperature of an organ during preservation. FIG. 2D shows an example of an organ container 206 with the temperature regulation system 200 of FIG. 2A.

A user can control the direction of the pump 208. In some embodiments, the direction of the pump 208 can be controlled automatically by a processor. The direction of the pump 208 can be changed to adjust the temperature in the organ container 206. In some embodiments, operating the pump in one direction can heat the organ container 206 and operating the pump in another direction can cool the organ container 206. In some embodiments, operating the pump in one direction can cool the organ container 206 by 0-2° C. and operating the pump in another direction can cool the organ container 206 by 0-5° C. In some embodiments, operating the pump in one direction can cool the organ container 206 by 0-4° C. and operating the pump in another direction can cool the organ container 206 by 0-8° C. In some embodiments, operating the pump in one direction can adjust the temperature in the organ container 206 to 6-8° C. and operating the pump in another direction can adjust the temperature in the organ container 206 to 4-6° C. In some embodiments, operating the pump in one direction can adjust the temperature in the organ container 206 to 4-8° C. and operating the pump in another direction can adjust the temperature in the organ container 206 to 2-6° C.

As shown in FIG. 2B, when the pump 208 operates in a first direction, the fluid can be pumped through the upper heat exchanger 204a. Fluid can be pulled from the organ container 206 and through the valve 212. Fluid can be pumped through the upper heat exchanger 204a, which may be the warmer heat exchanger. Fluid can flow back into the organ container 206 after exchanging heat with the upper heat exchanger 204a. In some embodiments, fluid from the upper heat exchanger 204a can flow to the organ container 206.

As shown in FIG. 2C, when the pump 208 operates in a second direction, the fluid can be pumped through the lower heat exchanger 204b. Fluid can be pulled from the organ container 206 and through the valve 210. Fluid can be pumped through the lower heat exchanger 204b, which may be the cooler heat exchanger. Fluid can flow back into the organ container 206 after exchanging heat with the lower heat exchanger 204b. In some embodiments, fluid from the lower heat exchanger 204b can flow to the organ container 206.

As shown in FIG. 2D, a temperature sensor 240 may be positioned in the lid assembly, for example on the bottom of the lid. FIG. 2D shows an organ container 206 containing a heart using the temperature system shown with respect to FIGS. 2A-2C. In some embodiments, a temperature sensor 240 may be positioned in the upper heat exchanger 204a. The organ adapter 226 may be positioned in the lid assembly. In some embodiments, the organ adapter 226 may be positioned in the upper heat exchanger 204a.

The system can circulate the fluid for homogenous cooling to accomplish a target range. The circulation can work in a manner that leverages the fact that colder fluid will sink to the bottom and warmer fluid will rise to the top. To cool down the system, fluid from the bottom can be drawn upwards. To warm up the system, warmer fluid can be drawn from the top of the canister. The pump can flow in the direction that will provide this intended outcome. Flow rates can vary based on the intended target and time period.

Figure 3A:
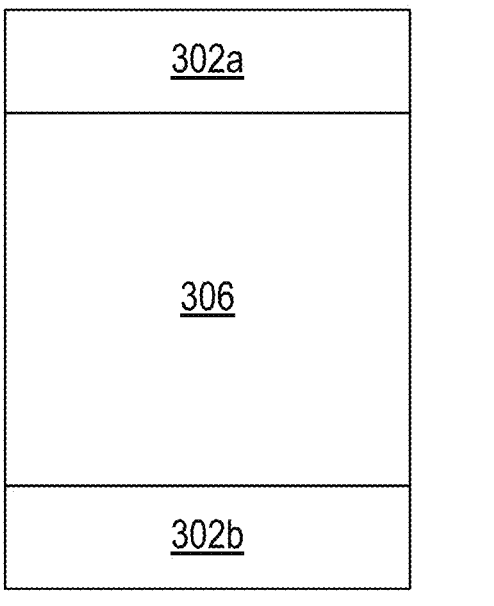
FIG. 3A shows an example of a temperature regulation system that can use gravity to regulate temperature at a first time.
Figure 3B:
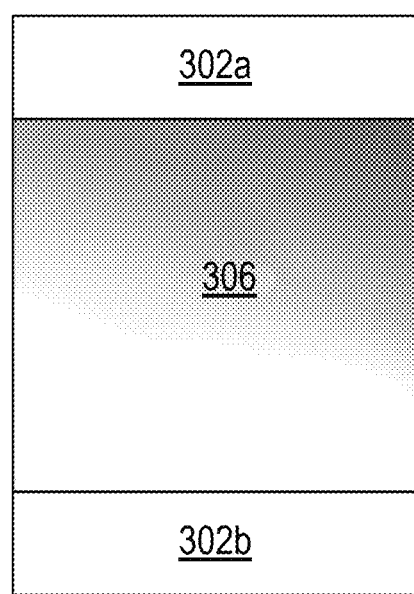
FIG. 3B shows the temperature regulation system that can use gravity to regulate temperature of FIG. 3A at a second time.
Figure 3C:
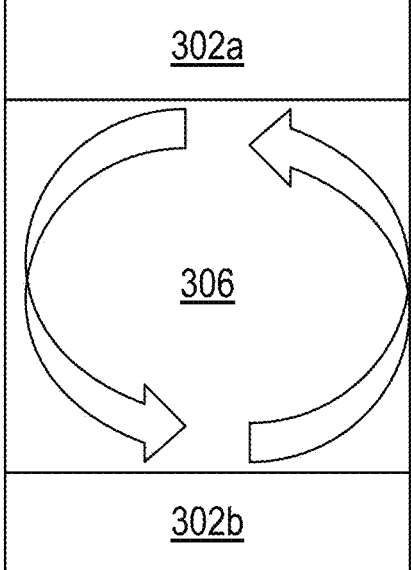
FIG. 3C shows the temperature regulation system that can use gravity to regulate temperature of FIG. 3A at a third time.
Figure 3D:
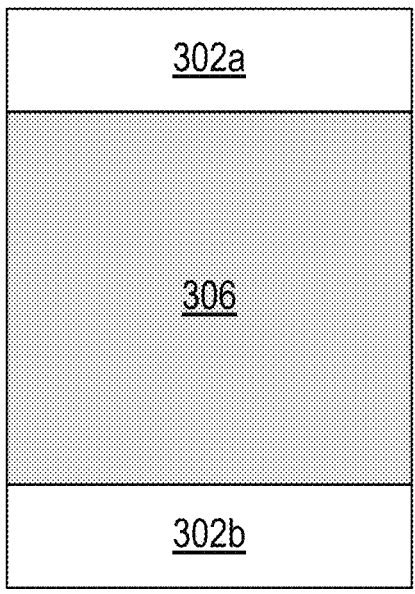
FIG. 3D shows the temperature regulation system that can use gravity to regulate temperature of FIG. 3A at a fourth time.

FIG. 3A shows an example of a temperature regulation system 300 that can use gravity to regulate temperature at a first time. FIG. 3B shows the temperature regulation system 300 that can use gravity to regulate temperature of FIG. 3A at a second time. FIG. 3C shows the temperature regulation system 300 that can use gravity to regulate temperature of FIG. 3A at a third time. FIG. 3D shows the temperature regulation system 300 that can use gravity to regulate temperature of FIG. 3A at a fourth time.

The temperature regulation system 300 can include an organ container 306. A cold temperature maintenance component 302a can be positioned above the organ container 306. A warm temperature maintenance component 302b can be positioned below the organ container 306.

The cold temperature maintenance component 302a can be a cooling material. The cold temperature maintenance component 302a can be one or more eutectic cooling blocks with a temperature of 1-5° C. In some embodiments, the eutectic cooling blocks can have a temperature of 0-8° C. The cold temperature maintenance component 302a can have a lower temperature than the warm temperature maintenance component 302b. The cold temperature maintenance component 302a can be a temperature maintenance component as described with respect to FIGS. 1A and 1B.

The warm temperature maintenance component 302b can be a cooling material. The warm temperature maintenance component 302b can be one or more eutectic cooling blocks with a temperature of 3-10° C. In some embodiments, the eutectic cooling blocks can have a temperature of 1-12° C. The warm temperature maintenance component 302b can have a higher temperature than the cold temperature maintenance component 302a. The warm temperature maintenance component 302b can be a temperature maintenance component as described with respect to FIGS. 1A and 1B. The warm temperature maintenance component 302b can be a heating component.

At a first time, as shown in FIG. 3A, the organ container 306 can contain a preservation solution with a homogenous temperature. The preservation solution in the organ container 306 can be materially unaffected by the temperature of the cold temperature maintenance component 302a and the warm temperature maintenance component 302b.

At a second time, as shown in FIG. 3B, the preservation solution at the top of the organ container 306 can be colder, denser preservation solution. The colder, denser solution can be shown by the shading in FIG. 3B. The preservation solution at the bottom of the organ container 306 can be warmer, less dense preservation solution.

At a third time, as shown in FIG. 3C, the preservation solution in the organ container 306 can mix. Gravity can pull on the denser solution, causing the colder, denser preservation solution to sink and the warmer, less dense preservation solution to rise.

At a fourth time, as shown in FIG. 3D, the preservation solution in the organ container 306 can have a homogeneous temperature after mixing. The preservation solution at the fourth time can be cooler or the same temperature as the preservation solution at the first time. The cooler homogenous temperature can be shown by the shading in FIG. 3D. In some embodiments, the homogeneous temperature after mixing can be 6-8° C. In some embodiments, the homogeneous temperature after mixing can be 4-6° C. and/or 4-8° C.

FIGS. 4-8 shows data generated by using organ transports systems and methods as described herein, such as the systems and methods described in relation to FIGS. 1-3. FIGS. 4-8 were generated by plotting the incidence of the postoperative parameter on the y-axis (Rate of Severe, PGD, 2-year survival, RV preservation, Mean ICU length of stay, Mean inotrope score) against the average temperature (x-axis). The average temperature was calculated from the data available through our logger and in the digital app session. The average for each specific case was calculated by averaging the temperatures across the length of a specific case. And then that average was used to calculate the average across all cases.

Temperature Data

The results presented in FIGS. 4-8 were generated using human clinical data from the GUARDIAN heart registry. Data was generated by plotting the incidence of PGD on the y-axis against the average temperature (x-axis). The average temperature was calculated from the data available through a digital application and a logger. The average for each specific case was calculated by averaging the temperatures across the length of a specific case. The average for each case was used to calculate the average across all cases. PGD includes improper functioning of the heart after transplantation. PGD includes immune rejection, infection, ischemia-reperfusion injury, surgical complications, poor heart quality, and/or other issues with the heart.

Considering the experimental results presented in FIGS. 4-9 below, once of skill in the art will understand that maintaining an organ at a temperature of 6-8° C. using the systems and methods described herein may lead to unexpected, improved outcomes (such as viability and a number of other parameters) as demonstrated below.

Figure 4:
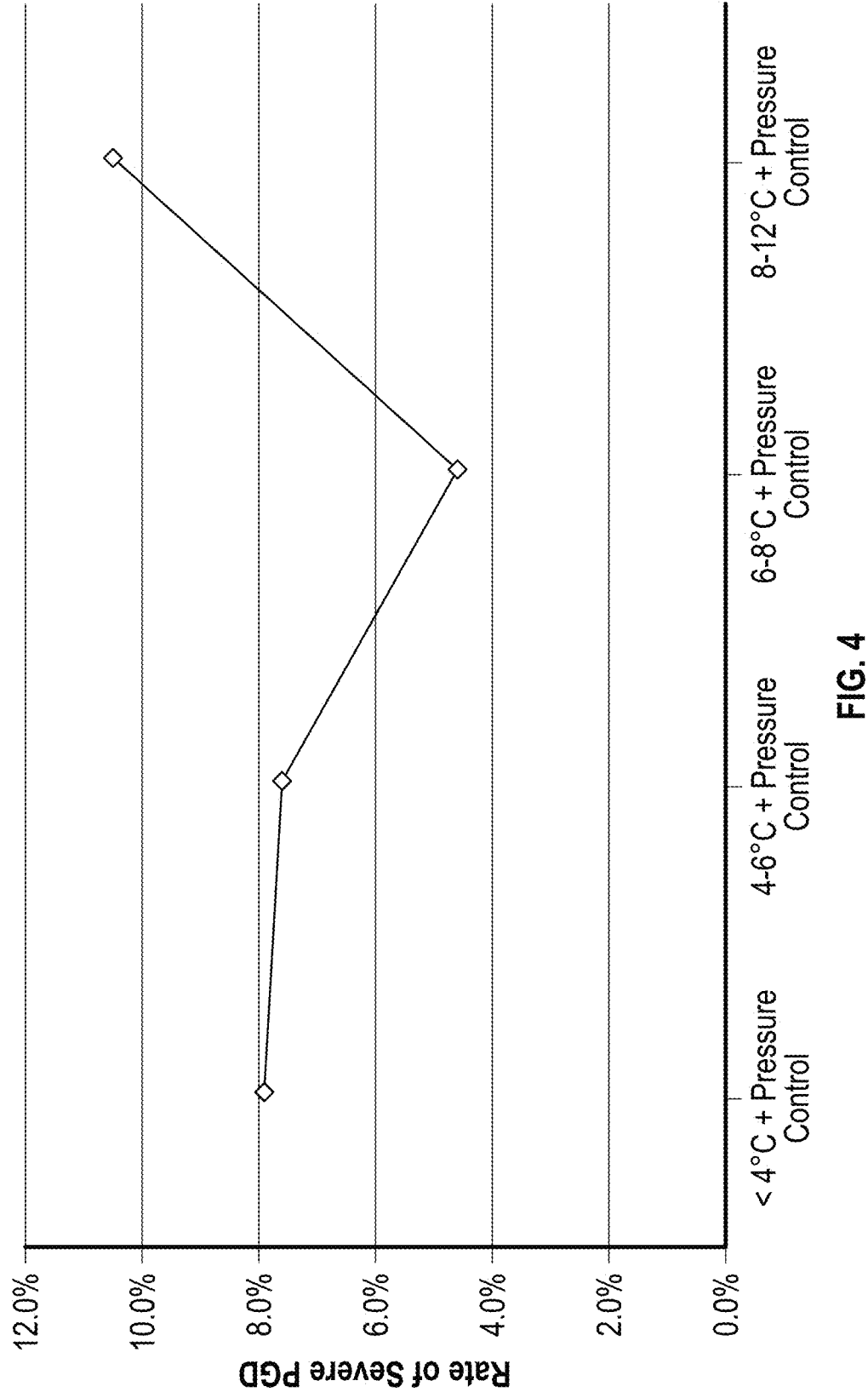
FIG. 4 shows a graph of risk of severe post graft disfunction (PGD) for hearts preserved at different temperatures under constant pressure.

FIG. 4 shows a graph of risk of severe post graft disfunction (PGD) for hearts preserved at different temperatures under constant pressure. The hearts were stored for approximately 3.5-4 hours and approximately constant pressure was maintained within the container. As shown in the graph, hearts stored at less than 4° C. (such as at 3.3° C. here) had a risk of PGD of approximately 7.9%. Hearts stored at 4-6° C. (such as at 4.9° C. here) had a risk of PGD of approximately 7.6%. Hearts stored at 6-8° C. (such as 6.7° C.) had a risk of PGD of approximately 4.6%. A heart stored at 8-12° C. (such as 8.5° C.) had a risk of PGD of approximately 10.5%. As evidenced by the data presented in FIG. 4, storing the heart at 6-8° C. caused the heart to have a much lower risk of PGD than at less than 4° C., 4-6° C., 8-12° C., 4-8° C., 8-12° C., and/or 4-12° C.

Figure 5:
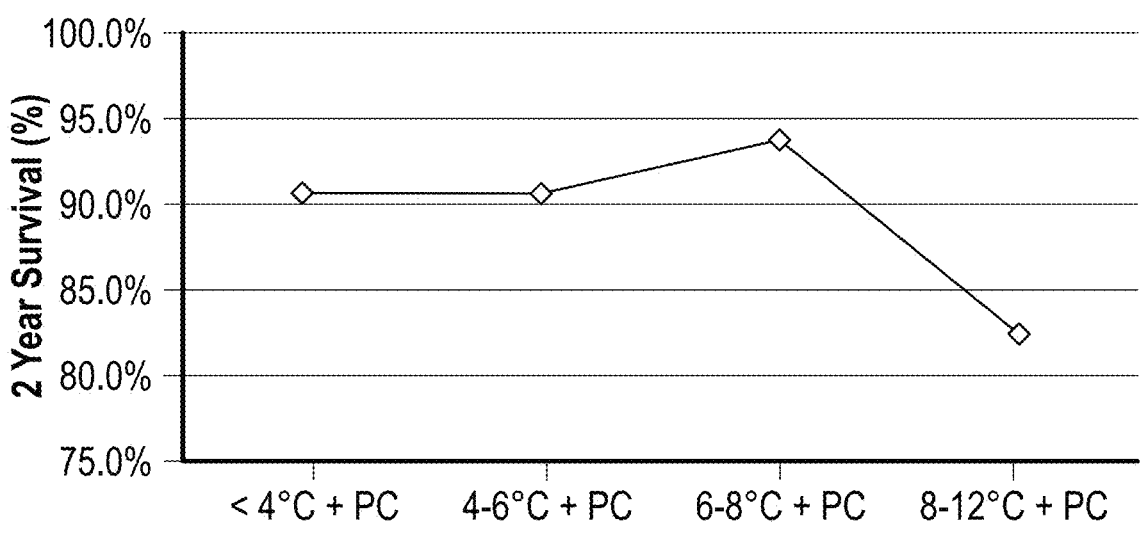
FIG. 5 shows a graph of chance of two year survival for recipients of hearts preserved at different temperatures under constant pressure.

FIG. 5 shows a graph of chance of two-year survival for recipients of hearts preserved at different temperatures under constant pressure.

The graph shows data acquired during use of an organ transport system such as the methods and systems described herein. All data was generated using human clinical data from the GUARDIAN heart registry. Data was generated by plotting the incidence of two year survival on the y-axis against the average temperature (x-axis). The average temperature was calculated from the data available through a digital application and a logger. The average for each specific case was calculated by averaging the temperatures across the length of a specific case. The average for each case was used to calculate the average across all cases. Patients who receive hearts stored at less than 4° C. have a 90.6% chance of surviving for two years or greater. Patients who receive hearts stored at 4-6° C. have a 90.6% chance of surviving for two years or greater. Patients who receive hearts stored at 6-8° C. have a 93.8% chance of surviving for two years or greater. Patients who receive hearts stored at 8-12° C. have an 82.4% chance of surviving for two years or greater. Similar to the data shown in FIG. 5, storing the heart at 6-8° C. can cause the recipient to have a higher chance of surviving two years or greater than at less than 4° C., 4-6° C., 8-12° C., 4-8° C., 8-12° C., and/or 4-12° C. As with the data collected for FIG. 5, the pressure within the heart container was regulated such that pressure is approximately constant.

Figure 6:
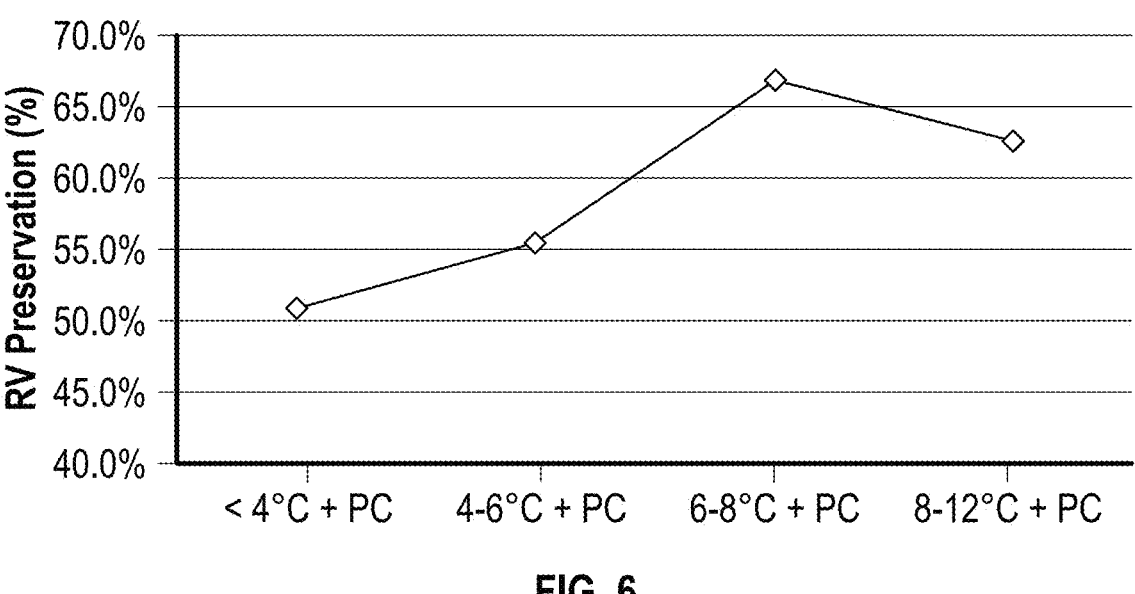
FIG. 6 shows a graph of chance of right ventricle preservation for hearts preserved at different temperatures under constant pressure.

FIG. 6 shows a graph of chance of right ventricle preservation for hearts preserved at different temperatures under constant pressure.

The graph shows data acquired during use of an organ transport system such as the methods and systems described herein. The results presented in FIG. 6 were generated by plotting the incidence of right ventricle preservation on the y-axis against the average temperature (x-axis). The average temperature was calculated from the data available through a digital application and a logger. The average for each specific case was calculated by averaging the temperatures across the length of a specific case. The average for each case was used to calculate the average across all cases. Right ventricle preservation can indicate proper functioning of the right ventricle of the heart. Right ventricle function assessment includes echocardiography, hemodynamic monitoring, and visual inspection.

As shown in FIG. 6, a heart stored at less than 4° C. has a chance of right ventricle preservation of approximately 50.8%. A heart stored at 4-6° C. has a chance of right ventricle preservation of approximately 55.4%. A heart stored at 6-8° C. has a chance of right ventricle preservation of approximately 66.7%. A heart stored at 8-12° C. has a chance of right ventricle preservation of approximately 62.5%. Similar to results presented in FIGS. 4-5, storing the heart at 6-8° C. can cause the heart to have a higher chance of right ventricle preservation than at less than 4° C., 4-6° C., 8-12° C., 4-8° C., 8-12° C., and/or 4-12° C. As with the data collected for FIGS. 5-6, the pressure within the heart container was regulated such that pressure is approximately constant.

Figure 7:
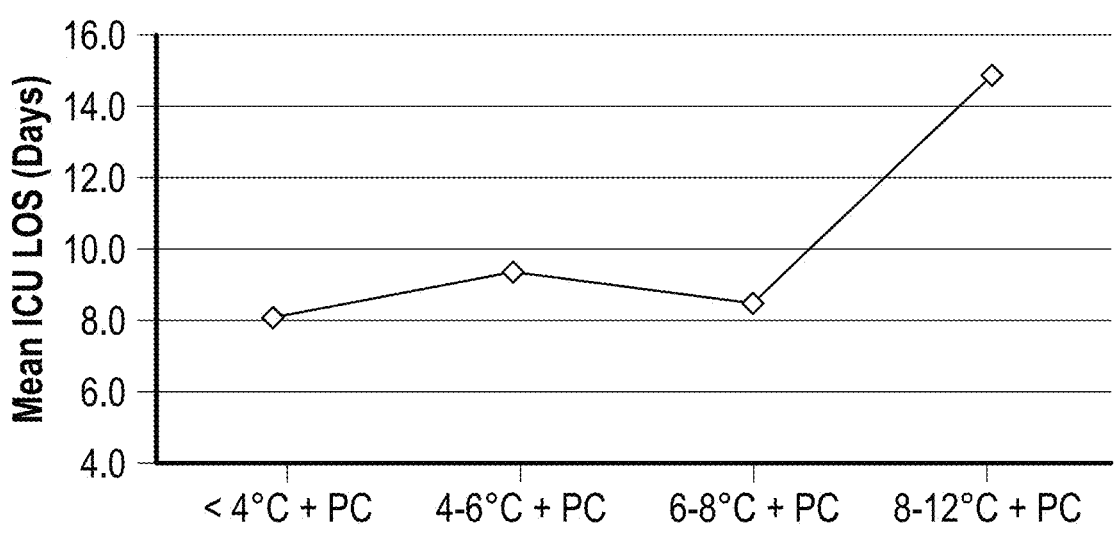
FIG. 7 shows a graph of mean intensive care unit (ICU) length of stay (LOS) for recipients of hearts preserved at different temperatures under constant pressure.

FIG. 7 shows a graph of mean intensive care unit (ICU) length of stay (LOS) for recipients of hearts preserved at different temperatures under constant pressure.

The graph shows data acquired during use of an organ transport system such as the methods and systems described herein. Data was generated by plotting the incidence of ICU LOS on the y-axis against the average temperature (x-axis). The average temperature was calculated from the data available through a digital application and a logger. The average for each specific case was calculated by averaging the temperatures across the length of a specific case. The average for each case was used to calculate the average across all cases. ICU LOS can indicate the ability of the heart to properly function after transplantation. As will be understood by one skilled in the art, patients can benefit from spending less time in the ICU after transplantation.

Patients who received hearts stored at less than 4° C. had a mean ICU LOS of 8.1 days. Patients who received hearts stored at 4-6° C. have a mean ICU LOS of 9.4 days. Patients who receive hearts stored at 6-8° C. have a mean ICU LOS of 8.5 days. Patients who received hearts stored at 8-12° C. had a mean ICU LOS of 14.9 days. Similar to the results presented in FIGS. 4-6, storing the heart at 6-8° C. can cause patients to have shorter mean ICU LOS than at 4-6° C., 8-12° C., 4-8° C., 8-12° C., and/or 4-12° C. As in the data presented in FIGS. 4-6, the pressure within the heart container was regulated such that pressure is approximately constant.

Figure 8:
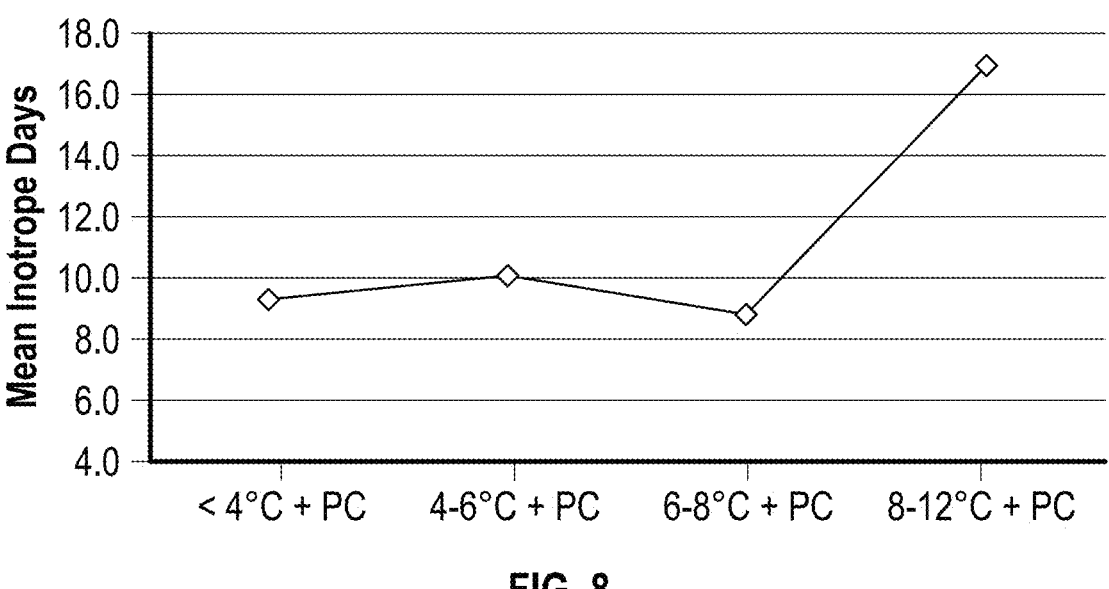
FIG. 8 shows a graph of mean number of days recipients of hearts preserved at different temperatures under constant pressure take inotropes.

FIG. 8 shows a graph of mean number of days recipients of hearts preserved at different temperatures under constant pressure take inotropes.

The graph shows data acquired during use of an organ transport system similar to the system described herein. Data was generated by plotting the incidence of inotrope days on the y-axis against the average temperature (x-axis). The average temperature was calculated from the data available through a digital application and a logger. The average for each specific case was calculated by averaging the temperatures across the length of a specific case. The average for each case was used to calculate the average across all cases. A patient can need to take inotropes after transplantation to change the force of the donor heart's contractions. Patients can benefit from needing to take inotropes for a shorter period of time.

Patients who received hearts stored at less than 4° C. take inotropes for a mean of 9.3 days. Patients who receive hearts stored at 4-6° C. take inotropes for a mean of 10.1 days. Patients who receive hearts stored at 6-8° C. take inotropes for a mean of 8.8 days. Patients who received hearts stored at 8-12° C. take inotropes for a mean of 16.9 days. Similar to the results presented in FIGS. 4-7, storing the heart at 6-8° C. can cause patients to have shorter mean time taking inotropes than at less than 4° C., 4-6° C., 8-12° C., 4-8° C., 8-12° C., and/or 4-12° C. In this example, the P value for the graph is 0.042. As in FIGS. 4-7, the pressure within the heart container was regulated such that pressure is approximately constant.

Figure 9:
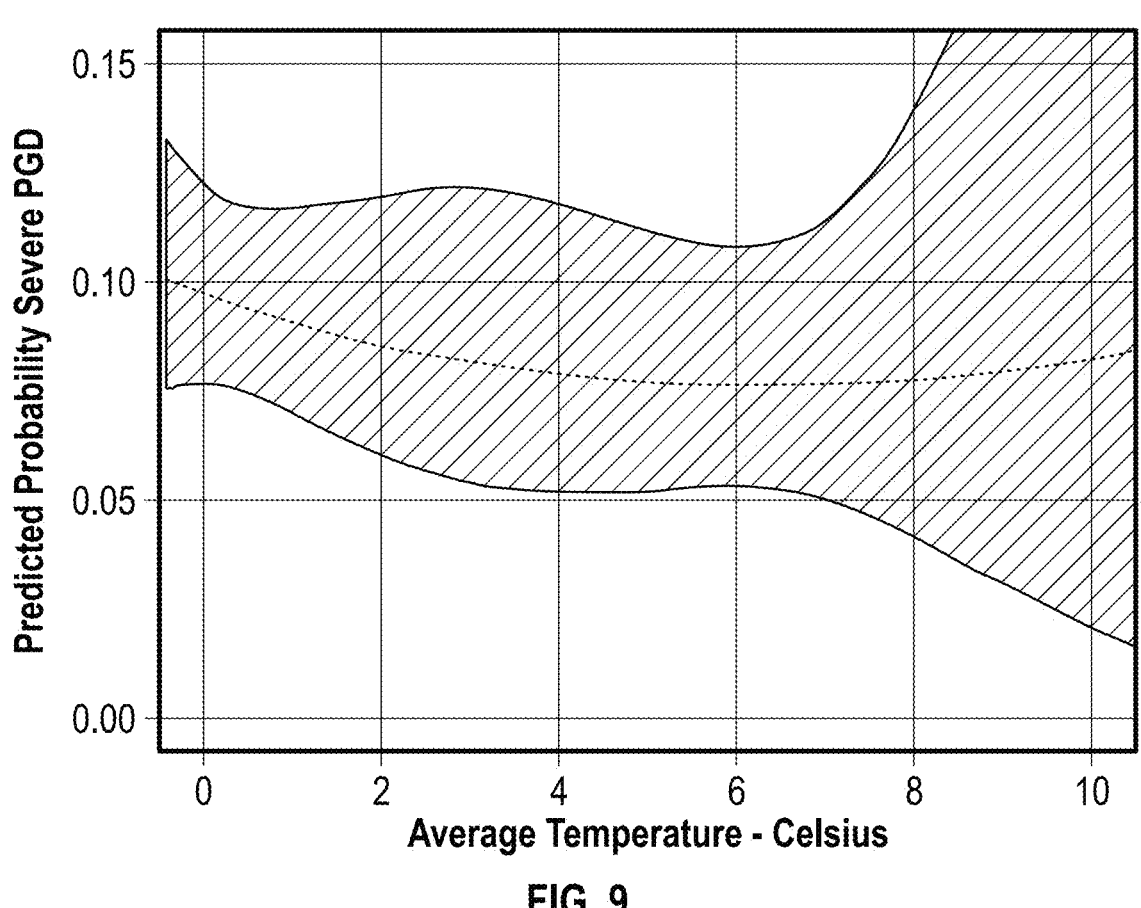
FIG. 9 shows a graph of predicted probability of severe PGD for hearts preserved at different temperatures.

FIG. 9 shows a graph of predicted probability of severe PGD for hearts preserved at different temperatures. FIG. 9 shows a binomial fit of the data. The predicted probability of severe PGD was calculated against maximum temperature from a trailing average window, for example a 30-minute trailing average window. The calculated minimum of the polynomial best fit, for example the binomial best fit, is 6.4° C. Preserving a heart at approximately 6.4° C. resulted in a lower probability of PGD. Preserving a heart with an average temperature of approximately 6.4° C. resulted in a lower probability of PGD.

Considering the results presented in FIGS. 4-9, one of skill in the art would understand that preserving a heart at 6-8° C. at constant pressure using the systems and methods described herein unexpectedly improved outcomes (such as viability), considering a number of factors as explained in the description accompanying FIGS. 4-9.

In some embodiments, the systems and methods described with respect to FIGS. 1A-B, 2A-C, and 3A-D can be used to maintain a temperature of the heart, for example a heart, at approximately 6.4° C. In some embodiments, the systems and methods described with respect to FIGS. 1A-B, 2A-C, and 3A-D can be used to maintain a temperature of the heart, for example a heart, of at least 5.4° C. and/or less than or equal to 7.4° C. In some embodiments, the heart can be stored at a temperature of at least 5.9° C. and/or less than or equal to 6.9° C. In some embodiments, the heart can be stored at a temperature of at least 6° C. and/or less than or equal to 8° C.

The systems and methods described herein can be used to ensure that the organ does not reach a temperature outside the target temperature range during preservation. The systems and methods described herein can increase the temperature in the organ container when the temperature is below 6° C. The systems and methods described herein can decrease the temperature in the organ container when the temperature is above 8° C. The systems and methods described herein can increase the temperature in the organ container when the temperature is below 7° C. The systems and methods described herein can decrease the temperature in the organ container when the temperature is above 7° C. The systems and methods described herein can increase the temperature in the organ container when the temperature is below 6.5° C. The systems and methods described herein can decrease the temperature in the organ container when the temperature is above 7.5° C. The systems and methods described herein can increase the temperature in the organ container when the temperature is below 6.4° C. The systems and methods described herein can decrease the temperature in the organ container when the temperature is above 6.4° C.

Example Cooling Block Arrangements

Figure 10:
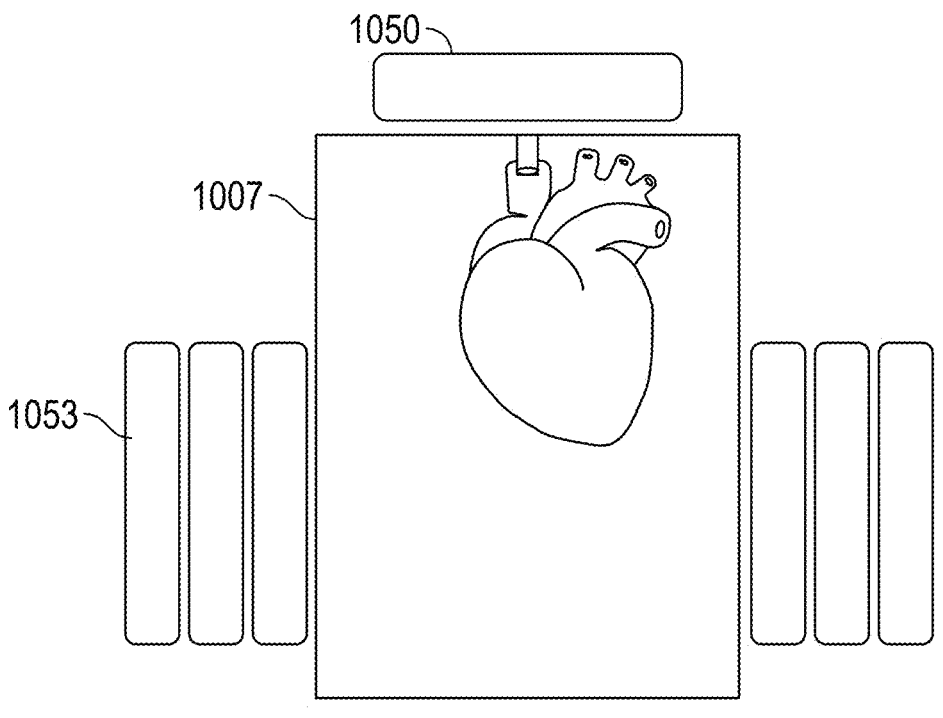
FIG. 10 shows an example of an organ container with upper cooling media arranged above a lid of the organ container and lateral cooling media arranged around a circumference of the organ container.

FIG. 10 shows an example of an organ container 1007 with upper cooling media 1050 arranged above a lid of the organ container 1007 and lateral cooling media 1053 arranged around a circumference of the organ container 1007.

The organ container 1007 can be similar to the organ containers described with respect to FIGS. 1A, 1B, 2D, and 3A-3D. The cooling media can be eutectic cooling media or PCM, for example as described with respect to FIGS. 1A and 1B. In some examples, the organ container 1007 can contain a heart, a pancreas, a lung, a kidney, or a liver. The organ container 1007 can be a canister.

The upper cooling media 1050 and the lateral cooling media 1053 can be arranged to maintain a constant temperature within the organ container 1007. The upper cooling media 1050 can be in contact with a top surface or lid of the organ container 1007. For example, the upper cooling media 1050 can be adjacent to an adapter securing a heart in the organ container 1007. In some examples, the upper cooling media 1050 can be engineered to a temperature of approximately 1° C. In some examples, the upper cooling media 1050 can be engineered to a temperature of between approximately 0.5° C. and approximately 5° C.

The lateral cooling media 1053 can be adjacent to a wall of the organ container 1007. In some examples, the lateral cooling media 1053 can be engineered to a temperature of approximately 3° C. In some examples, the lateral cooling media 1053 can be engineered to a temperature of between approximately 1° C. and approximately 5° C. In some examples, the lateral cooling media 1053 can be in contact with or adjacent to a bottom portion of the wall of the organ container 1007 and not a top portion of the wall. For example, a top portion of the wall can be approximately 6 inches such that the lateral cooling media 1053 is approximately 6 inches from the uppermost portion of the wall. In some examples, the bottom portion of the wall can describe the inner side wall, with no cooling media disposed beneath the organ container 1007. In some examples, the top portion of the wall can be the uppermost approximately 2-8 inches and the bottom portion can be the portion of the wall below the uppermost approximately 2-8 inches. In some examples, the top portion of the wall can be the uppermost approximately 1-10 inches and the bottom portion can be the portion of the wall below the uppermost approximately 1-10 inches. In some examples, the top portion of the wall can be the uppermost approximately 20% and the bottom portion can be the lowermost approximately 80% of the wall. In some examples, the top portion of the wall can be the uppermost approximately 5-50% and the bottom portion can be the lowermost approximately 50-95% of the wall. In some examples, the top of the lateral cooling media 1053 can reach a point less than approximately 75% of the height of the organ container, and the bottom of the lateral cooling media 1053 can reach a point less than approximately 25% of the height of the organ container 1007. In some examples, the top of the lateral cooling media 1053 can reach a point less than approximately 50% of the height of the organ container, and the bottom of the lateral cooling media 1053 can reach a point less than approximately 10% of the height of the organ container 1007. In some examples, the top of the lateral cooling media 1053 can reach a point less than approximately 90% of the height of the organ container, and the bottom of the lateral cooling media 1053 can reach a point less than approximately 50% of the height of the organ container 1007.

The lateral cooling media 1050 can include 3 layers of cooling packets wrapped around each other. The lateral cooling media 1050 can include approximately 1-5 layers of cooling packets. The lateral cooling media 1053 can sit on the floor of the transport container, so the band of cooling material is in contact with or adjacent to the bottom of the organ container 1007. The bottom of the organ container 1007 can be positioned on a platform above the floor of the transport container. For example, the organ container 1007 can be positioned approximately 1.5 inches from the bottom of the transport container. In some examples, the organ container 1007 can be positioned between approximately 0.5 inches and approximately 2.5 inches from the bottom of the transport container. In some examples, the organ container 1007 can be positioned between approximately 0.1 inches and approximately 3.5 inches from the bottom of the transport container. In some examples, the lateral cooling media 1053 can be positioned around the platform on which the organ container 1007 is positioned.

In some examples, the lateral cooling media 1053 can be engineered to a temperature that is at least approximately 1° C. higher than the upper cooling media 1050. In some examples, the lateral cooling media 1053 can be engineered to a temperature that is at least approximately 2° C. higher than the upper cooling media 1050. In some examples, the lateral cooling media 1053 can be engineered to a temperature that is at least approximately 3° C., approximately 4° C., or approximately 5° C. higher than the upper cooling media 1050. Advantageously, in some examples, having upper cooling media 1050 that is engineered to a lower temperature than the lateral cooling media 1053 can cause a more uniform cooling of the organ container 1007.

In some examples, the upper cooling media 1050 and lateral cooling media 1053 can be arranged to promote or cause convection of the preservation solution. Convection can mean the movement caused within a fluid by the tendency of hotter and therefore less dense material to rise, and colder, denser material to sink under the influence of gravity, which consequently results in transfer of heat. The upper cooling media 1050 and lateral cooling media 1053 can be arranged to promote or cause convection between a top portion of the preservation solution and a bottom portion of the preservation solution. In some examples, the top portion of the preservation solution can be between the uppermost approximately 20% and the uppermost approximately 50%. In some examples, the top portion of the preservation solution can be between the uppermost approximately 10% and the uppermost approximately 60%. In some examples, the bottom portion of the preservation solution can be between the lowermost approximately 50% and the lowermost approximately 80%. In some examples, the bottom portion of the preservation solution can be between the lowermost approximately 40% and the lowermost approximately 90%. In some examples, the bottom portion of the preservation solution can be between the lowermost approximately 20% and the lowermost approximately 95%. This can improve clinical outcomes for cases with longer ischemic times without impacting user interface, workflow, and performance claims.

In some examples, the upper cooling media 1050 can be engineered to approximately 1° C. and the lateral cooling media 1053 can be engineered to a temperature of approximately 3° C. In some examples, the upper cooling media 1050 can be engineered to between approximately 0° C. and approximately 2° C. and the lateral cooling media 1053 can be engineered to a temperature of between approximately 2° C. and approximately 5° C. In some examples, the upper cooling media 1050 can be engineered to between approximately −1° C. and approximately 3° C. and the lateral cooling media 1053 can be engineered to a temperature of between approximately 1° C. and approximately 6° C. In some examples, cooling the organs with the cooling media described herein can cause the organ to remain at a temperature between approximately 6° C. and approximately 8° C. during transportation. In some examples, cooling the organs with the cooling media described herein can cause the organ to remain at a temperature between approximately 4° C. and approximately 8° C. during transportation.

In some examples, the organ container 1007 can be a canister. For example, the organ container 1007 can be a cylindrical canister. In some examples, the organ container 1007 can be a rigid canister. The organ container 1007, or canister, can be positioned in a transport container. The organ container 1007 can include a lid, and an upper lid can seal to the transport container, as described with respect to FIGS. 13A and 13B. The organ container 1007 can include a lid and a wall. The organ container 1007 can include a cylindrical wall or a plurality of walls. The organ container 1007 can be at least partially filled with preservation solution. The lateral cooling media 1053, or first cooling block, can be positioned in the transport container such that the lateral cooling media 1053 is in contact with the wall of the organ container 1007. For example, the lateral cooling media 1053 can be wrapped around the organ container 1007. The upper cooling media 1050, or second cooling block, can be positioned such that the upper cooling media 1050 is in contact with the lid of the canister. For example, the upper cooling media 1050 can be on top of the lid of the organ container 1007.

In some examples, the upper cooling media 1050 and the lateral cooling media 1053 can be positioned in a single cavity of the transport container. In some examples, the upper cooling media 1050 can include 1-5 cooling blocks. In some examples, the lateral cooling media 1053 can include 1-5 bands of cooling blocks. In some examples, each band of cooling blocks can include 3-10 cooling blocks. In some examples, each band of cooling blocks can include 1-15 cooling blocks.

Figures 11A, 11B, 11C, 11D:
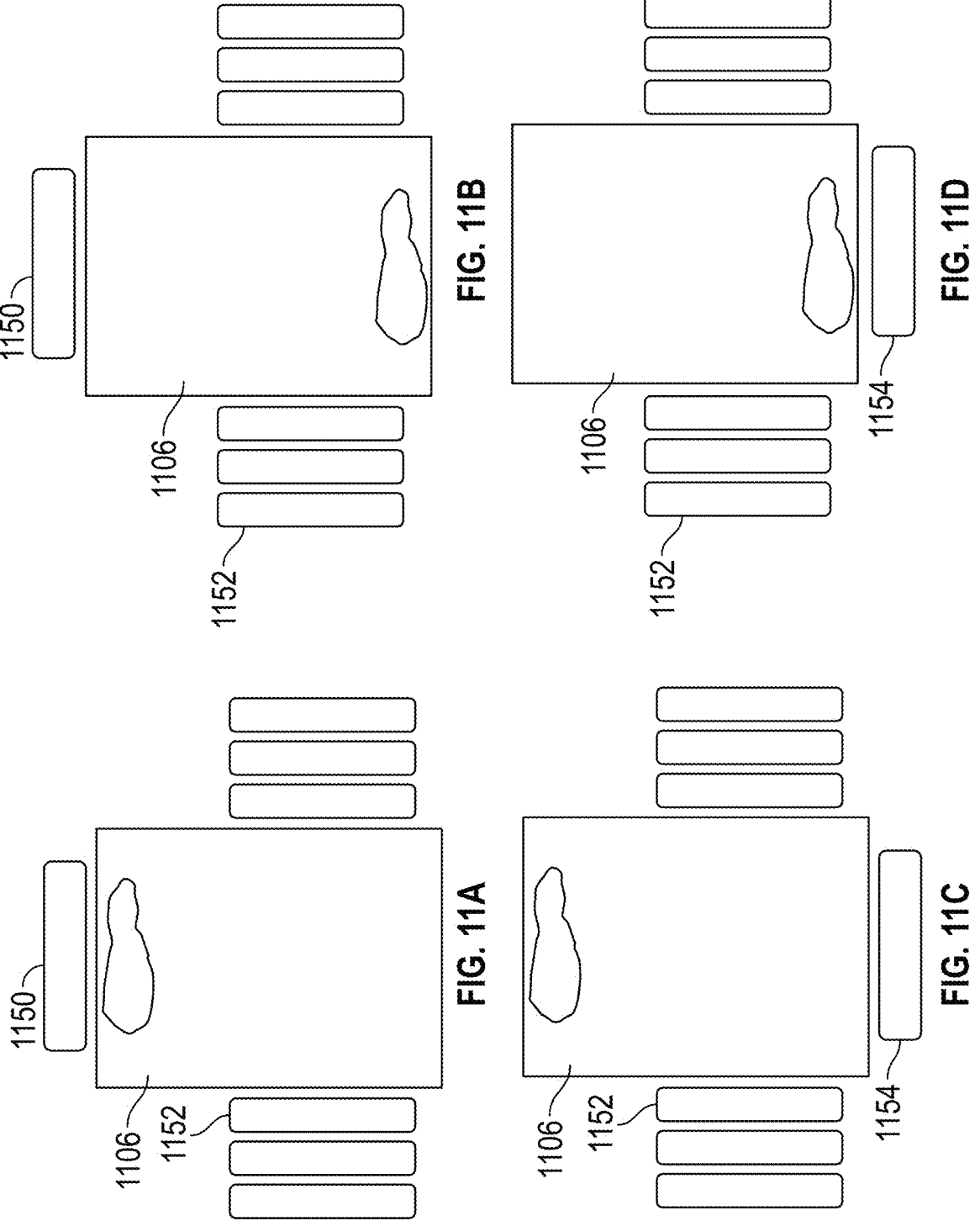
FIG. 11A shows an example of a pancreas container with the pancreas floating near the top, with upper cooling media arranged above a lid of the pancreas container and lateral cooling media arranged around a circumference of the pancreas container.
FIG. 11B shows an example of the pancreas container of FIG. 11A with the pancreas sinking near the bottom, with upper cooling media arranged above a lid of the pancreas container and lateral cooling media arranged around a circumference of the pancreas container 1106.
FIG. 11C shows an example of the pancreas container of FIG. 11A with the pancreas floating near the top, with lower cooling media arranged beneath the pancreas container and lateral cooling media arranged around a circumference of the pancreas container.
FIG. 11D shows an example of the pancreas container of FIG. 11A with the pancreas sinking near the bottom, with lower cooling media arranged beneath the pancreas container and lateral cooling media arranged around a circumference of the pancreas container.

FIG. 11A shows an example of an organ container 1106, illustrated with a pancreas, with the pancreas floating near the top, with upper cooling media 1150 arranged above a lid of the organ container 1106 and lateral cooling media 1152 arranged around a circumference of the organ container 1106. FIG. 11B shows an example of the organ container 1106 of FIG. 11A with the pancreas sinking near the bottom, with upper cooling media 1150 arranged above a lid of the organ container 1106 and lateral cooling media 1152 arranged around a circumference of the organ container 1106. FIG. 11C shows an example of the organ container 1106 of FIG. 11A with the pancreas floating near the top, with lower cooling media 1154 arranged beneath the organ container 1106 and lateral cooling media 1152 arranged around a circumference of the organ container 1106. FIG. 11D shows an example of the organ container 1106 of FIG. 11A with the pancreas sinking near the bottom, with lower cooling media 1154 arranged beneath the organ container 1106 and lateral cooling media 1152 arranged around a circumference of the organ container 1106.

The organ container 1106 can include any or all features of the organ containers described with respect to FIGS. 1A, 1B, 2D, 3A-3D, and 10. The cooling media can be eutectic cooling media or PCM, for example as described with respect to FIGS. 1A and 1B.

In some examples, a user can submerge a pancreas in preservation fluid in the preservation container 1106. Depending on the density of the pancreas, for example how much fat is on the pancreas, the pancreas can float as shown in FIG. 11A, sink as shown in FIG. 11B, or float between these positions. In some examples, the systems and methods described herein can include determining a parameter of the cooling based on whether the organ is floating or sinking. In some examples, the systems and methods described herein can include determining a parameter of the cooling based on a prediction of whether the organ will float or sink. In some examples, the parameter can be the temperature of the cooling media, the position of the cooling media, and/or a setting of an active heating/cooling component.

The upper cooling media 1150, lower cooling media 1154, and/or the lateral cooling media 1152 can be arranged to maintain a constant temperature within the organ container 1106. The upper cooling media 1150 can be in contact with a top surface or lid of the organ container 1106. For example, the upper cooling media 1150 can be adjacent to a floating pancreas in the organ container 1106. In some examples, the upper cooling media 1150 can be engineered to a temperature of approximately 1° C. In some examples, the upper cooling media 1150 can be engineered to a temperature of between approximately 0.5° C. and approximately 5° C.

The lower cooling media 1154 can be in contact with a bottom surface of the organ container 1106. For example, the lower cooling media 1154 can be adjacent to a sinking pancreas in the organ container 1106. In some examples, the lower cooling media 1154 can be engineered to a temperature of approximately 1° C. In some examples, the lower cooling media 1154 can be engineered to a temperature of between approximately 0.5° C. and approximately 5° C.

The lateral cooling media 1152 can be adjacent to a wall of the organ container 1106. In some examples, the lateral cooling media 1152 can be engineered to a temperature of approximately 3° C. In some examples, the lateral cooling media 1152 can be engineered to a temperature of between approximately 1° C. and approximately 5° C.

Advantageously, in some examples, having upper cooling media 1150 and/or lower cooling media 1154 that is engineered to a lower temperature than the lateral cooling media 1152 can cause a more uniform cooling of the organ container 1106. This can improve clinical outcomes for cases with longer ischemic times without impacting user interface, workflow, and performance claims. For example, the upper cooling media 1150 and/or lower cooling media 1154 can be engineered to approximately 1° C. and the lateral cooling media 1152 can be engineered to a temperature of approximately 3° C. In some examples, the upper cooling media 1150 and/or lower cooling media 1154 can be engineered to between approximately 0° C. and approximately 2° C. and the lateral cooling media 1152 can be engineered to a temperature of between approximately 2° C. and approximately 5° C. In some examples, cooling the pancreas with the cooling media described herein can cause the organ, e.g., a pancreas, to remain at a temperature between approximately 6° C. and approximately 8° C. during transportation. In some examples, cooling the organ with the cooling media described herein can cause the organ to remain at a temperature between approximately 4° C. and approximately 8° C. during transportation.

In some examples, a user can determine whether the pancreas will float or sink based on a density of the pancreas and determine a cooling media arrangement based on this determination. In some examples, upper cooling media 1150 can be used when the pancreas floats to the top of the container to better cool the pancreas. In some examples, lower cooling media 1154 can be used when the pancreas floats to the top of the container to avoid the pancreas getting too cold. In some examples, lower cooling media 1154 can be used when the pancreas sinks to the bottom of the container to better cool the pancreas. In some examples, upper cooling media 1150 can be used when the pancreas sinks to the bottom of the container to avoid the pancreas getting too cold. In some examples, lungs or kidneys can be transported with similar considerations to a floating pancreas because the organs float.

In some examples, warmer cooling media can be used as the upper cooling media 1150 when the pancreas floats to the top of the container to avoid the pancreas getting too cold. For example, cooling media engineered to a temperature of between approximately 2° C. and approximately 5° C. can be used. In some examples, cooler cooling media can be used as the upper cooling media 1150 when the pancreas sinks to the bottom of the container to better cool the pancreas. For example, cooling media engineered to a temperature of between approximately 0° C. and approximately 3° C. can be used.

FIG. 12A shows an example of an organ container 1206 at four times with upper cooling media 1250 and lateral cooling media 1252 of the same temperature. FIG. 12B shows an example of an organ container 1206 at four times with upper cooling media 1250 that is cooler than the lateral cooling media 1252.

The organ container 1206 can include any or all features of the organ containers described with respect to FIGS. 1A, 1B, 2D, 3A-3D, 10, and 11A-D. The cooling media can be eutectic cooling media or PCM, for example as described with respect to FIGS. 1A and 1B.

As shown in FIG. 12A, at the initial time, the organ container 1206 can have a relatively consistent temperature throughout. In some examples, the initial temperature of the preservation fluid can be approximately 4° C. In some examples, the initial temperature of the preservation fluid can be between approximately 2° C. and approximately 6° C. At the second time, when the upper cooling media 1250 and lateral cooling media 1252 of the same temperature can be placed around the organ container 1206, the fluid in the container can still be the same temperature throughout due to the consistent cooling around the organ container 1206. At a third time, when the upper cooling media 1250 and lateral cooling media 1252 of the same temperature are around the organ container 1206 for a period of time, the temperature of the fluid in the container can become less homogeneous as gravity begins to pull the cooler fluid down with respect to the warmer fluid. At a fourth time, when the upper cooling media 1250 and lateral cooling media 1252 of the same temperature are around the organ container 1206 for an extended period of time, the cooler fluid can sink to the bottom of the container, which can cause uneven cooling of the organ.

As shown in FIG. 12B, at the initial time, the organ container 1206 can have a relatively consistent temperature throughout. In some examples, the initial temperature of the preservation fluid can be approximately 4° C. In some examples, the initial temperature of the preservation fluid can be between approximately 2° C. and approximately 6° C. At a second time, when the cooler upper cooling media 1250 and warmer lateral cooling media 1252 can be placed around the organ container 1206, the fluid in the container can be cooler near the top of the organ container 1206 due to the cooler temperature of the upper cooling media 1250. At a third time, when the cooler upper cooling media 1250 and warmer lateral cooling media 1252 are around the organ container 1206 for a period of time, the fluid in the container can start to mix throughout the organ container 1206 as cooler fluid sinks due to gravity causing convection. At a fourth time, when the cooler upper cooling media 1250 and warmer lateral cooling media 1252 are around the organ container 1206 for an extended period of time, the fluid can mix thoroughly to cause an approximately homogeneous temperature of the fluid, which can cause even cooling of the organ.

In some examples, upper cooling media 1250 of approximately 1° C. and lateral cooling media of approximately 3° C. can cause even cooling of the organ after a certain time. In some examples, upper cooling media 1250 of approximately 0-3° C. and lateral cooling media of approximately 2-5° C. can cause even cooling of the organ after a certain time. In some examples, the time needed for even temperature of the fluid is approximately an hour. In some examples, the time needed for even temperature of the fluid is between approximately 30 minutes and approximately 2 hours. In some examples, the time needed for even temperature of the fluid is between approximately 10 minutes and approximately 3 hours. In some examples, the time needed for even temperature of the fluid is between approximately 1 minute and approximately 5 hours.

Figure 13A:
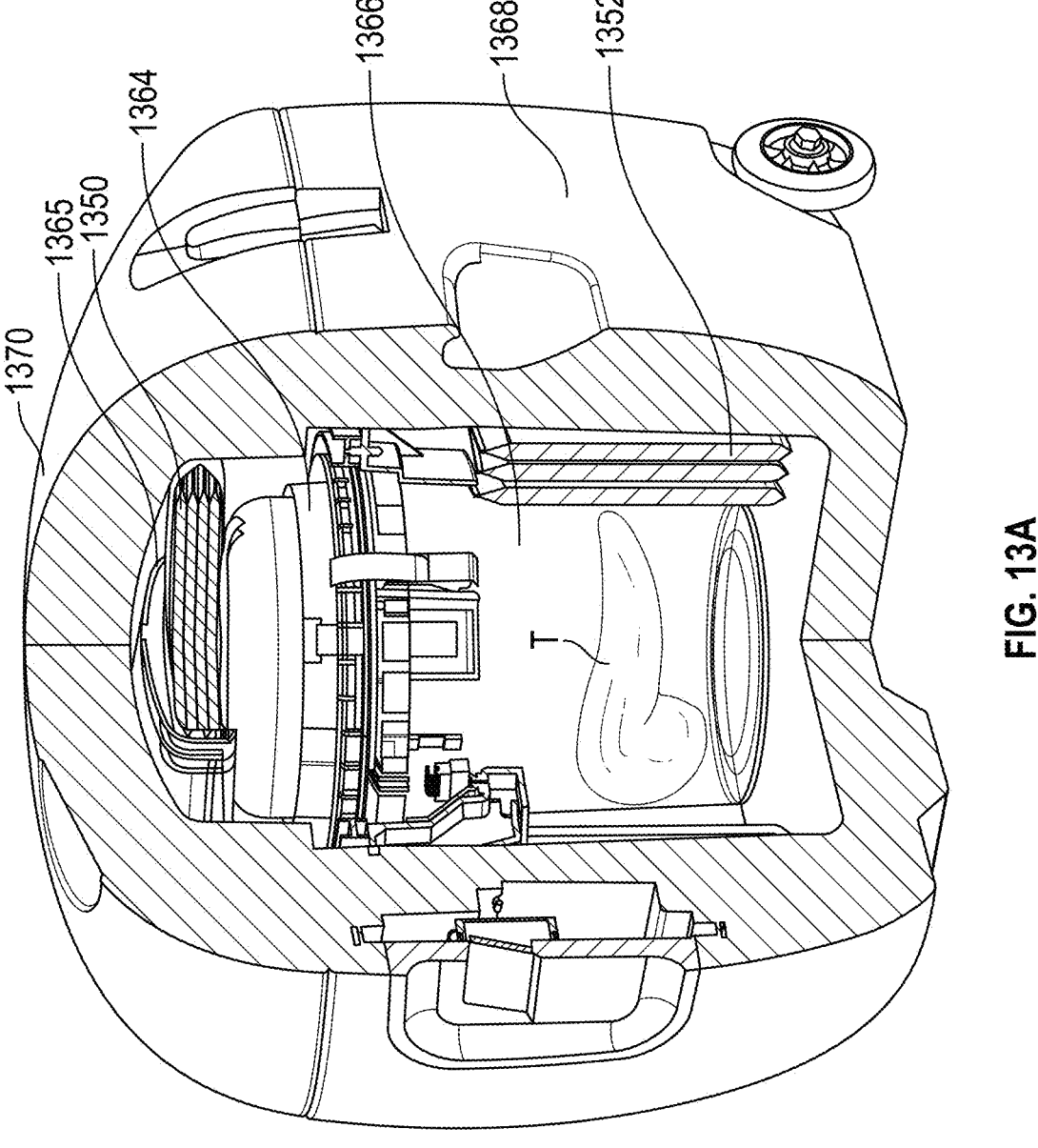
FIG. 13A shows an example of an organ container with upper cooling media arranged above a lid of the organ container and lateral cooling media arranged around a circumference of the organ container.
Figure 13B:
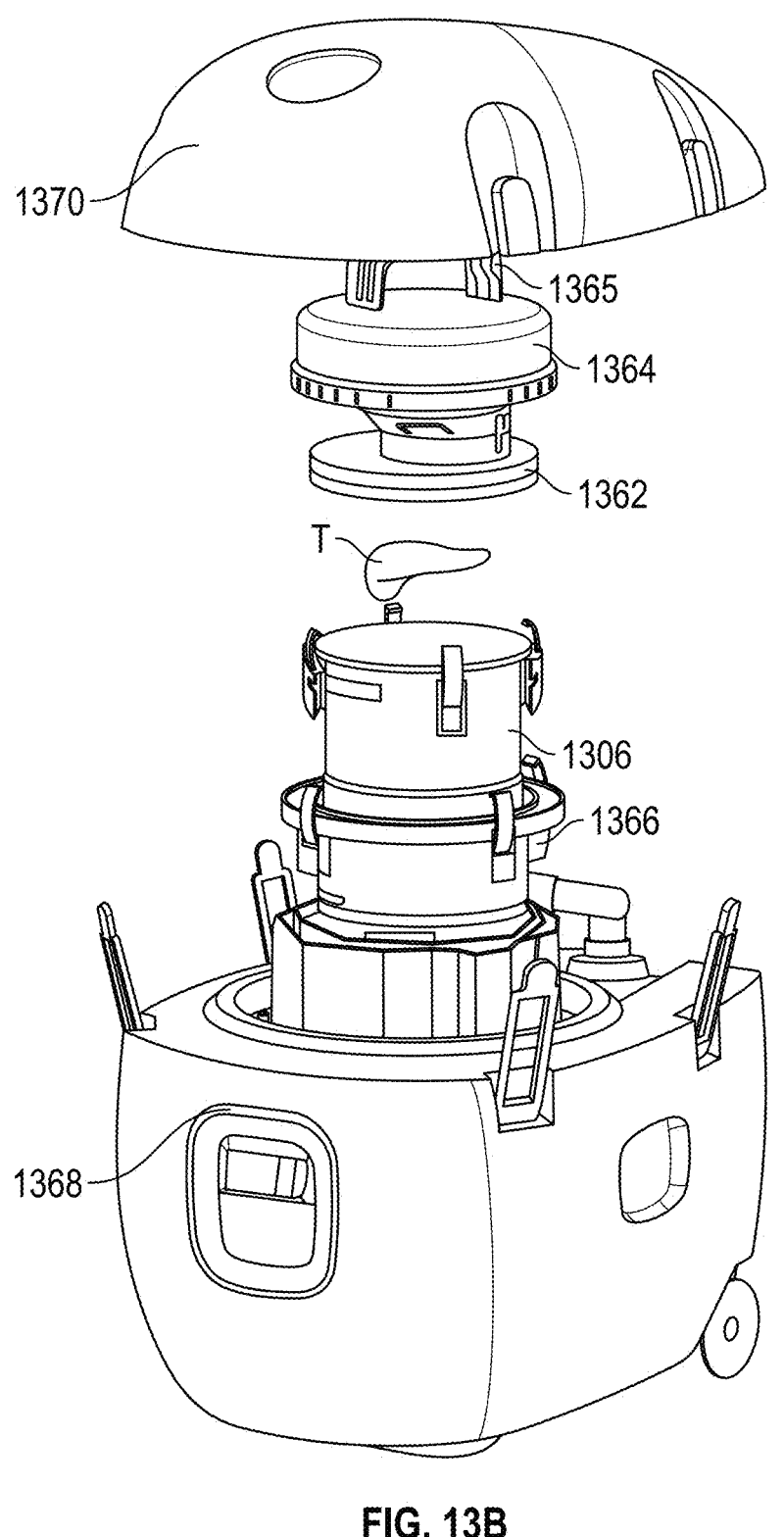
FIG. 13B shows an exploded view of the example of an organ container of FIG. 13A.

FIG. 13A shows an example of an organ container with upper cooling media arranged above a lid of the organ container and lateral cooling media arranged around a circumference of the organ container. FIG. 13B shows an exploded view of the example of an organ container of FIG. 13A.

The organ container 1306 can include any or all features of the organ containers described with respect to FIGS. 1A, 1B, 2D, 3A-3D, 10, 11A-D, and 12A-B. The cooling media can be eutectic cooling media or PCM, for example as described with respect to FIGS. 1A and 1B.

In some examples, the organ container 1306 can be configured to contain a tissue, organ, or biological sample T. The biological sample T can be a pancreas or a heart. In some examples, the biological sample T can be a part of an organ. In some examples, the biological sample T can be a organ. In some examples, the biological sample T can be a lung, liver, or kidney. The organ container 1306 can be filled with preservation fluid. The organ container 1306 can be sealed with an inner lid 1362. The organ container 1306 can be placed inside an outer container 1366. An outer lid 1364 can be sealed to the organ container 1306 and/or the outer container 1366. The outer lid 1364 can include a handle 1365. The organ container 1306, inner lid 1362, outer container 1366, and/or outer lid 1364 can be positioned in a transport container 1368 with a transport container lid 1370.

In some examples, cooling media can be sealed within the transport container 1368 and the transport container lid 1370, while outside the outer container 1366 and outer lid 1364. In some examples, upper cooling media 1350 can be positioned on the outer lid 1364 beneath the top of the handle 1365. In some examples, the lower cooling media 1352 can be positioned around an outer wall of the outer container 1366. In some examples, the lower cooling media 1352 can be positioned on the floor of the transport container 1368. In some examples, the lower cooling media 1352 can be positioned on a ledge on the floor of the transport container 1368. In some examples, the lower cooling media 1352 can be a band of cooling media. For example, the lower cooling media 1352 can be multiple pouches of PCM joined together to form a band. The pouches of cooling media can be flexible to wrap around the organ container 1306. In some examples, the lower cooling media 1352 can be 1-5 bands of cooling media. In some examples, each band of cooling media 1352 can be made up of 8 pouches of PCM. In some examples, each band of cooling media 1352 can be made up of 5-10 pouches of PCM. In some examples, each band of cooling media 1352 can be made up of 2-15 pouches of PCM.

Test Data

Figure 14:
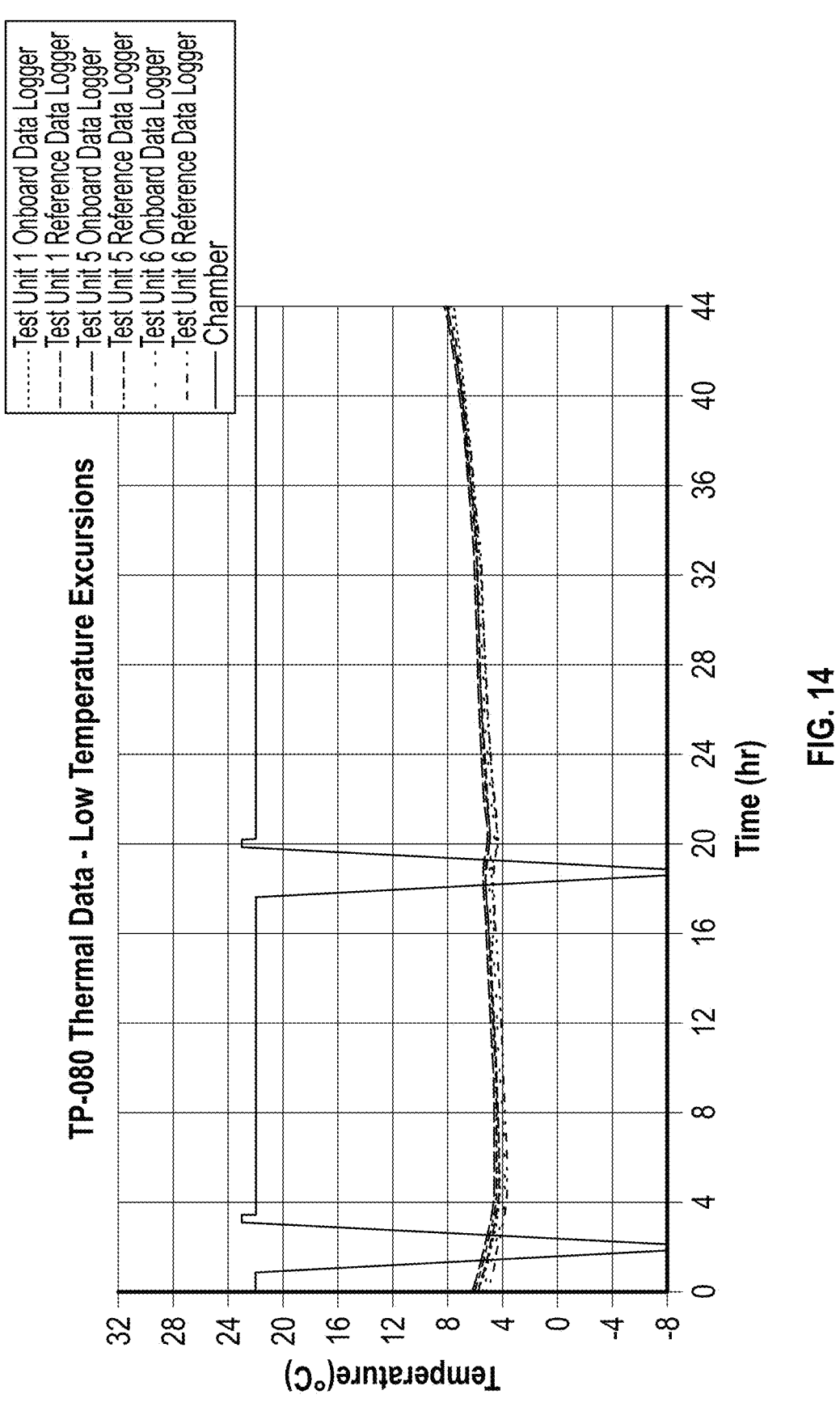
FIG. 14 shows temperature data within a pancreas container with features described herein when subjected to low temperature excursions.

FIG. 14 shows temperature data within a pancreas container with features described herein when subjected to low temperature excursions.

The pancreas containers were preconditioned in a freezer or "chamber" at a maximum temperature of −20° C. for 48 hours. Porcine pancreases and preservation solution were preconditioned in a temperature chamber at a temperature of between 3° C. and 5° C. for 4 hours. The cooling materials and preservation solution were stored in an the off the shelf cooler with ice for 4 hours. The preconditioning was performed to simulate a worst case scenario in which the user placed a flushed organ at a lower end of the operating temperature range of the device.

The test was executed on n=3 production equivalent containers. The temperature within the container remained within 4° C. and 8° C. for 41 hours. The environment temperature, labeled "chamber", fell to approximately −8° C. twice during transportation, but the temperature within the container remained within the desired range. For the final 8 hours of preservation, the temperature within the container remained within 6° C. and 8° C.

Figure 15:
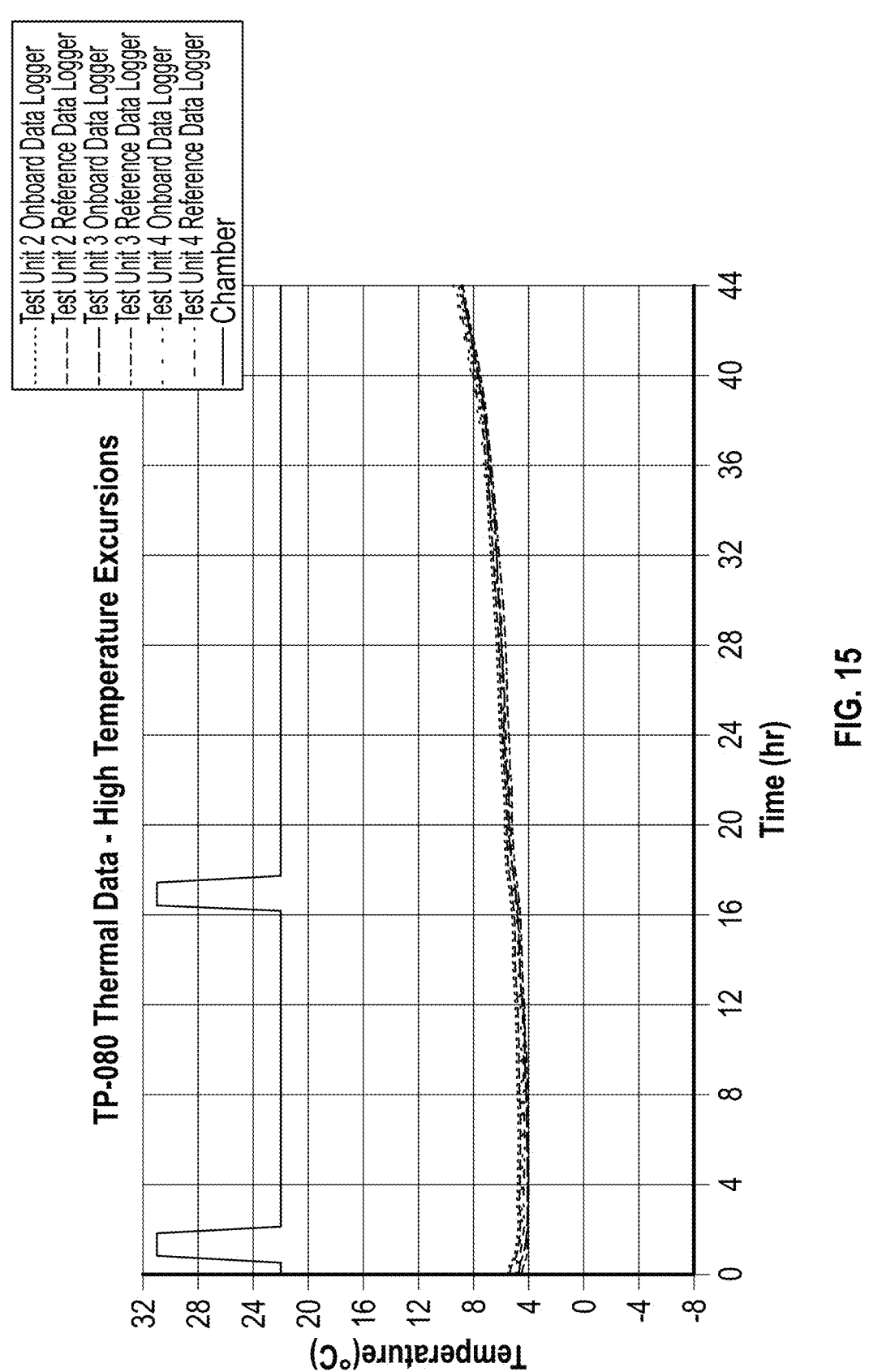
FIG. 15 shows temperature data within a pancreas container with features described herein when subjected to high temperature excursions.

FIG. 15 shows temperature data within a pancreas container with features described herein when subjected to high temperature excursions.

The pancreas containers were preconditioned in a freezer or "chamber" at a maximum temperature of −20° C. for 48 hours. Porcine pancreases and preservation solution were preconditioned in a temperature chamber at a temperature of between 3° C. and 5° C. for 4 hours. The cooling materials and preservation solution were stored in an the off the shelf cooler with ice for 4 hours. The preconditioning was performed to simulate a worst case scenario in which the user placed a flushed organ at a lower end of the operating temperature range of the device.

The test was executed on n=3 production equivalent containers. The temperature within the container remained within 4° C. and 8° C. for 41 hours. The environment temperature, labeled "chamber", rose to approximately 30° C. twice during transportation, but the temperature within the container remained within the desired range. For the final 12 hours of preservation, the temperature within the container remained within 6° C. and 8° C.

Figure 16:
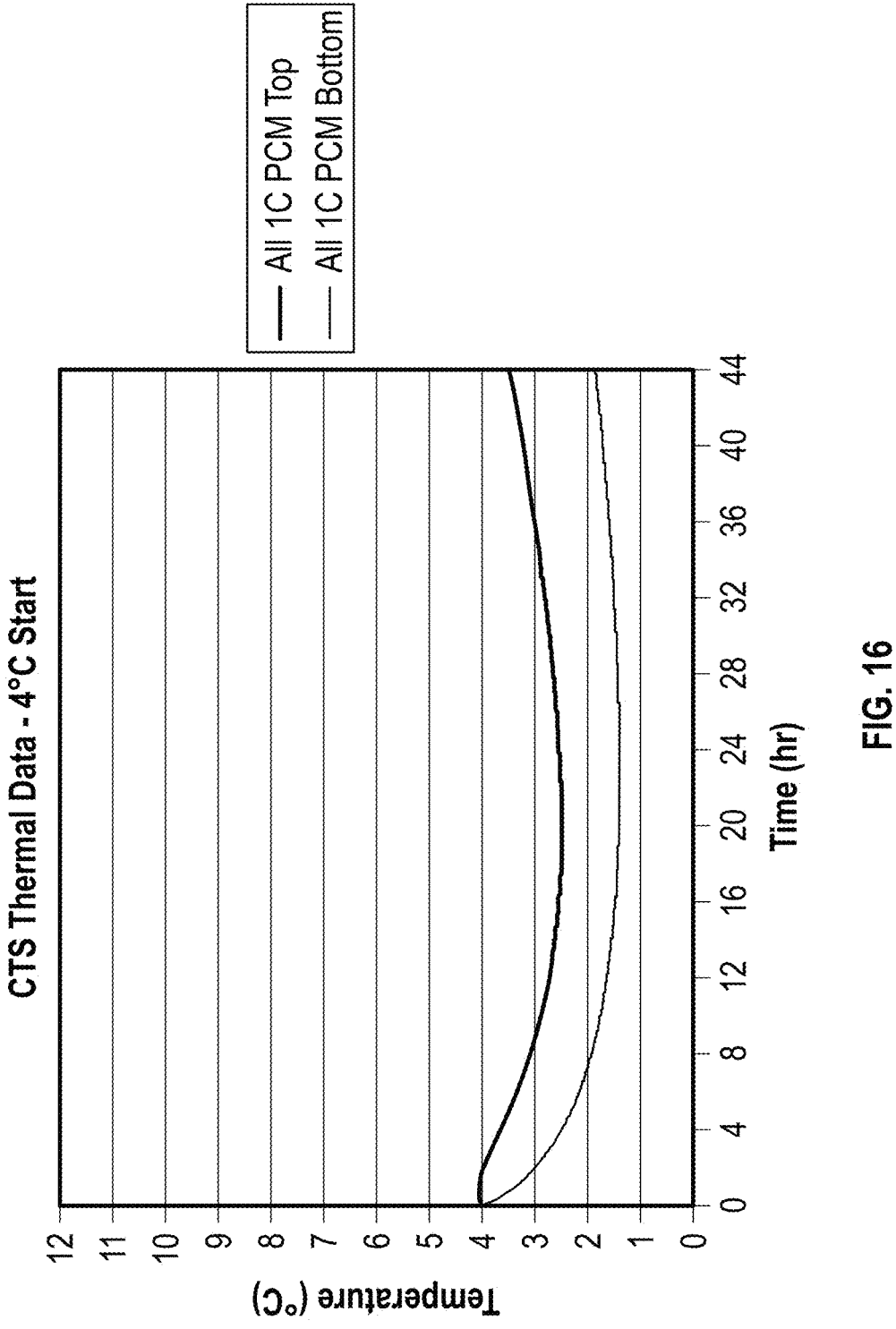
FIG. 16 shows temperature data within an experimental heart container with cooling blocks of the same temperature above and around the organ container.

FIG. 16 shows temperature data within an experimental heart container with cooling blocks of the same temperature above and around the organ container.

The experimental heart container was preconditioned to a temperature of 4° C. The heart was transported with cooling blocks having phase change material engineered to a temperature of 1° C. above the heart container and around the heart container. Temperature was measured at the top of the heart container and at the bottom of the heart container by temperature sensors configured to measure the temperature of the fluid in the heart container. Due to convection, the temperature measured at the bottom of the container was consistently between approximately 0.5° C. and approximately 1.5° C. cooler than the temperature at the top of the container after approximately 4 hours. Advantageously, using cooling blocks of different temperatures as described above can reduce the variation between the temperatures and allow more precise temperature control.

EXAMPLES

The listed Examples below are non-limiting examples of the systems, methods, and devices described herein.

Example 1. A method for hypothermic transport of a heart within a transport container, the method comprising: providing a transport container and a rigid canister, the rigid canister configured to regulate pressure inside the rigid canister; arranging eutectic cooling blocks within the transport container; placing a heart inside the rigid canister; placing the rigid canister inside the transport container; with the heart inside the rigid canister and the rigid canister inside the transport container, coupling a lid with the transport container to form an insulated environment within the transport container; transporting the heart within the transport container while: the eutectic cooling blocks maintain a temperature of at least 6° C. and less than or equal to 8° C. within the rigid canister during a preservation time; and the rigid canister maintains constant pressure within the rigid canister during preservation; and measuring, using a temperature sensor, a temperature inside the rigid canister during preservation.

Example 2. The method of Example 1, further comprising displaying an alert if the temperature is above 7.5° C. or below 6.5° C.

Example 3. The method of any one of Examples 1 or 2, further comprising displaying an alert if the temperature is above 7.8° C. or below 6.2° C.

Example 4. The method of any one of Examples 1-3, wherein the heart is preserved for at least 3 hours.

Example 5. The method of any one of Examples 1-4, wherein arranging the eutectic cooling blocks within the transport container comprises arranging an upper cooling media on a lid of the rigid canister and arranging a lower cooling media around an outer wall of the rigid canister.

Example 6. The method of Example 5, wherein the upper cooling media is engineered to a temperature that is at least 2° C. lower than a temperature of the lower cooling media.

Example 7. The method of Example 5, wherein the upper cooling media is engineered to a temperature of 1° C. and the lower cooling media is engineered to a temperature of 3° C.

Example 8. The method of Example 5, wherein the lid comprises a handle, and the upper cooling media is positioned at least partially under the handle.

Example 9. The method of Example 5, wherein the lower cooling media is positioned on a floor of the transport container.

Example 10. The method of any one of Examples 1-9, further comprising displaying an alert on a display on the transport container when the temperature is above 7.5° C. or below 6.5° C.

Example 11. The method of any one of Examples 1-10, further comprising displaying an alert on a display on the transport container when the temperature is above 7.8° C. or below 6.2° C.

Example 12. The method of any one of Examples 1-11, wherein the rigid canister comprises an outer canister and an inner canister.

Example 13. The method of Example 5, wherein the lower cooling media comprises a band of cooling media wrapped around the rigid canister.

Example 14. A system for hypothermic transport of a heart comprising: a transport container; a rigid canister configured to be positioned inside the transport container, the rigid canister configured to contain a heart and regulate pressure inside the rigid canister; eutectic cooling blocks configured to be arranged within the transport container, the eutectic cooling blocks configured to maintain a temperature of at least 6° C. and less than or equal to 8° C. within the rigid canister during a preservation time; a lid configured to seal to the transport container to form an insulated environment within the transport container; and a temperature sensor configured to be positioned inside the rigid canister during preservation.

Example 15. The system of Example 14, wherein the eutectic cooling blocks comprise an upper cooling media configured to be positioned on a lid of the rigid canister and a lower cooling media configured to be positioned around an outer wall of the rigid canister.

Example 16. The system of Example 15, wherein the upper cooling media is engineered to a temperature that is at least 2° C. lower than a temperature of the lower cooling media.

Example 17. The system of Example 15, wherein the upper cooling media is engineered to a temperature of 1° C. and the lower cooling media is engineered to a temperature of 3° C.

Example 18. The system of Example 15, wherein the lid comprises a handle, and the upper cooling media is positioned at least partially under the handle.

Example 19. The system of any one of Examples 14-18, wherein the rigid canister comprises an outer canister and an inner canister.

Example 20. The system of Example 15, wherein the lower cooling media comprises a band of cooling media wrapped around the rigid canister.

Example 21. A method for hypothermic transport of an organ within a transport container, the method comprising: determining a preservation time for an organ from a donor; determining a target temperature for organ preservation based on at least one of: the preservation time; a type of the organ; an age of the donor; a circulatory condition of the donor; a brain condition of the donor; and a metabolic rate of the donor; arranging eutectic cooling blocks within a transport container; placing the organ within the transport container; with the organ inside the transport container, coupling a lid with the transport container to form an insulated environment within the transport container; and transporting the organ within the transport container while the eutectic cooling blocks maintain the target temperature within the transport container for a duration of the preservation time.

Example 22. The method of Example 21, wherein the target temperature is determined based on two of: the preservation time, the type of the organ, the age of the donor, the circulatory condition of the donor, the brain condition of the donor; and the metabolic rate of the donor.

Example 23. The method of any one of Examples 21 or 22, wherein the target temperature is determined based on three of: the preservation time, the type of the organ, the age of the donor, the circulatory condition of the donor, the brain condition of the donor; and the metabolic rate of the donor.

Example 24. The method of any one of Examples 21-23, wherein the target temperature is determined based on four of: the preservation time, the type of the organ, the age of the donor, the circulatory condition of the donor, the brain condition of the donor; and the metabolic rate of the donor.

Example 25. The method of any one of Examples 21-24, wherein the target temperature is determined based on five of: the preservation time, the type of the organ, the age of the donor, the circulatory condition of the donor, the brain condition of the donor; and the metabolic rate of the donor.

Example 26. The method of any one of Examples 21-25, wherein the target temperature is determined based on the preservation time, the type of the organ, the age of the donor, the circulatory condition of the donor, the brain condition of the donor; and the metabolic rate of the donor.

Example 27. The method of any one of Examples 21-26, further comprising measuring a temperature within the transport container using a temperature sensor.

Example 28. The method of Example 27, further comprising displaying the target temperature and the temperature on a display.

Example 29. The method of any one of Examples 21-28 further comprising selecting the eutectic cooling blocks from a plurality of eutectic cooling blocks having a plurality of temperatures based on the target temperature.

Example 30. The method of any one of Examples 21-29, wherein the type of organ is a heart, a lung, a kidney, a liver, or a pancreas.

Example 31. A system for hypothermic transport of an organ within a transport container comprising: a transport container configured to contain an organ of a donor, the transport container configured to contain eutectic cooling blocks; a temperature sensor disposed within the transport container, the temperature sensor configured to measure a temperature of the organ; a processor configured to determine a target temperature for organ preservation based on information inputted by a user, the information comprising at least one of: a preservation time; a type of the organ; an age of the donor; a circulatory condition of the donor; a brain condition of the donor; and a metabolic rate of the donor; and a display in communication with the processor, the display configured to display at least one of: a temperature of the eutectic cooling blocks configured to maintain the organ at the target temperature during the preservation time;

or a position of the eutectic cooling blocks configured to maintain the organ at the target temperature during the preservation time.

Example 32. The system of Example 31, wherein the processor is configured to determine the target temperature based on two of: the preservation time, the type of the organ, the age of the donor, the circulatory condition of the donor, the brain condition of the donor; and the metabolic rate of the donor.

Example 33. The system of Example 31, wherein the processor is configured to determine the target temperature based on three of: the preservation time, the type of the organ, the age of the donor, the circulatory condition of the donor, the brain condition of the donor; and the metabolic rate of the donor.

Example 34. The system of Example 31, wherein the processor is configured to determine the target temperature based on four of: the preservation time, the type of the organ, the age of the donor, the circulatory condition of the donor, the brain condition of the donor; and the metabolic rate of the donor.

Example 35. The system of Example 31, wherein the processor is configured to determine the target temperature based on five of: the preservation time, the type of the organ, the age of the donor, the circulatory condition of the donor, the brain condition of the donor; and the metabolic rate of the donor.

Example 36. The system of Example 31, wherein the processor is configured to determine the target temperature determined based on the preservation time, the type of the organ, the age of the donor, the circulatory condition of the donor, the brain condition of the donor; and the metabolic rate of the donor.

Example 37. The system of any one of Examples 31-36, wherein the display in on a user device.

Example 38. The system of any one of Examples 31-37, wherein the display is on the transport container.

Example 39. The system of any one of Examples 31-38, wherein the display is configured to display the temperature of the organ.

Example 40. The system of any one of Examples 31-39, wherein the type of organ is a heart, a lung, a kidney, a liver, or a pancreas.

Example 41. A method for hypothermic transport of an organ, comprising: providing a transport container containing a canister for containing an organ, wherein the canister comprises a canister lid and a wall, and wherein the canister is at least partially filled with preservation solution; positioning at least one first cooling block in the transport container such that the at least one first cooling block is adjacent with the wall of the canister; positioning at least one second cooling block in the transport container such that the at least one second cooling block is adjacent with the canister lid, wherein the at least one first cooling block is engineered to a temperature that is at least 1° C. higher than the temperature of the at least one second cooling block, wherein the at least one first cooling block and the at least one second cooling block are positioned to promote convection between a top portion of the preservation solution and a bottom portion of the preservation solution; sealing an upper lid on the transport container; and transporting the transport container containing the canister, the organ, the at least one first cooling block, and the at least one second cooling block.

Example 42. The method of Example 41, wherein at least one of the preservation solution or the organ is preserved at a temperature between 4° C. and 8° C.

Example 43. The method of any one of Examples 41 or 42, wherein the at least one first cooling block is positioned in contact with a bottom portion of the wall and not in contact with a top portion of the wall.

Example 44. The method of Example 43, wherein the top portion of the wall is an uppermost 2 inches of the wall and the bottom portion of the wall is a portion below the uppermost 2 inches of the wall.

Example 45. The method of Example 43, wherein the top portion of the wall is an uppermost 20% of the wall and the bottom portion of the wall is a lowermost 80% of the wall.

Example 46. The method of any one of Examples 41-45, wherein the at least one first cooling block is engineered to a temperature that is at least 2° C. higher than the temperature of the at least one second cooling block.

Example 47. The method of any one of Examples 41-46, wherein the at least one first cooling block is engineered to a temperature of about 3° C. and the at least one second cooling block is engineered to a temperature of about 1° C.

Example 48. The method of any one of Examples 41-47, wherein the at least one first cooling block is engineered to a temperature of between about 1° C. and about 5° C., and wherein the at least one second cooling block is engineered to a temperature of between about −1° C. and about 3° C.

Example 49. The method of any one of Examples 41-48, wherein the top portion of the preservation solution is an uppermost 20%-50% of the preservation solution and the bottom portion of the preservation solution is a lowermost 50%-80% of the preservation solution.

Example 50. The method of any one of Examples 41-49, wherein the organ is a heart or a pancreas.

Example 51. The method of any one of Examples 41-50, wherein the at least one first cooling block and the at least one second cooling block are positioned in a single cavity of the transport container.

Example 52. The method of any one of Examples 41-51, wherein the at least one second cooling block comprises at least one eutectic cooling block.

Example 53. The method of any one of Examples 41-52, wherein the at least one first cooling block comprises at least one band of eutectic cooling blocks.

Example 54. A system for hypothermic transport of an organ, comprising: a rigid canister configured to contain an organ, the rigid canister comprising a cylindrical wall and a canister lid, wherein the rigid canister is configured to be filled with a preservation fluid; a transport container configured to receive the rigid canister; a first cooling material comprising a band of first eutectic cooling blocks configured to be disposed within the transport container and substantially surround the cylindrical wall, wherein the first eutectic cooling blocks are engineered to a temperature of about 3° C.; a second cooling material comprising at least one second eutectic cooling block configured to be disposed within the transport container above the canister lid, wherein the at least one second eutectic cooling block is engineered to a temperature of about 1° C.; and a transport container lid configured to be coupled with the transport container to form an insulated environment within the transport container.

Example 55. The system of Example 54, wherein when an organ is placed within the rigid canister in the preservation fluid with the canister lid sealed to the cylindrical wall, the rigid canister is received within the transport container, the first cooling material substantially surrounds the cylindrical wall, the second cooling material is disposed above the rigid canister, and the transport container lid is coupled to the transport container to form the insulated environment.

Example 56. The system of any one of Examples 54 or 55, wherein the system is configured to maintain a substantially uniform temperature throughout the preservation fluid from a top portion to a bottom portion of the rigid canister.

Example 57. The system of Example 56, wherein the substantially uniform temperature is between about 4° C. and 8° C.

Example 58. The system of Example 55, wherein the first cooling material has a top surface that is lower than a bottom surface of the canister lid.

Example 59. The system of any one of Examples 54-58, wherein the organ is a heart or a pancreas.

Example 60. The system of any one of Examples 54-59, wherein the band of first eutectic cooling blocks comprises a plurality of cooling blocks coupled together.

Example 61. A system for hypothermic transport of an organ comprising: a transport container; a canister configured to be received within the transport container, the canister configured to contain an organ; and a cooling media configured to be positioned within the transport container and outside the canister, the cooling media configured to maintain a temperature inside the canister at a target temperature during a target duration, wherein the target temperature is at least 6° C. and less than or equal to 8° C., and wherein the target duration is at least 3 hours.

Example 62. The system of Example 61, wherein the target duration is within 1 hour of transplantation of the organ.

Example 63. A method for hypothermic transport of an organ within the system of Example 61, the method comprising: placing the organ in the canister; positioning the canister in the transport container; positioning the cooling media in the transport container; and transporting the organ in the transport container for the target duration at the target temperature.

Example 64. A system for hypothermic transport of a heart within a transport container comprising: a transport container configured to contain a heart; a temperature sensor disposed within the transport container, the temperature sensor configured to measure a temperature of the heart; and a temperature maintenance component configured to maintain the temperature of the heart within an acceptable range, wherein the acceptable range is at least 6° C. and less than or equal to 8° C.

Example 65. The system of Example 64, wherein the temperature maintenance component comprises a solution with a specific phase transition temperature.

Example 66. The system of any one of Examples 64 or 65, wherein the temperature maintenance component is configured to intake air from an exterior of the transport container to adjust the temperature of the heart.

Example 67. The system of any one of Examples 64-66, wherein the temperature maintenance component is an electronic heating element.

Example 68. The system of any one of Examples 64-67, wherein the temperature maintenance component is an electronic cooling element.

Example 69. The system of any one of Examples 64-68, wherein the temperature maintenance component is a radiation element outside the transport container.

Example 70. The system of any one of Examples 64-69, wherein the temperature maintenance component is a heat conduction element outside the transport container.

Example 71. A system for hypothermic transport of a heart within a transport container comprising: a transport container; a canister configured to be disposed within the transport container, the canister configured to contain a heart, the canister configured to contain preservation solution; a temperature sensor configured to be disposed within at least of the transport container or the canister, the temperature sensor configured to measure a temperature of the heart; a first cooling material disposed in the transport container above the heart, the first cooling material having a lower temperature than the preservation solution; and a second cooling material disposed in the transport container below the heart, the second cooling material having a higher temperature than the first cooling material, and the second cooling material having a lower density than the first cooling material.

Example 72. A method for hypothermic transport of a heart within a canister, the method comprising: providing a canister configured to contain a heart; filling the canister with preservation solution; placing a heart in the canister; with the heart inside the canister, coupling a lid with the canister to form an insulated environment within the canister; pumping preservation fluid from a bottom of the canister to a top of the canister to cool the heart; and pumping preservation fluid from the top of the canister to the bottom of the canister to warm the heart.

Example 73. A method for hypothermic transport of a heart within a canister, the method comprising: determining a preservation time for a heart from a donor; determining a target temperature for organ preservation based on at least one of: the preservation time; a type of the organ; an age of the donor; a circulatory condition of the donor; a brain condition of the donor; and a metabolic rate of the donor; placing the heart within a canister; with the heart inside the canister, coupling a lid with the canister to form an insulated environment within the canister; and transporting the heart within the canister while a temperature maintenance component maintains the target temperature within the canister for a duration of the preservation time.

Example 74. The method of Example 73, wherein the temperature maintenance component comprises a solution with a specific phase transition temperature.

Example 75. The method of any one of Examples 73 or 74, wherein the temperature maintenance component is configured to intake air from an exterior of the canister to adjust a temperature of the heart.

Example 76. The method of any one of Examples 73-75, wherein the temperature maintenance component is an electronic heating element.

Example 77. The method of any one of Examples 73-76, wherein the temperature maintenance component is an electronic cooling element.

Example 78. The method of any one of Examples 73-77, wherein the temperature maintenance component is a radiation element outside the canister.

Example 79. The method of any one of Examples 73-78, wherein the temperature maintenance component is a heat conduction element outside the canister.

Example 80. A method for hypothermic transport of a heart within a canister, the method comprising: providing a canister configured to contain a heart; placing a heart in the canister; with the heart inside the canister, coupling a lid with the canister to form an insulated environment within the canister; receiving a preservation time input by a user; transporting the heart within the canister while a temperature maintenance component maintains a target temperature within the canister for a duration of the preservation time, wherein the target temperature is at least 6° C. and less than or equal to 8° C. if the preservation time is below a threshold, and wherein the target temperature is at least 4° C. and less than or equal to 6° C. if the preservation time is above a threshold.

Example 81. The method of Example 80, wherein the temperature maintenance component comprises a solution with a specific phase transition temperature.

Example 82. The method of any one of Examples 80 or 81, wherein the temperature maintenance component is configured to intake air from an exterior of the canister to adjust a temperature of the heart.

Example 83. The method of any one of Examples 80-82, wherein the temperature maintenance component is an electronic heating element.

Example 84. The method of any one of Examples 80-83, wherein the temperature maintenance component is an electronic cooling element.

Example 85. The method of any one of Examples 80-84, wherein the temperature maintenance component is a radiation element outside the canister.

Example 86. The method of any one of Examples 80-85, wherein the temperature maintenance component is a heat conduction element outside the canister.

Example 87. The method of any one of Examples 80-86, wherein the threshold is 4 hours.

Example 88. The method of any one of Examples 80-87, wherein the threshold is 6 hours.

Example 89. The method of any one of Examples 80-88, wherein the threshold is 8 hours.

Example 90. A method for hypothermic transport of a heart, comprising: providing a transport container, comprising: eutectic cooling blocks, a canister containing a heart, the canister configured to regulate pressure inside the canister, a lid configured to form an insulated environment within the transport container, and a temperature sensor configured to measure temperature within the canister; and transporting the heart while maintaining a temperature of at least 6° C. and less than or equal to 8° C. within the canister and a constant pressure within the canister.

Example 91. An apparatus substantially as shown and/or described.

Example 92. A method substantially as shown and/or described.

Example 93. A system substantially as shown and/or described.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the principles and features disclosed herein. Various combinations and subcombinations of the various features described herein are possible. Certain embodiments are encompassed in the claim set listed below.

Although this disclosure describes certain embodiments, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. Indeed, a wide variety of designs and approaches are possible and are within the scope of this disclosure. No feature, structure, or step disclosed herein is essential or indispensable. Moreover, while illustrative embodiments have been described herein, the scope of any and all embodiments having equivalent elements, modifications, omissions, combinations (e.g., of aspects across various embodiments), substitutions, adaptations and/or alterations as would be appreciated by those in the art based on the present disclosure. While certain embodiments have been described, these embodiments have been presented by way of example only, and are not intended to limit the scope of protection.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. Language of degree used herein may, in some examples, mean the exact value, amount, or characteristic.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A system for hypothermic transport of a heart comprising:

a transport container;

a rigid canister configured to be positioned inside the transport container, the rigid canister configured to contain a heart and regulate pressure inside the rigid canister for a preservation time, such that the pressure inside the rigid canister changes between 0 mmHg and 5 mmHg during the preservation time;

eutectic cooling blocks configured to be arranged within the transport container during the preservation time, such that a temperature within the rigid canister is maintained within a range of at least 6° C. and less than or equal to 8° C. during the preservation time;

a lid configured to seal to the transport container to form an insulated environment within the transport container; and a temperature sensor configured to be positioned inside the rigid canister during preservation.

2. The system of claim 1, wherein the eutectic cooling blocks comprise an upper cooling media configured to be positioned on a lid of the rigid canister and a lower cooling media configured to be positioned around an outer wall of the rigid canister.

3. The system of claim 2, wherein the upper cooling media is engineered to a temperature that is at least 2° C. lower than a temperature of the lower cooling media.

4. The system of claim 2, wherein the upper cooling media is engineered to a temperature of 1° C. and the lower cooling media is engineered to a temperature of 3° C.

5. The system of claim 2, wherein the lid comprises a handle, and the upper cooling media is positioned at least partially under the handle.

6. The system of claim 2, wherein the lower cooling media comprises a band of cooling media wrapped around the rigid canister.

7. The system of claim 1, wherein the rigid canister comprises an outer canister and an inner canister.

8. The system of claim 1, further comprising an alert configured to notify a user when the temperature is above 7.5° C. or below 6.5° C.

9. The system of claim 1, further comprising an alert configured to notify a user if the temperature is above 7.8° C. or below 6.2° C.

10. The system of claim 1, further comprising an intake valve configured to intake air from an exterior of the transport container to adjust the temperature of the heart.

11. The system of claim 1, further comprising a heat conduction element outside the transport container.

12. The system of claim 1, further comprising a pump configured to circulate fluid within the rigid canister.

13. The system of claim 12, wherein the pump is configured to pump fluid in a first direction to lower a temperature of the heart, and wherein the pump is configured to pump fluid in a second direction to lower the temperature of the heart.

14. The system of claim 1, wherein the rigid canister is configured to regulate pressure inside the rigid canister at between 5 mmHg and 20 mmHg during the preservation time.

15. The system of claim 1, wherein the rigid canister is configured to regulate pressure inside the rigid canister at between 2 mmHg and 6 mmHg during the preservation time.

16. The system of claim 1, wherein the rigid canister is configured to regulate pressure such that the pressure inside the rigid canister does not change more than 2 mmHg during the preservation time.

* * * * *